(12) United States Patent
Gucyski

(10) Patent No.: US 6,385,056 B1
(45) Date of Patent: May 7, 2002

(54) PRECISION SWITCHING POWER AMPLIFIER AND UNINTERRUPTIBLE POWER SYSTEM

(76) Inventor: Jeff Gucyski, P.O. Box 11633, Costa Mesa, CA (US) 92627

( * ) Notice: Subject to any disclaimer, the term of this patent is extended or adjusted under 35 U.S.C. 154(b) by 0 days.

(21) Appl. No.: 09/676,793

(22) Filed: Sep. 29, 2000

(51) Int. Cl.[7] .................................................. H02J 1/00
(52) U.S. Cl. ...................................................... 363/15
(58) Field of Search .............................. 363/15, 16, 55, 363/56.01, 95, 97, 131

(56) References Cited

U.S. PATENT DOCUMENTS

| | | | | |
|---|---|---|---|---|
| 4,926,302 A | * | 5/1990 | Harada et al. | 363/16 |
| 5,699,236 A | * | 12/1997 | Choi | 363/15 |
| 6,072,701 A | * | 6/2000 | Sato | 363/17 |
| 6,081,432 A | * | 6/2000 | Rinne et al. | 363/16 |

* cited by examiner

*Primary Examiner*—Matthew Nguyen

(57) ABSTRACT

This instantaneously interruptible power source ($I^2PS$) produces a precise AC output voltage. The $I^2PS$ can be built using only 7 power components, including an output capacitor. Moreover, currents applied thereto are unidirectional and independently developed. In the conventional switching power amplifier or uninterruptible power source, an output inductor continuously delivers a current to an output capacitor. A precise correction is simply impossible since, at the end of every switching cycle, the correction is either insufficient or continues while no longer required. This includes even most sophisticated class-D amplifiers. By contrast, the $I^2PS$ can instantaneously interrupt the correction and become idle. Without transformation, the output voltage can exceed supply voltages. An inductive block comprises at least one inductor and/or transformer for providing a return voltage. A switch or switches selectively apply a DC supply voltage or voltages to the inductive block. A rectifier limits the return,voltage, e.g. to one supply voltage. Another switch or switches can be used for selectively applying the output voltage to the inductive block. The output capacitor provides the output voltage of the $I^2PS$.

20 Claims, 19 Drawing Sheets

PRECISION SWITCHING POWER AMPLIFIER AND UNINTERRUPTIBLE POWER SYSTEM

CROSS REFERENCE TO RELATED INVENTIONS

The present invention is related by subject matter to co-pending applications filed on even date herewith and hereby incorporated by reference: "Switching Power Amplifier and Uninterruptible Power System Comprising DC/DC Converter for Sinusoidal Output," Ser. No. 672,986 and "Switching Power Supplies Incorporating Power Factor Correction and/or Switching at Resonant Transition," Ser. No. 676,792. The present invention is also related to the following U.S. Patents by the same inventor, U.S. Pat. Nos.:

6,121,756 (et al.), 6,011,702, 5,896,280 (et al.), 5,892,666, 5,736,841, 5,637,988, 5,426,413, 5,382,843, 5,270,904, 5,267,132, 5,252,974, 5,225,767, 5,221,887, 5,214,430, 5,206,649, 5,196,995, 5,173,698, 5,164,657, 5,164,656, 5,155,489, 5,155,430, 5,155,381, 5,146,399, 5,099,241, 5,057,990, 5,041,832, 4,999,568, 4,980,686, 4,980,649, 4,958,155, 4,956,760, 4,949,234, 4,947,308, 4,943,740, 4,940,982, 4,940,906, 4,929,848, 4,871,980, 4,866,398, 4,857,931, 4,853,837, 4,845,391, 4,843,392, 4,837,572, 4,829,263, 4,811,017, 4,803,610, 4,782,306, 4,763,106, 4,763,080, 4,749,958, 4,749,953, 4,736,286, 4,714,894, 4,634,996 and 4,476,441.

FIELD OF THE INVENTION

The invention relates to unidirectional AC/AC and DC/AC converters and a bi-directional DC/AC converter. This includes switching power amplifier, AC power source, frequency converter, line conditioner and uninterruptible power source.

BACKGROUND OF THE INVENTION

Many terms exist to describe various types of devices used for power conversion. The following definitions are provided in order to avoid any conflict of terms. A switching power supply (SPS) is an AC/DC or DC/DC converter. A switching power amplifier (SPA) is an AC/AC or DC/AC converter. An SPA that produces a fixed frequency is commonly referred to as inverter, AC voltage regulator, AC power source, line conditioner, frequency converter, etc. An SPA that amplifies a variable frequency is often narrowed to class-D amplifier, whereas other techniques exist. An uninterruptible power source/supply/system (UPS) is a bi-directional DC/AC converter in which energy is delivered from a rechargeable battery to an output, and vice versa. The UPS charges the battery when line is present and simulates line voltage when line fails. However, a low-cost UPS usually produces a square wave voltage that has adequate RMS level. In-the following disclosure, the term converter refers to a block performing an essential function within a parent apparatus.

Conventional SPA and UPS each comprise an output inductor that continuously delivers a current to an output capacitor. Moreover, a feedback signal introducing delay and phase shift is used to determine that current. Only an optimal level of the current is established. In particular, rate at which the current is regulated is very limited in order to maintain a high stability. However, variations of load impedance over amplitude and frequency are often rapid and unpredictable. A precise correction is simply impossible since, at the end of every switching cycle, the correction is either insufficient or continues while no longer required. In order to minimize an output voltage ripple, a powerful output filter is used. However, this further contributes to unpredictability of load impedance. Unless a well-behaved load is used, the high accuracy is unattainable with traditional techniques. This includes most sophisticated class-D amplifiers. Usually, the accuracy of the output voltage produced by the UPS is nonessential. However, an excessive switching results in reduced efficiency. During a battery charging, the UPS acts like an SPS. Conventional SPSs commonly use power factor correction to produce a sinusoidal input current. By contrast, a sinusoidal current for charging the battery is very rare in UPSs.

SUMMARY OF THE INVENTION

The present invention is intended to provide SFA and UPS producing highly accurate AC output voltage. The SPA and UPS offer an increased efficiency where the accuracy is nonessential. The SPA or UPS can be built using only two switches. A sinusoidal current charging a battery is often inherent as no additional power components are required.

An instantaneously interruptible power source ($I^2PS$) is introduced in this disclosure and the disclosure of the co-pending application titled "Low-Cost Switching Power Amplifier and Uninterruptible Power System with Sinusoidal Output," filed on even date herewith. A unidirectional or bi-directional $I^2PS$ is equivalent to a conventional SPA or UPS respectively. However, some intrinsic features of the $I^2PS$ are in sharp contrast to common flaws of the conventional devices. The $I^2PS$ can instantaneously interrupt the correction, wherein a precise correction can be accomplished in every switching cycle. Moreover, the $I^2PS$ can become idle by the end of every switching cycle or remain idle over a period of many cycles. The $I^2PS$ is thus idle when no correction is necessary. Usually, accuracy of the output voltage produced by the UPS is nonessential. However, the employment of the bi-directional $I^2PS$, in place of a traditional UPS, results in reduced power dissipation. A less frequent correction of the output voltage is necessary. The $I^2PS$ is unidirectional, unless otherwise noted.

The unidirectional or bi-directional $I^2PS$ according to the present invention converts a supply voltage or voltages into an AC output voltage. In one embodiment, a converter means converts the supply voltage or voltages into a primary current. A transformer means has a primary winding with the primary current applied thereto and a secondary winding for providing a secondary current in response to the primary current. A capacitive means provides the AC output voltage. A switching means selectively applies the secondary current to the capacitive means. In another embodiment, an inductive means provides a return voltage or voltages. A first switching means selectively applies the supply voltage or voltages to the inductive means. A rectifying means limits the return voltage or voltages. A capacitive means provides the AC output voltage. A second switching means selectively applies the AC output voltage to the inductive means. In yet another embodiment, a converter means converts the supply voltage or voltages into a primary voltage. A transformer means has a primary winding with the primary voltage applied thereto, and a secondary winding with a tap for providing a secondary voltage in response to the primary voltage. An inductive means is coupled to the tap for attaining a current and providing a return voltage or voltages. A rectifying means limits the return voltage or voltages. A capacitive means provides the AC output voltage. A switching means is coupled to the secondary winding for selectively applying the current to the capacitive means. In still another embodiment, a voltage source provides the supply voltage or voltages. An inductive means attains a current and provides a return voltage or voltages. A switching means selectively applies the current to the voltage source. A rectifying means limits the return voltage or voltages when the current is substantially equal to zero. A capacitive means provides the AC output voltage in response to the current.

A corrective current is equal to at least a portion of an inductive means current attained by the inductive means. The corrective current is inherently interrupted. Specifically, the respective switching means selectively applies the inductive means current to the output capacitor. When the switching means is conductive, the corrective current is equal to the inductive means current. Otherwise, the corrective current is zero. The inductive means comprises at least one inductor and/or transformer. The inductive means current is continuous if an inductor is used. Conversely, a primary current of a transformer can be interrupted. In particular, a flyback transformer provides a secondary current when the primary current is interrupted, and vice versa. Therefore, one current continues to flow in the form of the other current.

The corrective current recharges the output capacitor. Specifically, a current flowing through the output capacitor is equal to a difference between the corrective current and the output current of the I$^2$PS. The latter current may be zero since no minimum load is required. Any bi-directional I$^2$PS is capable of charging the battery when a low frequency voltage, in particular line voltage, is applied across the output capacitor. Preferably, the charging is carried out at both halves of the AC voltage so that an average value of the charging current drawn from the AC source is zero. Moreover, the bi-directional I$^2$PS can produce quasi- or pure-sinusoidal charging current. Obviously, any bi-directional I$^2$PS can operate as a unidirectional I$^2$PS. A conventional power supply can be then substituted for the battery.

Two types of the I$^2$PSs can be distinguished according to presence of the switching means between the inductive means and the output capacitor. In one type, the switching means effectively separates both parts. Therefore, the inductive means may consist of a flyback transformer to attain the corrective current and to provide for line isolation. Examples of this type of I$^2$PS are shown in FIGS. 2, 3 and 11 through 19. Moreover, each converter shown in FIGS. 4 through 9 and each I$^2$PS shown in FIGS. 11 through 33 can be implemented in the I$^2$PSs of FIGS. 2 and 3. The composite I$^2$PS may be bi-directional even if the I$^2$PS used therein is unidirectional.

In the other type of the I$^2$PS, the inductive means can be connected to the output capacitor. Only two unidirectional switches are necessary to accomplish the bi-directional conversion. Examples of this type of I$^2$PS are shown in FIGS. 20 through 33. However, the separation between the inductive means and the output capacitor via the switching means can be ambiguous. For example, in the prior art reference depicted in FIG. 1, a bi-directional switch is in series with the inductive means and the output capacitor. The bi-directional switch can be relocated anywhere within the respective loop. In particular, the bi-directional switch can be connected to the output capacitor. The I$^2$PSs of FIGS. 17 and 25 are equivalent and yet fall into the different categories.

Two alternative types of the I$^2$PSs can be distinguished according to a type of the power supply. In one type, an AC voltage source provides a high frequency signal. The inductive means determines output impedance of the source. A conventional SPS without an output rectifier can be implemented. A currents DC/AC converter already incorporates the inductive means. The low frequency output voltage is obtained without the conversion to and from DC voltage. This results in a higher efficiency of the I$^2$PS. Moreover, the respective converter is in full control of the output power to the load. One example of a pertinent apparatus is shown in FIG. 1 in accordance with one of the prior art references. Novel solutions are depicted in FIGS. 2, 3 and 10. In the other type of the I$^2$PS, one or two DC supply voltages are used. Examples of the relevant I$^2$PSs are shown in FIGS. 11 through 33. This technique is most advantageous if boosting of the supply voltage or voltages is unnecessary. However, some I$^2$PSs can perform this function even without a transformer. Off-the-shelf power supply can be used. Moreover, bulky capacitors for DC storage are avoidable. This feature is illustrated in FIG. 27.

BRIEF DESCRIPTION OF THE DRAWINGS

The present invention will become more clear in conjunction with the accompanying figures of which.

DETAILED DESCRIPTION OF THE INVENTION

Figure 1:
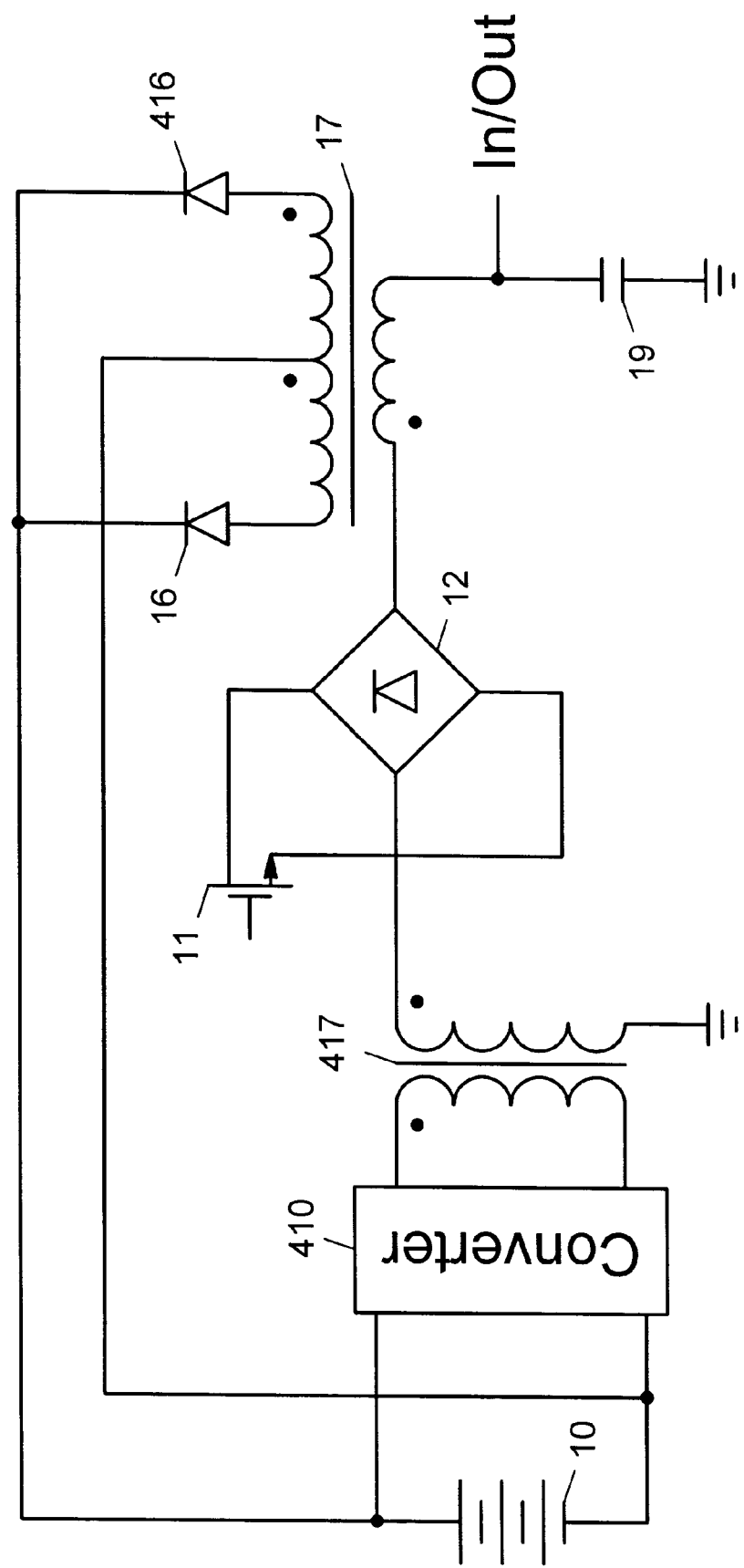
FIG. 1 is an embodiment of a UPS according to "Switching Power Amplifier," U.S. Pat. No. 4,763,080 dated Aug. 9, 1988, by the same inventor.

FIG. 1 is an embodiment of a UPS according to "Switching Power Amplifier," U.S. Pat. No. 4,763,080 dated Aug. 9, 1988, by the same inventor. The UPS operates at a high switching frequency and comprises a generator, a bi-directional switch, a low-pass filter and a rectifier. The generator comprises the components 10, 410 and 417 for providing a generator voltage at the high frequency. The bi-directional switch is coupled in series with an output of the generator. It comprises the components 11 and 12 for selectively applying the generator voltage to the load via the low-pass filter and for providing a correction of the output voltage. The rectifier limits voltages of the filter. The shape, magnitude and frequency of the generator voltage are non-essential.

The bi-directional switch is the only power component that is responsive to input and output voltages of the UPS, and to the generator voltage. Generally, it can be switched at any time as to carry out the correction. The filter comprises the components 17 and 19 for providing the output voltage. The filter has an inductive input. However, a voltage across the bi-directional switch is limited. A secondary voltage of the filter is rectified and applied to the battery 10 of the generator. A transient voltage suppressor, not shown for simplicity, is coupled across the bi-directional switch. Switches used in this and the following embodiments are N-channel MOSFETs, unless otherwise noted. The switches are capable of conducting current in either direction as to bypass an internal and/or external drain-source diode.

Specifically, a positive terminal of the battery 10 is connected to one input of the DC/AC converter 410 and the cathodes of the diodes 16, 416. A negative terminal of the battery 10 is connected to another input of the converter 410 and a center tap of the secondary winding of the flyback transformer 17. The primary winding of the forward transformer 417 is tied between outputs of the converter 410. Therefore, the converter 410 converts the battery voltage into the primary voltage of the transformer 417. The generator voltage appears across the secondary winding of the transformer 417. The switch 11 is connected between outputs of the diode bridge 12. Inputs of the bridge 12 are connected between the secondary winding of the transformer 417 and the primary winding of the transformer 17. The latter winding is in series with the capacitor 19 that provides the output voltage of the UPS. The secondary winding of the transformer 17 is connected between the anodes of the diodes 16 and 416. The secondary winding of the transformer 417 and the capacitor 19 are grounded. Both transformers 17 and 417 provide for galvanic isolation between the battery 10 and the output of the UPS.

The generator voltage is selectively applied to the low-pass filter. Amplitude of the generator voltage is higher than amplitude of the output voltage. The switch 11 turns on when polarity of the generator voltage allows a correction of the output voltage. The low-pass filter smoothes out a voltage provided by the bi-directional switch. The result is a corrective noise superimposed onto the output voltage. The primary winding of the transformer 17 and the capacitor 19 form the most efficient low-pass filter. The primary winding acts like an inductor of the filter. The generator voltage is applied to the filter by closing the switch 11. However, when the switch 11 turns off, a voltage spike appears thereacross. This effect is minimized by limiting the primary voltage of the transformer 17. For that purpose, the secondary voltage of the transformer 17 is rectified by the diodes 16, 416 and limited to the battery voltage. The turns ratio of the transformer 17 is chosen in such a manner that the diodes 16 and 416 are cut off whenever the switch 11 is closed. Energy returns to the battery 10 only under the voltage surge condition across the switch 11. With the switch 11 open, only the capacitor 19 delivers energy to the load.

The battery charging is not disclosed in the prior art reference. However, all necessary modifications and changes would have been obvious to persons skilled in the art without departing from the scope of that invention. These modifications and changes are minuscule. The battery 10 is simply substituted for another conventional DC voltage source disclosed in the prior art reference. The battery charging is performed when an AC voltage, in particular line voltage, is applied across the capacitor 19. The AC voltage, regardless of its polarity, is applied to the transformers 17 and 417 when the switch 11 is closed. The diodes 16 and 416 are cut off. Specifically, the primary winding of the transformer 17 and the secondary winding of the transformer 417 constitute a voltage divider. The converter 410 is disabled so that the primary winding of the transformer 417 is effectively disconnected or, preferably, shorted. In the latter case, maximum energy is delivered to the transformer 17. When the switch 11 turns off, at least a portion of energy stored in the transformer 17 is delivered to the battery 10. The diode 16 or 416 conducts when the AC voltage is negative or positive respectively.

Figure 2:
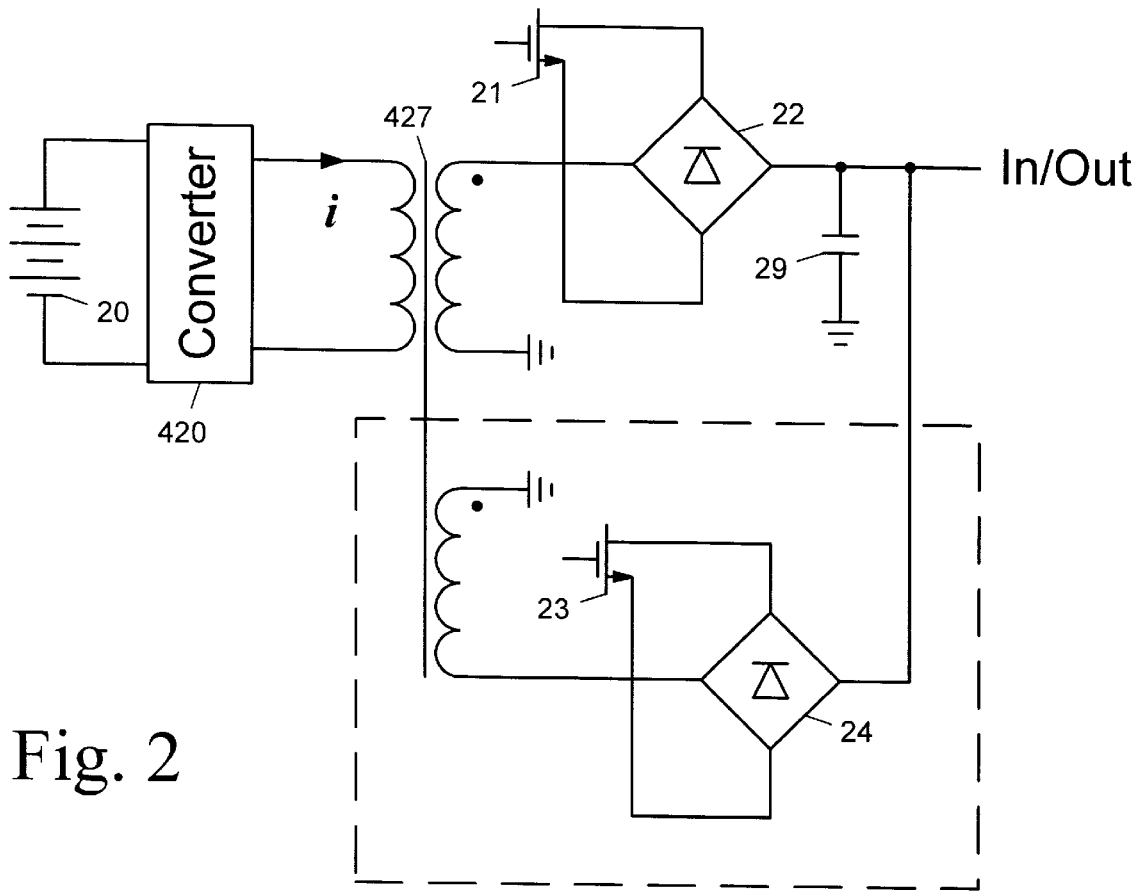
FIG. 2 is the preferred embodiment of a bi-directional I$^2$PS with a current output converter and one or two bi-directional switches.

FIG. 2 is the preferred embodiment of a bi-directional I²PS with a current output converter and one or two bi-directional switches. The I²PS converts a DC supply voltage into an AC output voltage. A converter means converts the DC supply voltage into a primary current i, as marked in the drawing. Consequently, short circuit protection of the I²PS is inherent. A transformer means has primary and secondary windings. The primary current is applied to the primary winding. The secondary winding is electromagnetically coupled thereto for providing a secondary current in response to the primary current. A capacitive means provides the AC output voltage. A switching means selectively applies the secondary current to the capacitive means. Accordingly, the switching means selectively applies the AC output voltage to the secondary winding.

Specifically, the supply voltage provided by the battery 20 is applied between inputs of the converter 420 switching at a high frequency. The primary winding of the transformer 427 is connected between outputs of the converter 420. Therefore, the converter 420 converts the battery voltage into the primary current. Moreover, the converter 420 is capable of converting the primary current into a current charging the battery 20. The I²PS is thus capable of a reverse energy transfer. However, the I²PS is considered bi-directional if energy delivered to the battery 20 can be significantly greater than energy drawn from it, over an extended interval of time. The transformer 427 may be of forward or flyback type. Therefore, polarity of the primary winding is unmarked in the drawing. The transformer 427 allows line isolation and transformation of voltages and currents at the high frequency. In this embodiment, the corrective current is equal to the secondary current of the transformer 427. The secondary winding and the capacitor 29 are grounded.

Figure 3:
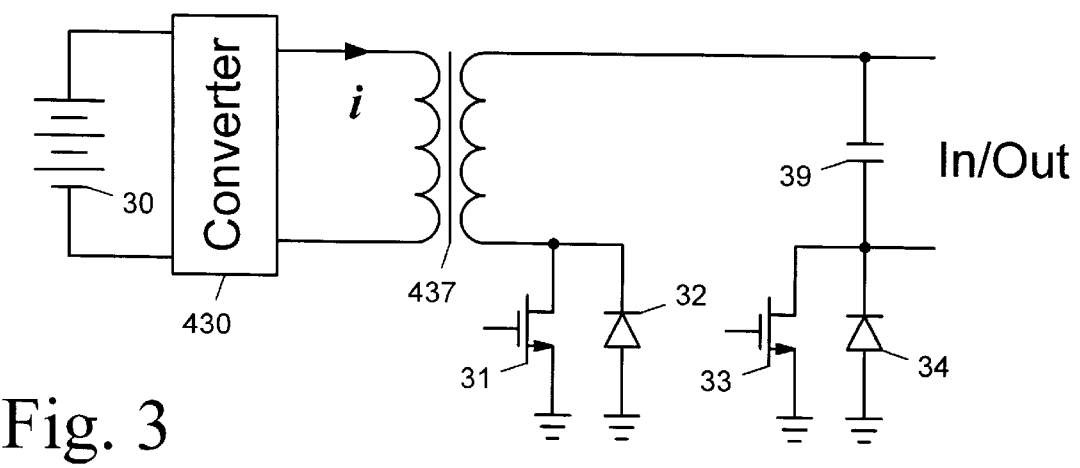
FIG. 3 is an embodiment of a bi-directional I$^2$PS with a current output converter and a grounded bi-directional switch.

The switching means may include a plurality of bi-directional switches. The secondary voltage of the transformer 427 depends on the state of the switching means. When any switch of the switching means is closed, the secondary voltage is substantially equal to the output voltage having either polarity. The corrective current is bi-directional, wherein four-quadrant operation is accomplished. The operation of the I²PS with a single bi-directional switch will be considered first. The bi-directional switch is in series with the secondary winding. It consists of the semiconductors 21 and 22. Specifically, the drain and source of the switch 21 are connected to positive and negative outputs of the diode bridge 22 respectively. Inputs of the bridge 22 are connected between the end of the secondary winding and the capacitor 29. The source of the switch 21 can be grounded if it is unnecessary to reference the output voltage to ground. Furthermore, a pair of unidirectional switches can be used as the bi-directional switch. An example is shown in FIG. 3, wherein the respective ground reference can be relocated.

The converter 420 utilizes an additional inductive component if the transformer 427 is of forward type. An inductor may be connected in series with the primary winding. The primary current of the transformer 427 is then limited to the inductor current. The secondary current is usually proportional to the primary current if the switch 21 is closed. Specifically, the converter 420 converts the battery voltage into the primary current. The corrective current is delivered when the switch 21 is closed. It is usually equal to the primary current multiplied by the turns ratio of the transformer 427. Preferably, the switching of the switch 21 is synchronized with an internal clock of the converter 420.

The switch 21 turns on immediately after polarity of the secondary voltage changes so that the correction is carried out in a desired direction. For example, the switch 21 turns on when the secondary voltage becomes positive and the output voltage, regardless of its polarity, has to be increased. The switch 21 can turn off at any time whenever the correction is completed, regardless of the clock signal. The corrective current applied to the capacitor 29 is immediately interrupted. The switch 21 remains turned off at least until the secondary voltage changes polarity again. Moreover, the switch 21 turns off unconditionally when the corrective current drops to zero as the converter 420 alternates polarity of the primary current. The switch 21 remains turned off if polarity of the secondary voltage is inadequate or the correction of the output voltage is unnecessary.

The converter 420 requires no inductive components if the transformer 427 is of flyback type. When the switch 21 is turned off, the converter 420 generates the primary current. The primary voltage determines a rate at which the transformer 427 charges up. When the switch 21 is turned on, the primary current is zero and the transformer 427 provides the corrective current. The secondary voltage is approximately equal to the output voltage. The level thereof determines a reset rate of the transformer 427. The rate is minimal near zero crossing of the output voltage. The rate is negative if energy stored in the transformer 427 increases. For example, the load may be purely reactive. This load requires a peak corrective current at zero crossing of the output voltage when the reset rate is zero. However, the rate is negative if the reactive load returns energy stored therein. The capacitor 29 further weakens or strengthens this effect.

A more efficient operation is accomplished with an additional bi-directional switch and a secondary center tap. This is marked by the dashed rectangle in the drawing. Furthermore, a flyback converter deriving from FIG. 9 requires employment of both bi-directional switches. The additional bi-directional switch is connected between the opposite end of the secondary winding and the capacitor 29. It consists of the switch 22 connected across the diode bridge 24, similar to the other bi-directional switch. The secondary tap is grounded, wherein voltages applied to the bi-directional switches have opposite polarities. Similar to the switch 21, the switch 23 turns on when the correction of the output voltage is necessary and polarity of the secondary voltage changes so that the correction becomes possible. The switch 23 turns off when the correction is completed or the corrective current drops to zero. Subsequently, the switch 21 can turn on as to resume an incomplete correction. Unless the output voltage is at zero crossing, a dead time is necessary to avoid cross-conduction of the switches 21 and 23.

Two other bi-directional switches, not shown for simplicity, can be added to accomplish further advantages. At given output power, voltage ratings of the components 21 through 24 are cut in half without reducing amplitude of the output voltage. The additional bi-directional switches are grounded and separately connected to both ends of the secondary winding. The secondary center tap is unused. The secondary circuit comprising two or four bi-directional switches resembles the conventional half- or full-bridge converter respectively. However, the conventional converters employ unidirectional switches supplied from a DC voltage source. By contrast, the I²PS employs the bi-directional switches supplied from an AC current source. This source comprises the battery 20, the converter 420 and the transformer 427 providing the high frequency current.

The converters of FIGS. 4 through 9 each can be substituted for the battery 20, the converter 420 and the transformer 427. In the flyback converter deriving from FIG. 9, a primary current that charges the respective transformer has one polarity. Therefore, both bi-directional switches are required to generate the output voltage. Conversely, the single bi-directional switch can be used with the converters of FIGS. 4 through 8 and the push-pull converter deriving from FIG. 9. For example, a power supply and the transformer 447 of FIG. 4 correspond to the components 20 and 427 respectively. The remaining components of FIG. 4 correspond to the converter 420. Other examples of current output converters are disclosed in the co-pending application titled "Low-Cost Switching Power Amplifier and Uninterruptible Power System with Sinusoidal Output," filed on even date herewith, and the abovementioned "Push-Pull Switching Power Supply Having Increased Efficiency and Incorporating Power Factor Correction," U.S. Pat. No. 5,892,666 dated Apr. 6, 1999, by the same inventor. Other primary windings or taps can be added to the single primary winding of the transformer 427. For example, the flyback and push-pull converters of FIG. 9 each require a primary center tap.

Figure 4:
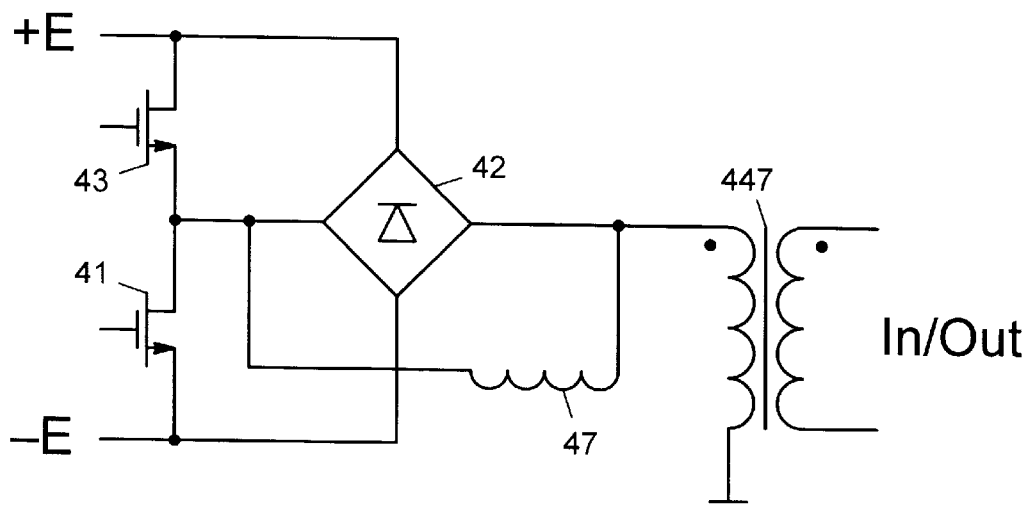
FIG. 4 is an embodiment of a bi-directional half-bridge converter with a forward transformer and current output.
Figure 5:
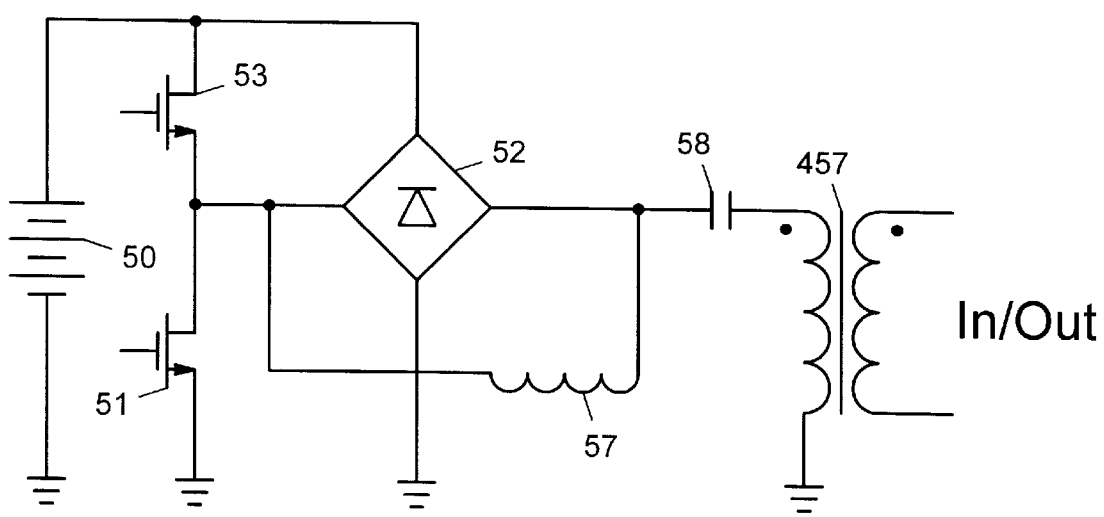
FIG. 5 is the preferred embodiment of a bi-directional half-bridge converter with a forward transformer and current output.
Figure 11:
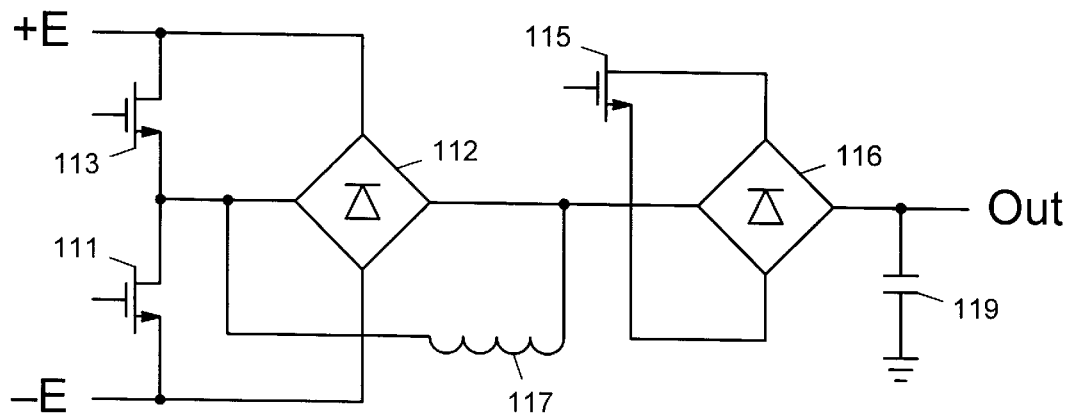
FIG. 11 is an embodiment of an I$^2$PS with a floating inductor.
Figure 12:
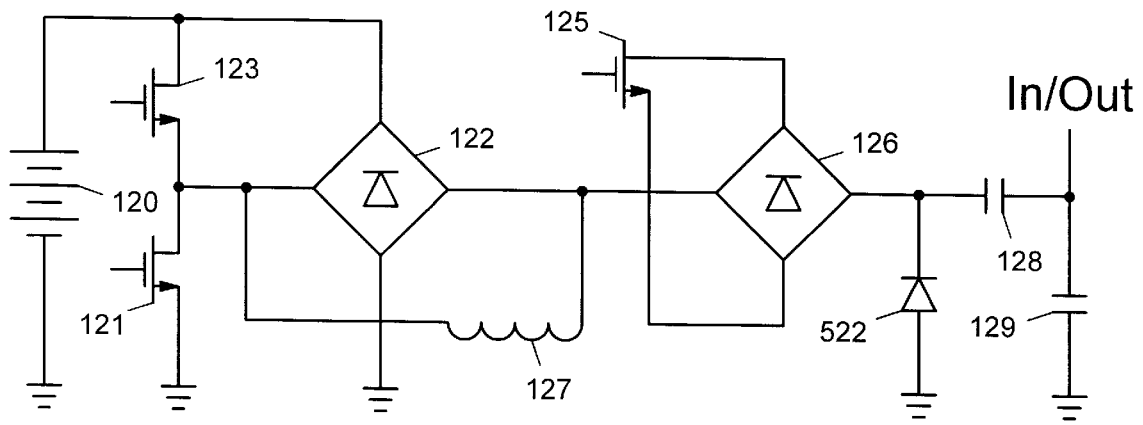
FIG. 12 is an embodiment of a bi-directional I$^2$PS with a floating inductor.

Each of the I$^2$PSs shown in FIGS. 11 through 33 can be implemented as the converter 420, whether or not this is practical. The instant I$^2$PS may become bi-directional even if the I$^2$PS used therein is unidirectional. However, the I$^2$PSs of FIGS. 19, 20, 23, 26 and 29 each comprise a floating output capacitor. Additional components are necessary in the composite I$^2$PS. By way of example, FIGS. 4 and 5 show the method of implementing the I$^2$PSs of FIGS. 11 and 12 respectively. Differences between the respective embodiments indicate steps that would allow persons skilled in the art to implement the remaining I$^2$PSs. In particular, the output capacitor in FIGS. 11 and 12 is replaced with the output transformer in FIGS. 4 and 5. The I$^2$PSs of FIGS. 11 and 12 each employ a bi-directional switch. This switch is redundant and thus absent in the converters of FIGS. 4 and 5. These converters each employ a pair of diodes coupled to the output transformer and the respective power supply. The diodes are necessary if the other I$^2$PSs are implemented. However, the I$^2$PS of FIG. 22 requires only one additional diode connected between the battery 220 and the cathode of the diode 622. The I$^2$PS of FIG. 27 already employs equivalent diodes 672 and 674.

The output voltage can be reduced without discharging the battery 20. On the contrary, some energy stored in the capacitor 29, and possibly the load, is returned to the battery 20. The high frequency at which the transformer 427 is intended to operate is also significantly higher than the frequency of the output voltage. Therefore, one or both bi-directional switches are used to generate the high frequency. The switch 21 or 23 turns on when the output voltage is positive and has to be decreased, or is negative and has to be increased. The output voltage, reduced by voltage drops of the switch 21 or 23 and the respective bridge 22 or 24, is selectively applied across the secondary winding. Therefore, the secondary voltage assumes a momentary value of the chopped output voltage. The switch 21 or 23 turns off when the output voltage reaches a desired level. The corrective current collapses to zero. The converter 420 limits a return voltage appearing across the primary winding, e.g. to the battery voltage. This method is somewhat ineffective near zero crossing of the output voltage. The rate at which the corrective current increases may be insufficient to accomplish the desired reduction of the output voltage. Furthermore, the half-bridge converter of FIG. 5 is incompletely suitable for reducing the output voltage without discharging the battery 20. Thin converter employs a series coupled capacitor whose charging current is relatively small. This is pointed out hereinafter.

The battery charging is performed when an AC or DC voltage is applied across the capacitor 29. The operation of the I$^2$PS remains the same. In particular, the switch 21 or 23 is energized as if to reduce the AC or DC voltage. The charging can be performed at both polarities of the AC voltage. By contrast, the DC voltage having specific polarity may be required if one bi-directional switch is used. The DC voltage may vary in a wide range. For example, a half- or full-bridge rectifier may be used to rectify the AC voltage prior to the conversion into the charging current. The conversion of the AC voltage is less apparent. It will be thus considered in the following disclosure.

FIG. 3 is an embodiment of a bi-directional I$^2$PS with a current output converter and a grounded bi-directional switch. The I$^2$PS is based on the FIG. 2 embodiment, whereas the single bi-directional switch comprises a pair of grounded unidirectional switches. Specifically, inputs and outputs of the converter 430 are tied across the battery 30 and the primary winding of the transformer 437 respectively. The converter 430 converts the battery voltage into a primary current i, as marked in the drawing. Consequently, short circuit protection of the I$^2$PS is inherent. The I$^2$PS is considered bi-directional if the converter 430 is capable of charging the battery 30 at a significantly higher rate than discharging it, over an extended interval of time.

The transformer 437 may be of forward or flyback type. Therefore, polarities of the windings are unmarked in the drawing. The secondary winding is in series with the grounded bi-directional switch and the output capacitor 39. Specifically, one end of the secondary winding is connected to the drain of the switch 31 and the cathode of the diode 32. The other end is connected to the capacitor 39 that provides the output voltage of the I$^2$PS. The capacitor 39 is further connected to the drain of the switch 33 and the cathode of the diode 34. The output voltage is referenced to this junction. The sources of the switches 31, 33 and the anodes of the diodes 32, 34 are grounded.

The bi-directional switches of FIGS. 1, 2, 11, 12 and 14 each consist of a MOSFET and a diode bridge. More efficient switching is accomplished by replacing a pair of diodes with a MOSFET. Accordingly, the instant bi-directional switch consists of two unidirectional switches, each comprising a MOSFET and a series coupled diode. The switches 31 and 33 are in series with the diodes 34 and 32 respectively. Moreover, the sources of the switches 31, 33 and the anodes of the diodes 32, 34 are tied together via ground. If the bi-directional switch is closed, a voltage drop thereacross is defined by on-resistance of the conducting switch 31 or 33 and a forward voltage of the conducting diode 34 or 32 respectively. Moreover, with one switch 31 or 33 closed, the bi-directional switch conducts in only one direction. The bi-directional switch automatically turns on or off at zero crossing of the corrective current. The bi-directional switch is configured as the components 91 through 94 of FIG. 9. However, these components are also tied to the battery 90 via ground. By contrast, the common junction of the bi-directional switch is unrestrained and it can float. The transformer 437 provides for galvanic isolation.

The switch 31 or 33 turns on to apply the corrective current to the capacitor 39. The corrective current is equal to the secondary current of the transformer 437. The switch 31 and the diode 34 conduct when the corrective current has one polarity. The switch 33 and the diode 32 conduct when polarity is opposite. Moreover, power loss of the respective diode is eliminated when the switch in parallel therewith is turned on as well. Therefore, both switches 31 and 33 are closed to accomplish the most efficient conduction of the corrective current. The voltage drop across the bi-directional switch is proportional to a sum of two on-resistances. The corrective current is interrupted when the switch that is necessary to maintain flow of the corrective current turns off. The complementary switch can remain closed.

The output voltage can be reduced without discharging the battery 30. On the contrary, some energy stored in the capacitor 39, and possibly the load, is returned to the battery 30. The switch 31 turns on when the output voltage is positive and too high. The switch 33 turns on when the output voltage is negative and too low. Preferably, the switch 31 or 33 is constantly turned on when the output voltage is negative or positive respectively. The output voltage is applied across the secondary winding. The respective switch 31 or 33 turns off when the output voltage is reduced to a desired level. The corrective current is immediately interrupted. At least a portion of energy stored in the transformer 437 and possibly an inductive component operating in the converter 430 is returned to the battery 30. The primary current decays to zero during the transformer reset. The battery charging is performed when an AC voltage is applied across the capacitor 39. The operation of the I$^2$PS remains the same. In particular, the switch 31 or 33 is energized as if to reduce the AC voltage. Both switches 31 and 33 are turned on to apply the AC voltage, regardless of its polarity, across the secondary winding.

FIG. 4 is an embodiment of a bi-directional half-bridge converter with a forward transformer and current output. The converter is similar to the FIG. 11 I$^2$PS, whereas the bi-directional conversion is accomplished. This extension of functionality is pointed out hereinabove. The converter is capable of continuously delivering energy. It includes a switching means for selectively applying DC supply voltages to the primary winding of the transformer 447. An inductive means is coupled in series with the primary winding for attaining the primary current and providing a return voltage. A rectifying means limits the return voltage and, consequently, a voltage applied to the primary winding. The converter is intended to operate in the I$^2$PS of FIG. 2 or 3 with one bi-directional switch or in the I$^2$PS of FIG. 2 with two bi-directional switches.

Specifically, a positive supply voltage +E is applied to the drain of the switch 43 and a positive output of the diode bridge 42. A negative supply voltage −E is applied to the source of the switch 41 and a negative output of the bridge 42. One end of the inductor 47 is connected to the drain of the switch 41, the source of the switch 43 and one input of the bridge 42. The other end is connected to the other input of the bridge 42 and the primary winding of the forward transformer 447. Therefore, the bridge 42 rectifies a voltage appearing across the inductor 47. This voltage and the primary voltage are limited to +E and −E. The primary winding is grounded. The secondary winding provides the output current of the converter.

The inductor 47 and the transformer 447 can be also considered the inductive means. Both components are coupled in series. The inductor 47 attains an inductor current. In response thereto, the transformer 447 provides the output current. The bride 42 represents the rectifying means with both supply voltages applied thereto. Specifically, the switch 41 or 43 turns on to increase the inductor and primary currents in respective directions. The output current is limited to the inductor current multiplied by the turns ratio of the transformer 447. The inductor 47 and the primary winding constitute a voltage divider. However, the primary voltage reaches one of the supply voltages if the inductor and primary currents are uneven. The primary voltage divided by the turns ratio is a maximum output voltage that the converter can produce. However, if a bi-directional switch of the I$^2$PS is closed, the output voltage of the I$^2$PS determines the primary and secondary voltages regardless of states of the switches 41 and 43.

The switches 41 and 43 are energized alternately to produce the AC output current of the converter. When the switch 41 or 43 is turned on, −E or +E is applied to the inductor 47 respectively. Therefore, the switch 41 or 43 selectively applies the inductor current to the primary winding. When the switch 41 or 43 turns off, the respective diode connected to both switches conducts the inductor current. The current starts to decay to zero. Most efficient switching at highest frequency is accomplished when the complementary switch turns on right after a transitory dead time. This switch turns on substantially at zero voltage and eliminates power loss of the respective parallel-couple diode. The inductor current starts to ramp up immediately after it reaches zero.

When the bi-directional switch turns on, the output voltage of the I$^2$PS is applied across the secondary winding. For example, the bi-directional switch 21, 22 of FIG. 2 performs this function. The turns ratio of the transformer 447 is chosen so that an undistorted output voltage can be produced. Accordingly, the primary voltage is greater than −E and smaller than +E when the bi-directional switch is energized. The diodes connected to the primary winding are cut off even when the output voltage peaks. The bi-directional switch conducts the corrective current. It can turn off at any time whenever the correction is completed, regardless of any clock signal. If the transformer 447 is reset, the bi-directional switch turns off at zero corrective current. Otherwise, the corrective current is immediately interrupted. The inductor and primary currents are uneven, wherein the respective diode connected to the primary winding conducts a difference between both currents. The primary voltage is limited to +E and −E.

The bi-directional conversion is carried out when the power supply is replaced with a pair of grounded batteries or a single battery having a grounded center tap. The output voltage of the I$^2$PS can be reduced while the switches 41 and 43 are inactive. Accordingly, the battery charging is performed when an AC voltage, having a low frequency, is selectively applied to the secondary winding. The secondary voltage assumes a momentary value of the chopped AC voltage. The primary voltage is equal to the secondary voltage multiplied by the turns ratio of the transformer 447. Moreover, if the converter is employed in the I$^2$PS of FIG. 2 with two bi-directional switches, polarity of the AC voltage can be effectively reversed. Accordingly, polarity of the primary current can alternate at high frequency rather than the frequency of the AC voltage.

The forward transformer 447 operates as a flyback transformer. When the bi-directional switch is turned on, the primary voltage is smaller than +E and greater than −E. All diodes of the bridge 42 are cut off. Moreover, the switches 41, 43 are inactive and the inductor current is zero. When the bi-directional switch or switches are turned off, at least a portion of energy stored in the transformer 447 is delivered to one of the batteries or to the single battery. One of the diodes connected to the primary winding conducts the primary current. Therefore, the AC voltage is effectively amplified. For example, the I$^2$PS of FIG. 2 or 3 can produce equivalent line voltage of 120 Vac. However, the battery charging can be carried out even if the AC voltage is only 85 Vac at low line level. A sinusoidal charging current can be produced even when one bi-directional switch is used.

The inductor 47 attains the bi-directional current. The inductor current may increase instead of decreasing, or vice versa. Unless the converter is implemented in the I²PS of FIG. 2 with two bi-directional switches, the inductor current often has opposite polarity than polarity necessary to accomplish the correction. Some time has to expire before the inductor current drops to zero and builds up in the desired direction. This results in a higher ripple of the output voltage of the I²PS. Furthermore, the complementary switches 41 and 43 are connected across the power supply. Each pair conducts the corrective current and requires the dead time in order to prevent cross-conduction of the switches. This also contributes to the increased ripple level. The employment of another inductor provides a partial solution. The juncture of the switch 43 and the respective diode coupled across the switch 41 can be separated from the circuit. The additional inductor can be added between that juncture and the primary winding. A similar technique is disclosed in the abovementioned "Ultra Efficient Switching Power Amplifier," U.S. Pat. No. 4,980,649 dated Dec. 25, 1990, by the same inventor.

FIG. 5 is the preferred embodiment of a bi-directional half-bridge converter with a forward transformer and current output. The converter is based on the FIG. 4 embodiment; it also similar to the FIG. 12 I²PS. Furthermore, a second inductor can be added to increase a rate of output current variations. This is pointed out in reference to the FIG. 4 embodiment. The voltage of the battery 50 is applied to the drain of the switch 53 and a positive output of the diode bridge 52. One end of the inductor 57 is connected to the drain of the switch 51 and the source of the switch 53. The other end is connected to the capacitor 58. The inductor 57 is also connected between inputs of the bridge 52. By these means, a voltage appearing across the inductor 57 is limited to the battery voltage. The capacitor 58 is in series with the primary winding of the forward transformer 457. The capacitor 58 stores a DC voltage in response to the primary current and hence the inductor current. The battery 50, the source of the switch 51, a negative output of the bridge 52 and the primary winding are grounded. The secondary winding provides the output current of the converter.

The converter operates analogously to the FIG. 4 converter. The inductor 57, the capacitor 58 and the primary winding are effectively coupled in series. The capacitor 58 is charged approximately to one half the battery voltage. The switch 53 turns on to increase the inductor current and charge the capacitor 58. Conversely, the switch 51 turns on to reverse polarity of the inductor current and discharge the capacitor, 58. The battery voltage is applied to the inductor 57 when the switch 53 or the respective diode coupled thereacross conducts. The inductor 57 is effectively grounded when the switch 51 or the respective diode coupled thereacross conducts. Diodes connected to the capacitor 58 are cut off when the inductor and primary currents are even. Otherwise, the respective diode conducts a difference between both currents.

The battery charging is performed when an AC voltage is selectively applied across the secondary winding. The charging can be performed as in the FIG. 4 converter, wherein the forward transformer 457 operates as a flyback transformer. Specifically, the switches 51 and 53 are inactive and the inductor current is zero. The transformer 457 charges up when a bi-directional switch of the I²PS of FIG. 2 or 3 is turned on. Otherwise, the transformer 457 returns stored energy. When the primary voltage is positive, the primary current charges the battery 50 and discharges the capacitor 58. Otherwise, the capacitor 58 charges up. The voltage stored therein is maintained within a predetermined level. Unless the capacitor 58 has a large value, a small amount of energy can be delivered to the battery 50 during each half-wave of the AC voltage. That amount can be significantly increased if the converter is implemented in the FIG. 2 I²PS with two bi-directional switches. Moreover, the output voltage of the I²PS can be reduced without discharging the battery 50.

Forward properties of the transformer 457 can be also utilized for the reverse energy transfer. The transformer 457 feeds energy back while the bi-directional switch is closed. Specifically, the switch 51 turns on when the primary voltage is positive. A sum of the voltage stored in the capacitor 58 and the primary voltage is smaller than the battery voltage. The inductor current builds up and discharges the capacitor 58. The switch 51 turns off before the primary voltage changes polarity. The inductor current flows through the bridge 52, charges the battery 50 and continues to discharge the capacitor 58. The capacitor 58 charges up somewhat during transformer reset. The capacitor voltage is fully restored when the AC voltage is negative as the bi-directional switch enforces negative primary voltage. The secondary voltage has a limited level in order to minimize surges of the primary and secondary currents. The current charging the battery 50 can be dramatically increased if the second bi-directional switch is used. The primary voltage of either polarity can be enforced at a high frequency.

Figure 15:
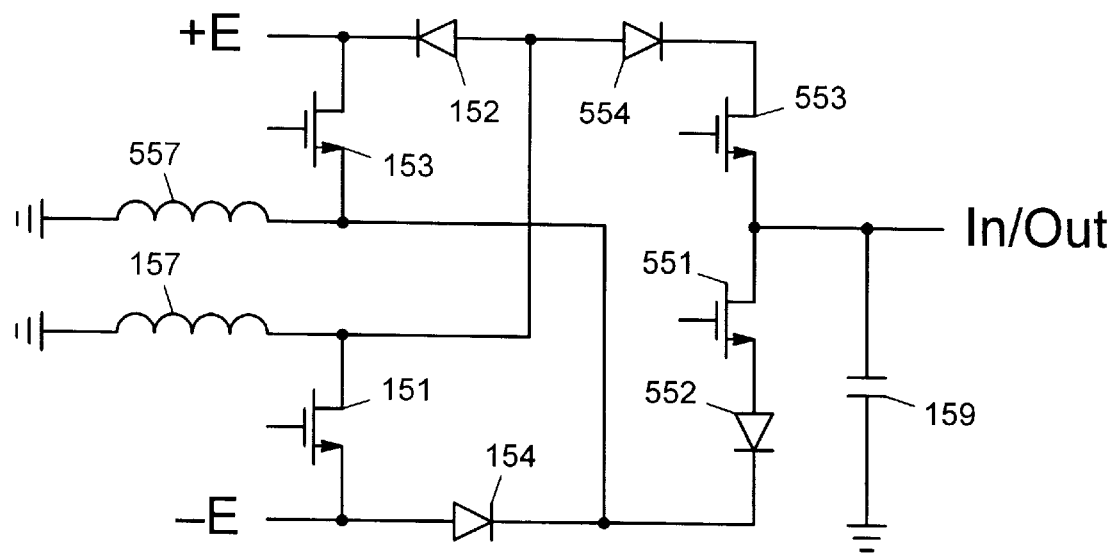
FIG. 15 is an embodiment of a bi-directional I$^2$PS with two grounded inductors.

A bi-directional full-bridge converter with a forward transformer and current output is depicted in FIG. 15 of the co-pending application titled "Low-Cost Switching Power Amplifier and Uninterruptible Power System with Sinusoidal Output," filed on even date herewith. However, the circuit connected to the secondary winding of the transformer is inapplicable. Furthermore, the optional diodes 355 and 356 shown in that embodiment are required for a reliable operation of the converter. The bi-directional full-bridge converter eliminates the capacitor 58 and effectively doubles the battery voltage. In the I²PS implementing the converter, the reduction of the output voltage is accomplished without discharging the battery 50. Pure sinusoidal charging current is attainable even if the single bi-directional switch is used to carry out the battery charging.

Figure 6:
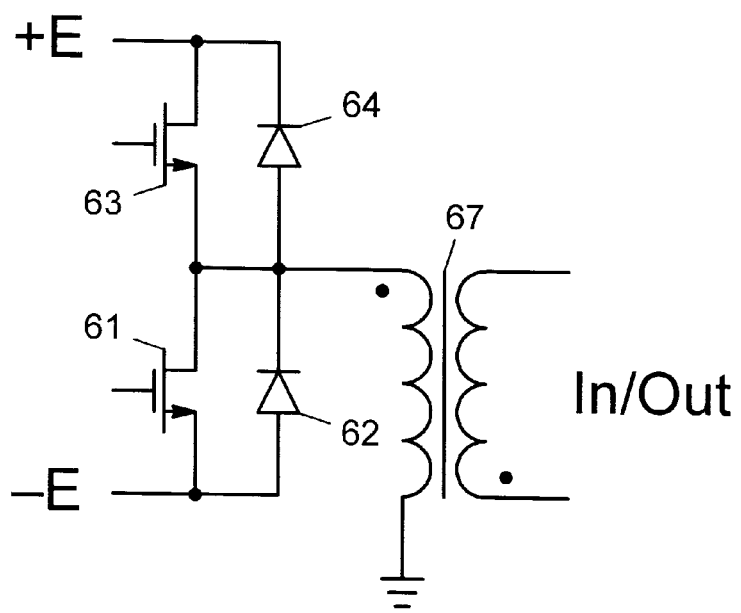
FIG. 6 is an embodiment of a bi-directional half-bridge converter with a flyback transformer and current output.

FIG. 6 is an embodiment of a bi-directional half-bridge converter with a flyback transformer and current output. In contrast to the previous converters, this converter employs the flyback transformer 67 as the single inductive component to accomplish the conversion. A positive supply voltage +E is applied to the drain of the switch 63 and the cathode of the diode 64. A negative supply voltage –E is applied to the source of the switch 61 and the anode of the diode 62. The primary winding is connected to the drain of the switch 61, the source of the switch 63, the cathode of the diode 62 and the anode of the diode 64. The primary winding is grounded. It attains a primary current and provides a return voltage. In response to the primary current, the secondary winding provides the output current of the converter.

The switch 61 turns on to increase the primary current in the respective direction. The switch 63 is turned off. –E is applied across the primary winding. The switch 61 turns off when the primary current reaches a desired level. The diode 64 momentarily takes over the primary current, wherein primary voltage is approximately equal to +E. Subsequently, a bi-directional switch turns on, wherein the output voltage of the I²PS is applied across the secondary winding. For example, the bi-directional switch 21, 22 of FIG. 2 performs this function. The turns ratio of the transformer 67 is chosen so that the primary voltage is greater than –E and smaller than +E. Therefore, the diodes 62 and 64 are cut off even when the output voltage peaks. The bi-directional switch conducts the corrective current. Energy stored in the transformer 67 increases or decreases if the output voltage is positive or negative respectively.

The bi-directional switch can turn off at any time whenever the correction is completed, regardless of any clock signal. If the transformer 67 is reset, the bi-directional switch turns off at zero corrective current. Otherwise, the corrective current is immediately interrupted, wherein the diode 62 or 64 conducts the primary current. The return voltage appearing across the primary winding is limited to the respective supply voltage. Similarly, the switch 63 turns on to increase the primary current in the reverse direction. The switch 61 is turned off. +E is applied across the primary winding. When the switch 63 turns off, the diode 62 applies –E across the primary winding. Subsequently, the bi-directional switch turns on, wherein the diodes 62 and 64 are cut off. Energy stored in the transformer 67 increases or decreases if the output voltage is negative or positive respectively.

The bi-directional conversion is carried out when the power supply is replaced with a pair of grounded batteries or a single battery having a grounded center tap. Moreover, other outputs can be added. For example, the FIG. 2 I²PS requires a secondary center tap for operating two bi-directional switches. During the reverse energy transfer, the switches 61 and 63 are inactive. The bi-directional switch or switches selectively apply the output voltage of the I²PS to the secondary winding. When the bi-directional switch or switches are turned off, at least a portion of energy stored in the transformer 67 is delivered to one of the batteries or to the single battery. The diode 62 or 64 conducts the primary current that decays to zero. The output voltage of the I²PS can be reduced without discharging the battery or batteries. Accordingly, the battery charging is performed when an AC voltage is selectively applied to the secondary winding.

Figure 7:
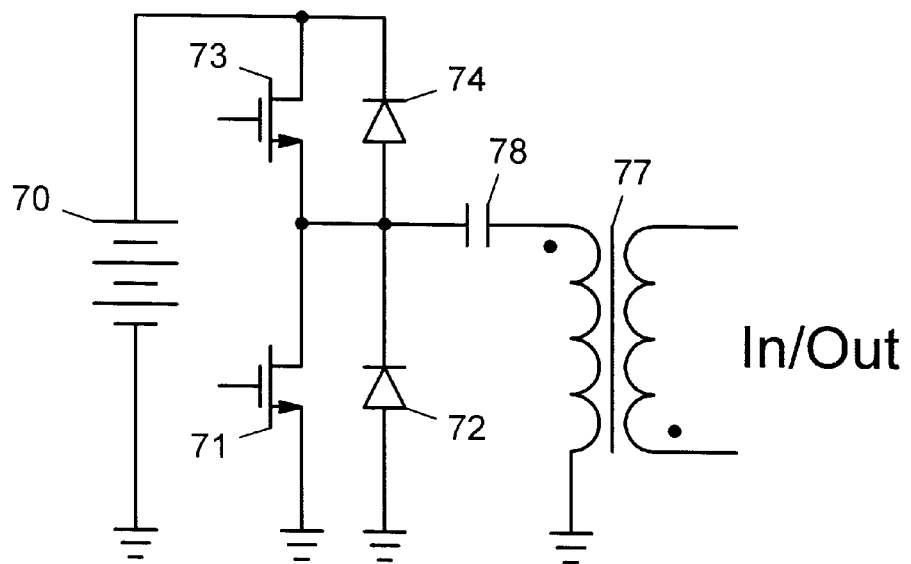
FIG. 7 is the preferred embodiment of a bi-directional half-bridge converter with a flyback transformer and current output.

FIG. 7 is the preferred embodiment of a bi-directional half-bridge converter with a flyback transformer and current output. The converter is based on the FIG. 6 embodiment, whereas the battery 70 provides a single supply voltage. Specifically, the battery voltage is applied to the drain of the switch 73 and the cathode of the diode 74. The capacitor 78 is connected to the drain of the switch 71, the source of the switch 73, the cathode of the diode 72 and the anode of the diode 74. Furthermore, the capacitor 78 is in series with the primary winding of the flyback transformer 77. The battery 70, the source of the switch 71, the anode of the diode 72 and the primary winding are grounded. The secondary winding provides the output current of the converter.

The converter operates analogously to the FIG. 6 converter. The series capacitor 78 is used to simulate a negative supply voltage. The capacitor 78 is charged approximately to one half the battery voltage. The switch 73 turns on to increase the primary current in the respective direction and to charge the capacitor 78. The primary voltage is approximately equal to the battery voltage reduced by the capacitor voltage. The switch 73 turns off when the primary current reaches a desired level. The primary and secondary voltages change polarities. Moreover, the diode 72 briefly applies the primary current to ground. Subsequently, a bi-directional switch turns on to apply the corrective current to an output capacitor that stores the output voltage of the I²PS. For example, the bi-directional switch 21, 22 of the FIG. 2 I²PS applies the corrective current to the output capacitor 29. The turns ratio of the transformer 77 is chosen so that a sum of the primary voltage and the voltage of the capacitor 78 is positive and smaller than the battery voltage, even when the output voltage peaks. Therefore, the diodes 72 and 74 are cut off regardless of amplitude and polarity of the output voltage.

Similarly, the switch 71 turns on to increase the primary current in the reverse direction and to discharge the capacitor 78. The capacitor 78 is effectively grounded and the voltage stored therein is applied across the primary winding. When the switch 71 turns off, the diode 74 briefly applies the primary current to the battery 70. Subsequently, the bi-directional switch applies the corrective current to the output capacitor. When all switches are open, the transformer 77 returns stored energy. The primary current charges the capacitor 78 when the diode 72 conducts. The primary current charges the battery 70 and discharges the capacitor 78 when the diode 74 conducts. The battery charging is performed when an AC voltage is selectively applied to the secondary winding. The bi-directional switch or switches are used to charge the transformer 77. In the latter case, a significantly larger amount of energy can be delivered to the battery 70 during each half-wave of the AC voltage. The converter operates analogously as to reduce the output voltage of the I²PS without discharging the battery 70. An average value of the primary current is zero as to maintain the voltage of the capacitor 78.

Figure 8:
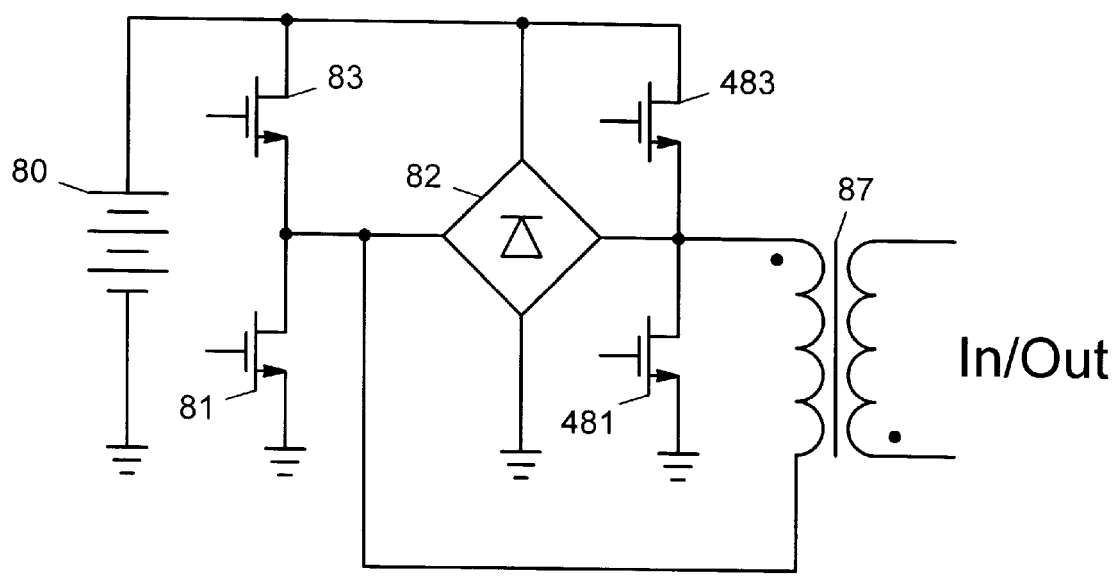
FIG. 8 is an embodiment of a bi-directional full-bridge converter with a flyback transformer and current output.

FIG. 8 is an embodiment of a bi-directional full-bridge converter with a flyback transformer and current output. The converter is based on the FIG. 6 embodiment, whereas each end of the primary winding of the flyback transformer 87 is driven by a pair of switches. The supply voltage provided by the battery 80 is effectively doubled. Specifically, the battery voltage is applied to the drains of the switches 83, 483 and a positive output of the diode bridge 82. One end of the primary winding is tied to the drain of the switch 81, the source of the switch 83 and one input of the bridge 82. The other end is tied to the drain of the switch 481, the source of the switch 483 and the other input of the bridge 82. The battery 80, the sources of the switches 81, 481 and a negative output of the bridge 82 are grounded. The secondary winding provides the output current of the converter.

When the switches 81 and 483 are turned on, the battery voltage is applied across the primary winding. When the switches 81 and 483 turn off, the bridge 82 applies the primary current to the battery 80 and limits the primary voltage. A bi-directional switch, such as 21, 22 of the FIG. 2 I²PS, turns on immediately after the switches 81 and 483 turn off. The turns ratio of the transformer 87 is chosen so that the bridge 82 is cut off even when the output voltage of the I²PS peaks. The bi-directional switch conducts the corrective current, whereas the primary current is zero. The switches 83 and 481 can turn on immediately after the bi-directional switch turns off. In fact, the switches 81, 483, the switches 83, 481 and the bi-directional switch can turn on and off in any order. A dead time is necessary to prevent cross-conduction of the respective switches.

During the reverse energy transfer, the switches 81, 83, 481 and 483 are inactive. The bi-directional switch or switches selectively apply the output voltage of the I²PS to the secondary winding. The output voltage is reduced without discharging the battery 80. The output voltage determines a rate at which the transformer 87 charges, wherein the primary current is zero. When the corrective current is interrupted, the bridge 82 applies the primary current to the battery 80. The battery voltage determines a rate of transformer reset. Similarly, the battery charging is performed when an AC voltage is selectively applied to the secondary winding. The battery charging is carried out regardless of polarity of the primary current as the bridge 82 fully rectifies it.

Figure 9:
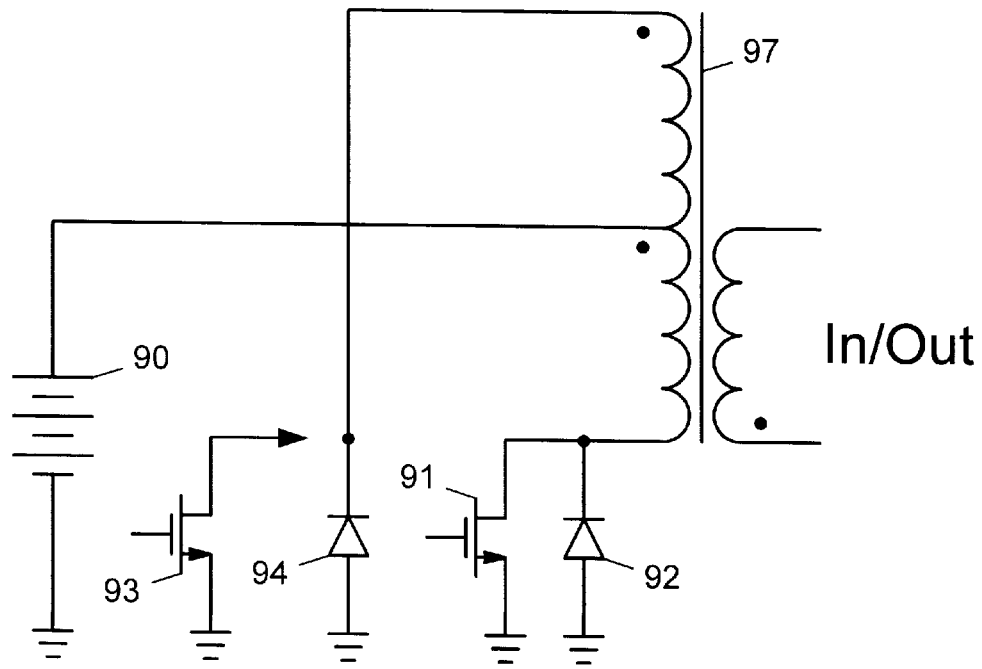
FIG. 9 is an embodiment of a bi-directional flyback or push-pull converter with a flyback transformer and current output.

FIG. 9 is an embodiment of a bi-directional flyback or push-pull converter with a flyback transformer and current output. In the flyback converter, the voltage of the battery 90 is applied to a center tap of the primary winding of the flyback transformer 97. One end of the primary winding is connected to the drain of the switch 91 and the cathode of the diode 92. The other end is connected to the cathode of the diode 94. The battery 90, the source of the switch 91 and the anodes of the diodes 92, 94 are grounded. The secondary winding provides the output current of the converter. The push-pull converter employs the additional switch 93 with the drain and source connected to the cathode of the diode 94 and ground respectively.

The switch 91 turns on to increase the primary current in the respective direction. The battery voltage is applied across the respective half of the primary winding. The voltage appearing across the diode 94 is twice the battery voltage. The switch 91 turns off when the primary current reaches a desired level. The primary and secondary voltages change polarities. Hence, the diode 94 briefly takes over the primary current. The voltage appearing across the switch 91 is limited to twice the battery voltage. Similarly, the switch 93 turns on to increase the primary current in the reverse direction. When the switch 93 turns off, the diode 92 briefly takes over the primary current. A bi-directional switch, such as 21, 22 of FIG. 2, turns on immediately after the switch 91 or 93 turns off. The flyback converter is capable of increasing the primary current in only one direction. Therefore, the converter is used in the FIG. 2 I$^2$PS with two bi-directional switches. Conversely, the push-pull converter can be employed in the I$^2$PS of FIG. 2 or 3 with one bi-directional switch or in the I$^2$PS of FIG. 2 with two bi-directional switches.

The output voltage of the I$^2$PS can be also reduced while the switches 91 and 93 are inactive. The output voltage is selectively applied to the secondary winding, whereas the primary current is zero. The turns ratio of the transformer 97 is chosen so that the diodes 92 and 94 are cut off even when the output voltage peaks. Energy stored in the transformer 97 is increased. When the bi-directional switch turns off, the corrective current collapses to zero. At least a portion of energy stored in the transformer 97 is returned to the battery 90. Similarly, the battery charging is performed when the bi-directional switch or switches selectively apply an AC voltage to the secondary winding. The switches 91 and 93 are inactive and the primary current of the transformer 97 is zero. When the secondary current is interrupted, the diode 92 or 94 applies the primary current to the battery 90. Therefore, the battery charging is carried out regardless of polarity of the primary current.

Figure 10:
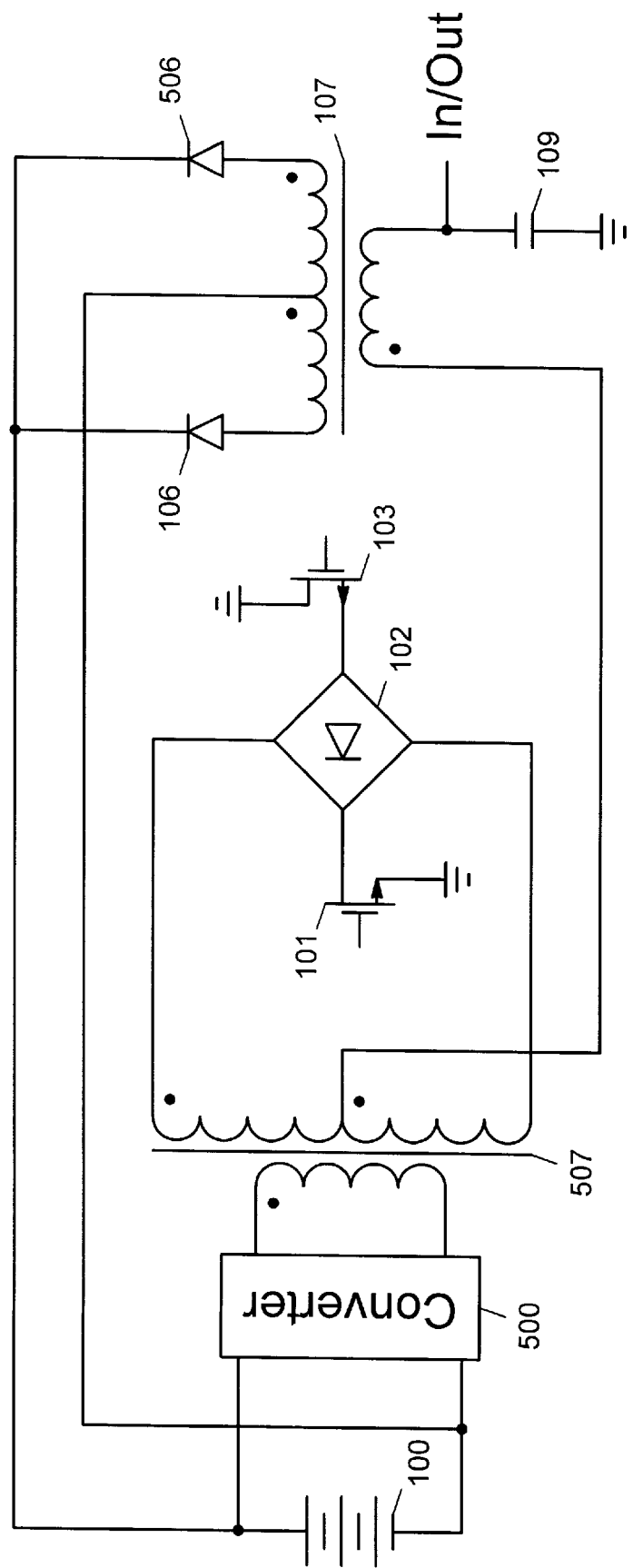
FIG. 10 is an embodiment of a bi-directional I$^2$PS with a DC/AC converter and a flyback transformer.

FIG. 10 is an embodiment of a bi-directional I$^2$PS with a DC/AC converter and a flyback transformer. The DC/AC converter 410 and the flyback transformer 17 are also implemented in the FIG. 1 embodiment; in accordance with the prior art reference. However, there are substantial differences between both embodiments. In particular, the I$^2$PS employs a grounded switching means coupled across the secondary winding of the forward transformer 507. Furthermore, a secondary center tap of that winding is connected to the flyback transformer 107. The I$^2$PS converts a supply voltage into an AC output voltage. The battery 100 supplies the DC/AC converter 500 that converts the battery voltage into the primary voltage at a high frequency. The secondary winding of the transformer 507 is electromagnetically coupled to the primary winding for providing a secondary voltage in response to the primary voltage.

Similarly, the transformer 107 comprises a pair of electromagnetically coupled windings. The primary winding attains the corrective current and the secondary winding provides a return voltage. A rectifying means comprises the diodes 106, 506 and limits the return voltage to the battery voltage. The switching means selectively applies the corrective current to the capacitor 109. The switching means comprises the semiconductors 101 through 103. The diode bridge 102 rectifies the secondary voltage of the transformer 507. The switch 101 or 103 selectively applies the corrective current to ground and thus to the capacitor 109. The output voltage appears thereacross. The converter 500 can employ a conventional half-bridge, full-bridge or push-pull converter. For example, the converter 500 may require an additional supply voltage and/or a primary center tap of the transformer 507.

Specifically, the battery voltage is applied between inputs of the converter 500 switching at the high frequency. The primary winding of the transformer 507 is tied between outputs of the converter 500. The secondary voltage appears across either half of the secondary winding of the transformer 507. Inputs of the bridge 102 are connected across that winding. The drain of the switch 101 and the source of the switch 103 are connected to positive and negative outputs of the bridge 102 respectively. The primary winding of the transformer 107 is connected between the secondary center tap of the transformer 507 and the output of the I$^2$PS. The secondary winding of the transformer 107 is connected between the anodes of the diodes 106 and 506. Positive and negative terminals of the battery 100 are connected to the cathodes of the diodes 106, 506 and the secondary center tap of the transformer 107 respectively. The source of the switch 101, the drain of the switch 103 and the capacitor 109 are grounded. The battery 100 can be grounded if line isolation is unnecessary.

The switch 101 turns on to decrease the output voltage. The switch 103 is turned off. One of two diodes connected to the switch 101 conducts. The voltage across the other diode is approximately equal to twice the secondary voltage of the transformer 507. The secondary voltage is negative and appears at the center tap of the transformer 507. Moreover, the secondary voltage is smaller than the output voltage of the I$^2$PS. The voltage applied across the primary winding of the transformer 107 is approximately equal to a difference between the secondary voltage of the transformer 507 and the output voltage. Positive peak of the output voltage results in peak primary and secondary voltages of the transformer 107. However, the turns ratio of this transformer is chosen so that the diodes 106 and 506 are cut off.

The primary winding of the transformer 107 acts like an inductor carrying the corrective current. At the end of a switching period, the converter 500 changes polarities of the primary and secondary voltages of the transformer 507. Nevertheless, the I$^2$PS operates in the same manner. The other diode connected to the switch 101 simply takes over the corrective current. The switch 101 can turn off at any time, whenever the correction is completed. The switch 101 is effectively coupled in series with the primary winding of the transformer 107. The corrective current is therefore immediately interrupted. The diode 506 conducts the secondary current of the transformer 107. At least a portion of energy stored therein is returned to the battery 100. Similarly, the switch 103 turns on to increase the output voltage. The operation of the I$^2$PS is analogous, whereas the secondary voltage appearing at the center tap of the transformer 507 is positive.

Therefore, the secondary voltage appears at the secondary tap of the transformer 507 when the switch 101 or 103 is turned on. Polarity of that voltage is negative or positive respectively. The corrective current is equal to the primary current of the transformer 107 and the secondary current of the transformer 507. The corrective current flows also through the switch 101 or 103 and the bridge 102 to the capacitor 109. The corrective current is proportional to the primary current of the transformer 507. However, the corrective current is zero when both switches 101 and 103 are turned off. At least a portion of energy stored in the transformer 107 is delivered to the battery 100. Since load conditions can change at any time, the diode 106 or 506 can conduct before the switch 101 or 103 turns on and/or after it turns off. This is determined exclusively by corrective current polarity that the closing of the switch 101 or 103 does not necessarily affect. In any case, the secondary voltage of the transformer 107 is limited to the battery voltage. Accordingly, the primary voltage is also limited. The reverse energy flow continues until the transformer 107 is reset or one of the switches 101 or 103 turns on.

The output voltage can be reduced without discharging the battery 100. On the contrary, some energy stored in the capacitor 109, and possibly the load, is returned to the battery 100. Specifically, the switch 101 turns on when the output voltage is positive and too high. The state of the switch 103 is insignificant. The switch 101 and the pair of diodes connected thereto conduct the corrective current. Moreover, the converter 500 is disabled. The primary winding of the transformer 507 is effectively disconnected or shorted. In either case, the transformer 507 acts like a conductor. Both ends of the secondary winding, and thus the secondary center tap, are effectively grounded. Consequently, the output voltage is applied across the primary winding of the transformer 107. The diodes 106 and 506 are cut off.

When the switch 101 turns off, the corrective current is immediately interrupted. Energy stored in the transformer 107 is fed back via the diode 506 to the battery 100. Similarly, the switch 103 is energized when the output voltage is negative and too low. The I$^2$PS is symmetrical and operates analogously. This method of reducing the output voltage is somewhat ineffective near zero crossing thereof. The rate at which the corrective current increases may be insufficient. The battery charging is performed when an AC voltage is applied across the capacitor 109. The operation of the I$^2$PS remains the same. In particular, the AC voltage, regardless of its polarity, is applied across the primary winding of the transformer 107 if both switches 101 and 103 are turned on. The secondary current of the transformer 107 starts to charge the battery 100 when the switch conducting the primary current of the transformer 107 turns off.

FIG. 11 is an embodiment of an I$^2$PS with a floating inductor. A corresponding converter suitable for implementation in the I$^2$PS of FIG. 2 or 3 is shown in FIG. 4. In contrast to all previous embodiments, the instant I$^2$PS employs the inductor 117 as the single inductive component to accomplish the conversion. This eliminates many inherent flaws of a transformer, such as leakage inductances and inter-winding capacitances. However, a second inductor can be added to decrease ripple of the output voltage. This is pointed out in reference to the FIG. 4 embodiment. A power supply provides positive and negative supply voltages, +E and −E respectively. The supply voltages may derive from a pair of capacitors charged to peaks of the line voltage via a pair of diodes. The inductor 117 attains a current and provides a return voltage. The diode bridge 112 rectifies and limits the return voltage to the supply voltages. A first switching means comprises the switches 111 and 113 for selectively applying the supply voltages to the inductor 117. A second switching means comprises a bi-directional switch for selectively applying the inductor current to the capacitor 119.

Specifically, +E is applied to the drain of the switch 113 and a positive output of the diode bridge 112. −E is applied to the source of the switch 111 and a negative output of the bridge 112. One end of the inductor 117 is connected to the drain of the switch 111, the source of the switch 113 and one input of the bridge 112. The other end is connected to the bi-directional switch and the other input of the bridge 112. Therefore, the bridge 112 limits voltages appearing at either end of the inductor 117 to +E and −E. The bi-directional switch comprises the switch 115 and the diode bridge 116. A voltage appearing across the bridge 116 is rectified and applied between the drain and source of the switch 115. The bi-directional switch is turned on or off when the switch 115 is on or off respectively. The bi-directional switch is in series with the grounded capacitor 119 that provides the output voltage of the I$^2$PS.

The switch 111 turns on to decrease the output voltage. The switch 113 is turned off. If the diode paralleling the switch 111 conducts the inductor current, the switch 111 turns on substantially at zero voltage. By contrast, the switch 115 remains open until the inductor current drops to zero. If the inductor 117 is discharged or the diode paralleling the switch 113 conducts the inductor current, the switches 111 and 115 turn on simultaneously. In the former case, the switches 111 and 115 turn on at zero current. When the switch 115 is conductive, the voltage applied across the inductor 117 is approximately equal to a difference between −E and the output voltage. The corrective current is equal to the inductor current. The switch 115 can turn off at any time, whenever the correction is completed. The flow of the corrective current is interrupted instantaneously. The switch 111 can turn off simultaneously, wherein the bridge 112 limits the voltage across the inductor 117 to the supply voltages. The inductor current drops at a highest rate.

Moreover, the switch 111 can remain closed so that the inductor current continues to flow through this switch and the respective diode of the bridge 112. The voltage across the inductor 117 is near zero, wherein the inductor current remains virtually constant. This may be very advantageous. When the switch 115 turns on again, the corrective current can immediately assume the upheld value of the inductor current. Similarly, the switch 113 turns on to increase the output voltage. The switch 111 is turned off. The corrective current is supplied when the switch 115 is turned on. The voltage applied across the inductor 117 is equal to a difference between +E and the output voltage. The switch 115 can turn off at any time, wherein the corrective current is interrupted instantaneously. If the switch 113 remains closed, the inductor 117 is effectively shorted and the inductor current is upheld. Otherwise, the bridge 112 limits a voltage across the inductor 117 to the supply voltages. The inductor current drops at the highest rate.

The inductor current may have opposite polarity than polarity necessary to accomplish the correction. Some time has to expire before the inductor current drops to zero and builds up in the desired direction. With all switches open, the inductor 117 discharges at a highest rate. However, the rate may be significantly lower if the switch 115 carries the corrective current. In particular, the rate is minimal when the output voltage is at a peak and the switch 115 closes prematurely so that the voltage across the inductor 117 is minimal. A comparator with hysteresis can be used to sense polarity of the voltage across the inductor 117. By these means, polarity of the inductor current is established when one switch is closed or when all switches are open. The correction can start when the inductor current is zero or has desired polarity. Two comparators can be used to determine polarity of the inductor current at any time. This is pointed out hereinafter. The converter is incapable of charging the inductor 117 without drawing a current from the power supply. Therefore, the converter is unidirectional. Voltage ratings of the components can be established. For example, the supply voltages +E and −E are +180 Vdc and −180 Vdc respectively. The I$^2$PS produces 120 Vac output voltage that ranges from −170 Vdc to +170 Vdc. Peak voltage of the components 111 through 113 is 360 Vdc. Peak voltage of the components 115 and 116 is 350 Vdc.

FIG. 12 is an embodiment of a bi-directional I$^2$PS with a floating inductor. A corresponding converter suitable for implementation in the I$^2$PS of FIG. 2 or 3 is shown in FIG. 5. The instant I$^2$PS is based on the FIG. 11 embodiment, whereas the bi-directional conversion is accomplished. Furthermore, a second inductor can be added to decrease ripple of the output voltage. This is pointed out in reference to the FIG. 4 embodiment. The voltage of the battery 120 is applied to the drain of the switch 123 and a positive output of the diode bridge 122. One end of the inductor 127 is connected to the drain of the switch 121 and the source of the switch 123. The other end is connected to a bi-directional switch. The inductor 127 is also connected between inputs of the bridge 122. By these means, a voltage appearing across the inductor 127 is rectified and limited to the battery voltage. The bi-directional switch consists of the switch 125 and the diode bridge 126. The capacitor 128 stores a DC voltage in response to the corrective current. The capacitor 128 is connected to the bi-directional switch and the cathode of the diode 522. It is also in series with the capacitor 129 that provides the output voltage of the I$^2$PS. The battery 120, the source of the switch 121, a negative output of the bridge 122, the anode of the diode 522 and the capacitor 129 are grounded.

The I$^2$PS operates analogously to the FIG. 11 I$^2$PS. The corrective current is supplied when the switch 125 is turned on. It is equal to the current of the inductor 127. Moreover, the corrective current flows through the additional capacitor 128 that is charged approximately to one half the battery voltage. Only one of the switches 121 or 123 can be closed. When the switch 121 is turned on, a sum of the voltages stored in the capacitors 128 and 129 is applied across the inductor 127. When the switch 123 is turned on, a difference between the battery voltage and that sum is applied across the inductor 127. The switch 125 can turn off at any timer whenever the correction is completed. The flow of the corrective current is interrupted instantaneously. The switch 121 or 123 can turn off simultaneously, wherein the bridge 122 limits the voltage across the inductor 127 to the battery voltage. The inductor current drops at a highest rate. Furthermore, the switch 121 or 123 can remain closed as to uphold the inductor current.

The battery charging is performed when an AC voltage, having a low frequency, is applied across the capacitor 129. The switch 123 is inactive. Preferably, the switch 125 is permanently closed as to maintain a continuous charging current. However, the inductor current charges the battery 120 only when the AC voltage is positive. The switch 121 turns on to apply the sum of the capacitor voltages across the inductor 127. When the switch 121 turns off, energy stored in the inductor 127 is fed back via the bridge 122 to the battery 120. The inductor current discharges the capacitor 128. When the AC voltage is negative, the switch 121 is turned off. The capacitor 128 recharges up to a peak level of the AC voltage through the diode 522. That level is smaller than one half the battery voltage. Therefore, the voltage stored in the capacitor 128 is usually reduced during the battery charging.

Figure 13:
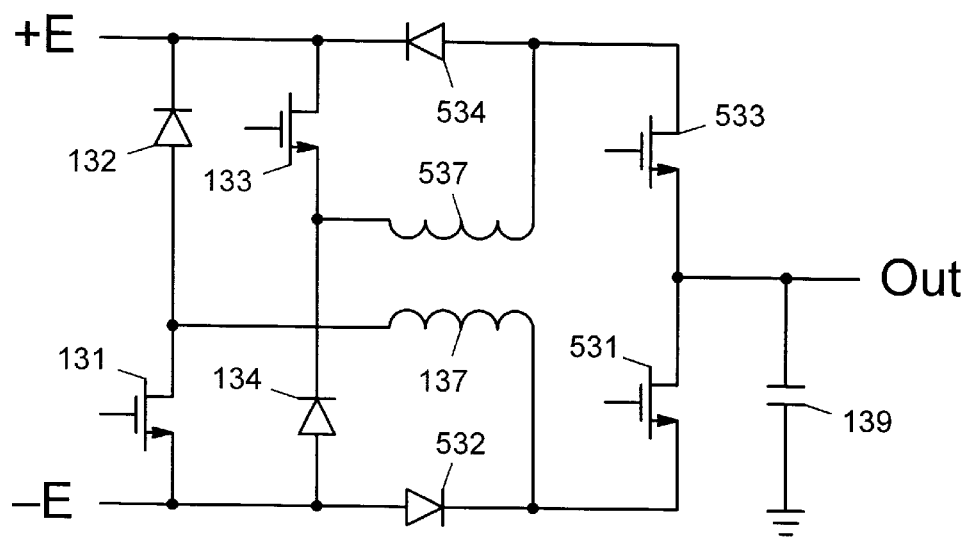
FIG. 13 is an embodiment of an I$^2$PS with two floating inductors.

The components 120, 128 and 522 can be implemented in the other unidirectional I$^2$PSs, such as the FIG. 13 embodiment, to accomplish the bi-directional conversion. Differences between FIGS. 11 and 12 illustrate this modification. Specifically, the battery 120 is substituted for the power source providing the supply voltages +E and −E of FIG. 11. Accordingly, +E becomes the battery voltage, whereas −E is at ground potential. The diode 522 and the capacitor 128 are added. Both components are connected between the bi-directional switch and the capacitor 129. The corresponding components in the FIG. 11 I$^2$PS are the bi-directional switch 115, 116 and the capacitor 119. Differences between the I$^2$PSs of FIGS. 21 and 22 pertain to a similar modification.

FIG. 13 is an embodiment of an I$^2$PS with two floating inductors attaining unidirectional currents. The converters of FIGS. 4 through 9 each employ a single inductive component for attaining a bi-directional inductor current. The implementation in the I$^2$PS of FIG. 2 with two bi-directional switches is required to rapidly reverse polarity of the corrective current. Other embodiments, such as the FIG. 11 I$^2$PS, also employ a single inductive component for attaining a bi-directional inductor current. However, this current often has opposite polarity than polarity necessary to accomplish the correction. Some time has to expire before the inductor current drops to zero and builds up in the desired direction. This results in a higher ripple of the output voltage. Furthermore, other embodiments, such as the FIG. 11 I$^2$PS, employ at least one pair of complementary switches coupled across a power supply. Each pair conducts the corrective current and requires a dead time in order to prevent cross-conduction of the switches. This also contributes to the increased ripple level. The employment of two floating inductors solves those problems. A similar technique is disclosed in the abovementioned "Ultra Efficient Switching Power Amplifier," U.S. Pat. No. 4,980,649 dated Dec. 25, 1990, by the same inventor.

A positive supply voltage +E is applied to the drain of the switch 133 and the cathodes of the diodes 132, 534. A negative supply voltage −E is applied to the source of the switch 131 and the anodes of the diodes 134, 532. One end of the inductor 137 is connected to the drain of the switch 131 and the anode of the diode 132. The other end is connected to the source of the switch 531 and the cathode of the diode 532. Similarly, one end of the inductor 537 is connected to the source of the switch 133 and the cathode of the diode 134. The other end is connected to the drain of the switch 533 and the anode of the diode 534. The drain of the switch 531 and the source of the switch 533 are connected to the grounded capacitor 139. The output voltage appears thereacross.

The switch 531 turns on to decrease the output voltage. The corrective current is equal to the current of the inductor 137. If the switch 131 is turned on, the corrective current increases. The voltage applied across the inductor 137 is equal to a difference between −E and the output voltage. If the switch 131 is turned off, the corrective current decreases. The voltage across the inductor 137 is equal to a difference between +E and the output voltage. The switch 531 can turn off at any time, whenever the correction is completed. The flow of the corrective current is interrupted instantaneously. The switch 131 can turn off simultaneously, wherein the diodes 132 and 532 limit the voltage across the inductor 137 to +E and −E respectively. The inductor current drops at a highest rate. However, the switch 131 can remain closed so that the inductor current continues to flow through this switch and the diode 532. The voltage across the inductor 137 is near zero, wherein the inductor current remains virtually constant. This may be very advantageous. When the switch 531 turns on again, the corrective current can immediately assume the upheld value of the inductor current.

Similarly, the switch 533 turns on to increase the output voltage. The corrective current is equal to the current of the inductor 537. The corrective current increases or decreases if the switch 133 is turned on or off respectively. The switch 533 can turn off at any time, wherein the corrective current is interrupted instantaneously. The switch 133 can turn off simultaneously, wherein the current of the inductor 537 drops at a highest rate. However, the switch 133 can remain closed as to uphold that inductor current. The currents flowing through the inductors 137 and 537 are unidirectional and independently developed. Moreover, these currents can offset one another regardless of states of the switches 131 and 133. Specifically, the corrective current is equal to the current of the inductor 137 or 537 if the switch 531 or 533 is closed respectively. However, the corrective current is equal to a difference between both inductor currents if both switches 531 and 533 are closed. In particular, the corrective current is zero if the switches 531 and 533 are open or if both switches are closed and the inductors 137, 537 carry even currents.

Figure 14:
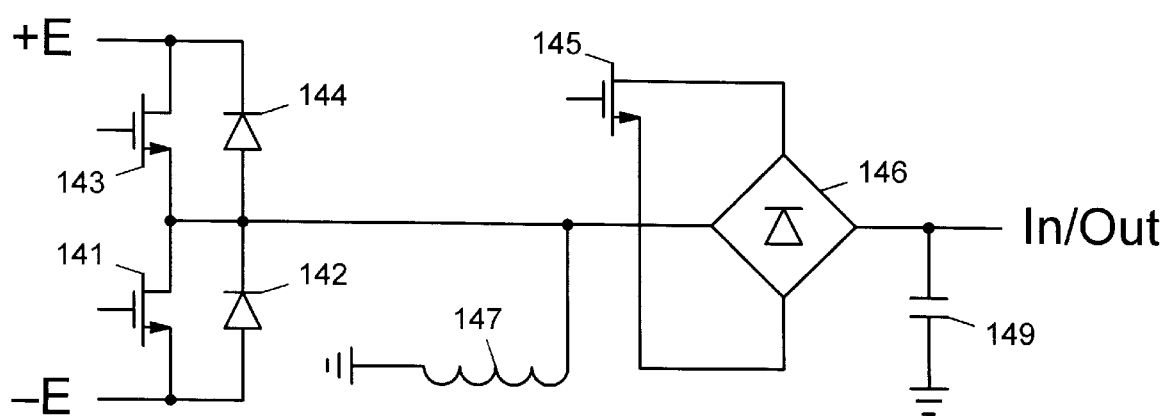
FIG. 14 is an embodiment of a bi-directional I$^2$PS with a grounded inductor.

FIG. 14 is an embodiment of a bi-directional I$^2$PS with a grounded inductor. A positive supply voltage +E is applied to the drain of the switch 143 and the cathode of the diode 144. A negative supply voltage −E is applied to the source of the switch 141 and the anode of the diode 142. The inductor 147 is connected to the drain of the switch 141, the source of the switch 143, the cathode of the diode 142, the anode of the diode 144 and a bi-directional switch. The bi-directional switch consists of the switch 145 and the diode bridge 146. A voltage applied across the bridge 146 is rectified and applied between the drain and source of the switch 145. The bi-directional switch is in series with the capacitor 149 that provides the output voltage of the I$^2$PS. The inductor 147 and the capacitor 149 are grounded. A battery can be used if a capacitor is added between the components 141 through 144 and 146, 147. Differences between FIGS. 4 and 5 pertain to this modification. The series capacitor stores a DC voltage in response to the inductor current.

The switch 141 turns on to increase the output voltage. The remaining switches 143 and 145 are turned off. The voltage applied across the inductor 147 is approximately equal to −E. When the inductor current reaches a desired level, the switch 141 turns off. The voltage across the inductor 147 is limited to +E as the diode 144 temporarily takes over the inductor current. The switch 145 turns on after a transitory dead time that allows the switch 141 to completely turn off. The corrective current is applied to the capacitor 149 and is equal to the inductor current. The switch 145 can turn off at any time, whenever the correction is completed. The flow of the corrective current is interrupted instantaneously. Again, the diode 144 takes over the inductor current. However, if polarity thereof has changed during the turn-on phase of the switch 145 then the diode 142 conducts the inductor current. Similarly, the switch 143 turns on to decrease the output voltage. The remaining switches 141 and 145 are turned off. When the switch 143 turns off, the diode 142 temporarily takes over the inductor current. After the dead time, the switch 145 turns on to apply the corrective current to the capacitor 149. The switch 145 can turn off at any time, wherein the corrective current collapses to zero. The diode 142 or 144 takes over the inductor current.

The output voltage can be reduced merely by energizing the switch 145 while the switches 141 and 143 are inactive. Some energy stored in the capacitor 149, and possibly the load, is returned to the power supply. Specifically, the switch 145 turns on if the output voltage is positive and too high or negative and too low. The output voltage is effectively applied across the inductor 147. The switch 145 turns off when the output voltage is reduced to a desired level. The respective diode 142 or 144 automatically takes over the inductor current. This method is somewhat ineffective near zero crossing of the output voltage. The rate at which the corrective current increases may be insufficient. Furthermore, the bi-directional switch requires a minimum turn-on voltage to operate.

Only one switch may be closed at a time. In particular, the dead time is necessary when the switch 141 or 143 turns off and before the switch 145 starts to conduct the corrective current. However, the inductor current can be applied immediately to the output if the bi-directional switch consists of two unidirectional switches. This topology is shown in FIG. 3, whereas the respective ground reference is inapplicable. One of the unidirectional switches turns on at zero voltage and zero current. That switch takes over the inductor current, as pointed out hereinbefore. The bi-directional conversion is carried out when the power supply is replaced with a pair of grounded batteries or a single battery having a grounded center tap. The battery charging is performed when an AC voltage is applied across the capacitor 149. The switch 145 is energized as if to reduce that voltage. Again, the switches 141 and 143 are inactive.

FIG. 15 is an embodiment of a bi-directional I$^2$PS with two grounded inductors attaining unidirectional currents. The inductors 157 and 557 are used to independently develop the unidirectional currents, eliminate the burdensome dead time and provide a differential corrective current. A positive supply voltage +E is applied to the drain of the switch 153 and the cathode of the diode 152. A negative supply voltage −E is applied to the source of the switch 151 and the anode of the diode 154. The inductor 157 is tied to the drain of the switch 151 and the anodes of the diodes 152, 554. The inductor 557 is tied to the source of the switch 153 and the cathodes of the diodes 154, 552. The source of the switch 551 is connected to the anode of the diode 552. The drain of the switch 553 is connected to the cathode of the diode 554. The drain of the switch 551 and the source of the switch 553 are connected to the capacitor 159 that provides the output voltage of the I$^2$PS. The inductors 157, 557 and the capacitor 159 are grounded.

The switches 151 and 553 turn on to increase the output voltage. The voltage applied across the inductor 157 is approximately equal to −E. Moreover, the switch 553 turns on at zero voltage and zero current since the diode 554 is cut off. When the current of the inductor 157 reaches a desired level, the switch 151 turns off. The switch 553 and the diode 554 take over that inductor current. Consequently, the corrective current is equal thereto. The switch 553 can turn off at any time, whenever the correction is completed. The flow of the corrective current is interrupted instantaneously. The diode 152 takes over the current of the inductor 157, wherein the voltage across that inductor is limited to +E. Similarly, the switches 153 and 551 turn on to decrease the output voltage. The voltage applied across the inductor 557 is approximately equal to +E. When the switch 153 turns off, the switch 551 and the diode 552 take over the current of the inductor 557. The corrective current is equal to that current. The switch 551 can turn off at any time to immediately interrupt the corrective current. The diode 154 limits the voltage across the inductor 557 to −E.

The output voltage can be reduced by energizing the switch 551 or 553 only. Some energy stored in the capacitor 159, and possibly the load, is returned to the power supply. Specifically, the switch 551 turns on if the output voltage is positive and has to be decreased. The output voltage is effectively applied across the inductor 557. When the switch 551 turns off, the diode 154 takes over the current of that inductor. Similarly, the switch 553 turns on if the output voltage is negative and has to be increased. The output voltage is effectively applied across the inductor 157. When the switch 553 turns off, the diode 152 takes over the current of that inductor. This method is somewhat ineffective near zero crossing of the output voltage. The rate at which the respective inductor current increases may be insufficient.

The currents flowing through the inductors 157 and 557 are unidirectional and independently developed. Moreover, these currents can offset one another if the switches 151 and 153 are turned off. Specifically, the corrective current is equal to the current of the inductor 157 or 557 if the switch 553 or 551 is closed respectively. However, the corrective current is equal to a difference between both inductor currents if both switches 551 and 553 are closed. In particular, the corrective current is zero if the switches 551 and 553 are open or if both switches are closed and the inductors 157, 557 carry even currents. The bi-directional conversion is carried out when the power supply is replaced with a pair of grounded batteries or a single battery having a grounded center tap. The battery charging is performed when an AC voltage is applied across the capacitor 159. The switches 551 and 553 are energized when the AC voltage is positive or negative respectively, as if to reduce that voltage. The switches 151 and 153 are inactive.

Figure 16:
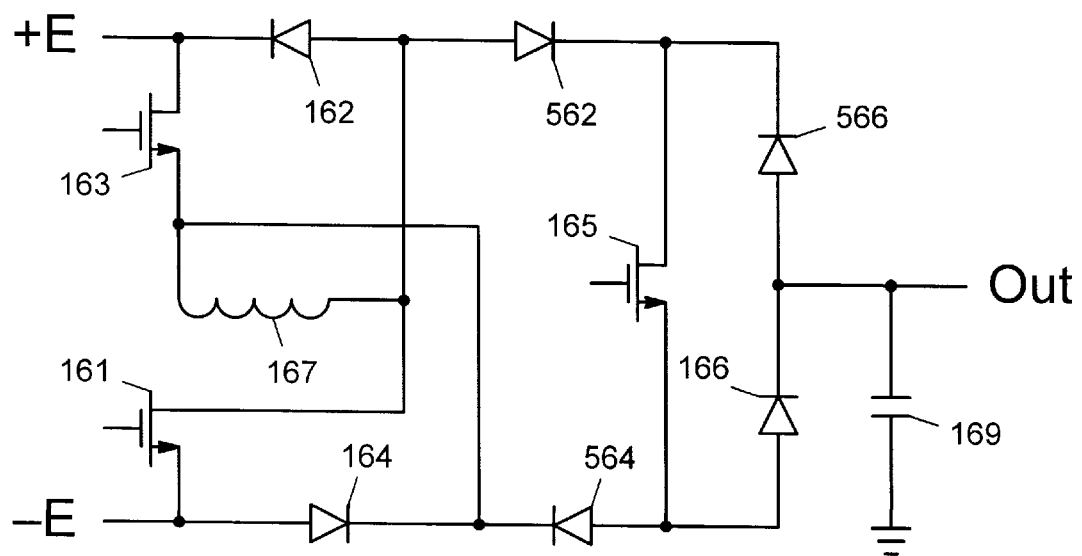
FIG. 16 is the preferred embodiment of an I$^2$PS with a single inductor attaining a unidirectional current.

FIG. 16 is the preferred embodiment of an I²PS with a single inductor attaining a unidirectional current. The I²PS maintains main advantages of designs, such as shown in FIG. 13, in which unidirectional inductor currents are independently developed. These advantages are lack of the dead time and instantaneous availability of the corrective current having desired polarity. However, in contrast to those designs, only one inductor is used. A positive supply voltage +E is applied to the drain of the switch 163 and the cathode of the diode 162. A negative supply voltage −E is applied to the source of the switch 161 and the anode of the diode 164. One end of the inductor 167 is tied to the drain of the switch 161 and the anodes of the diodes 162, 562. The other end is tied to the source of the switch 163 and the cathodes of the diodes 164, 564. The switch 165 has the source connected to the anodes of the diodes 166, 564 and the drain connected to the cathodes of the diodes 562, 566. The cathode of the diode 166 and the anode of the diode 566 are connected to the grounded capacitor 169. The output voltage appears thereacross.

The switches 161 and 165 turn on to decrease the output voltage. The voltage applied across the inductor 167 is approximately equal to a difference between −E and the output voltage. The corrective current is equal to the inductor current. The switches 161, 165 and the diodes 564, 566 apply the corrective current to the capacitor 169. When the output voltage reaches a desired level, the switches 161 and 165 turn off. The flow of the corrective current is interrupted instantaneously. The diodes 162 and 164 take over the inductor current. Similarly, the switches 163 and 165 turn on to increase the output voltage. The voltage applied across the inductor 167 is approximately equal to a difference between +E and the output voltage. The switches 163, 165 and the diodes 166, 562 conduct the corrective current that is equal to the inductor current. When the output voltage reaches a desired level, the switches 163, 165 turn off and instantaneously interrupt the corrective current. Again, the diodes 162 and 164 take over the inductor current.

The inductor current can change at various rates between the corrections of the output voltage. The switches 161 and 163 determine polarity of the corrective current. By contrast, the switch 165 controls presence of the corrective current. If one of the switches 161, 163 and the switch 165 are closed, the corrective current is equal to the increasing inductor current. If all switches are turned off, +E and −E are applied to the inductor 167. The inductor current drops at a highest rate. However, the switch 161 or 163 that conducts the corrective current can remain closed. The inductor current continues to flow through that switch and the diode 164 or 162 respectively, after the switch 165 turns off. The voltage across the inductor 167 is near zero, wherein the inductor current remains practically constant. When the switch 165 turns on again, the corrective current immediately assumes the upheld value of the inductor current.

Furthermore, it may be necessary to change polarity of the corrective current in a consecutive switching cycle. This can be accomplished by simultaneously switching all switches. If that is disadvantageous, the switch 165 can remain closed to uphold the inductor current. When the switches 161 and 163 are turned off, the inductor current flows through the switch 165 and the diodes 562, 564. Therefore, the inductor 167 is effectively shorted. When the switch 161 or 163 turns on, the corrective current immediately flows in the desired direction at the upheld level. Finally, if both switches 161 and 163 are turned on, +E and −E are applied to the inductor 167. The inductor current ramps up at a highest rate. The switch 165 turns on at zero voltage and zero current. When the switch 161 or 163 turns off, the corrective current immediately assumes the increased value of the inductor current.

Figure 17:
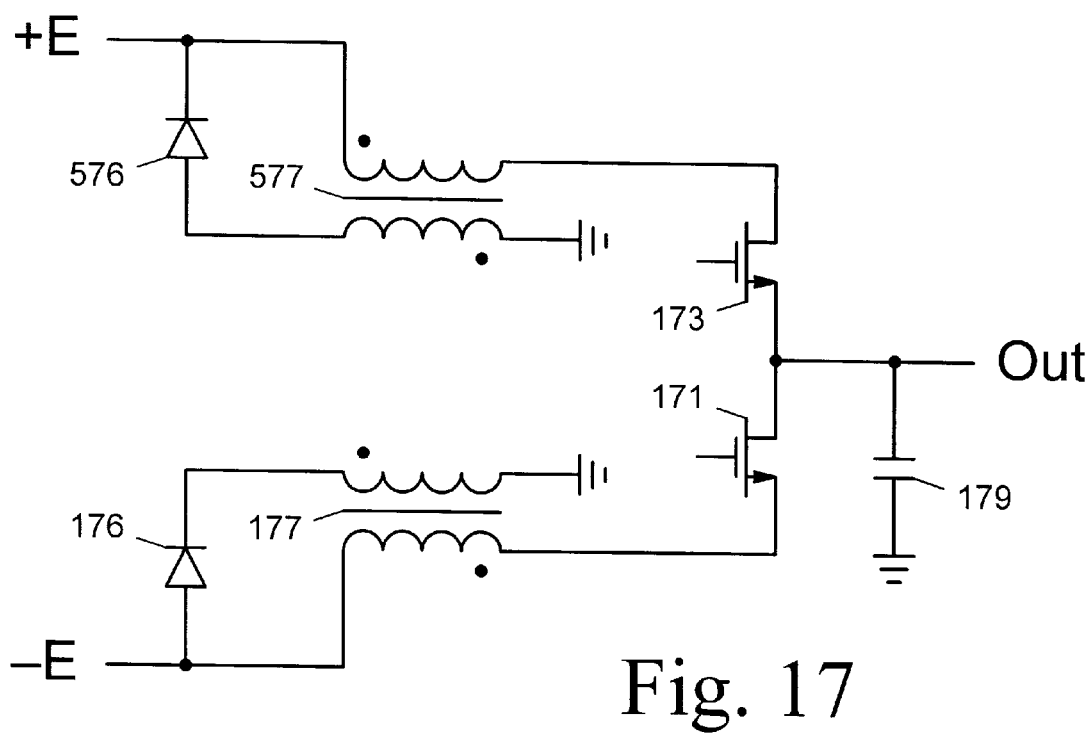
FIG. 17 is an embodiment of a two-switch I$^2$PS with two flyback transformers. An equivalent I$^2$PS is shown in FIG. 25.
Figure 25:
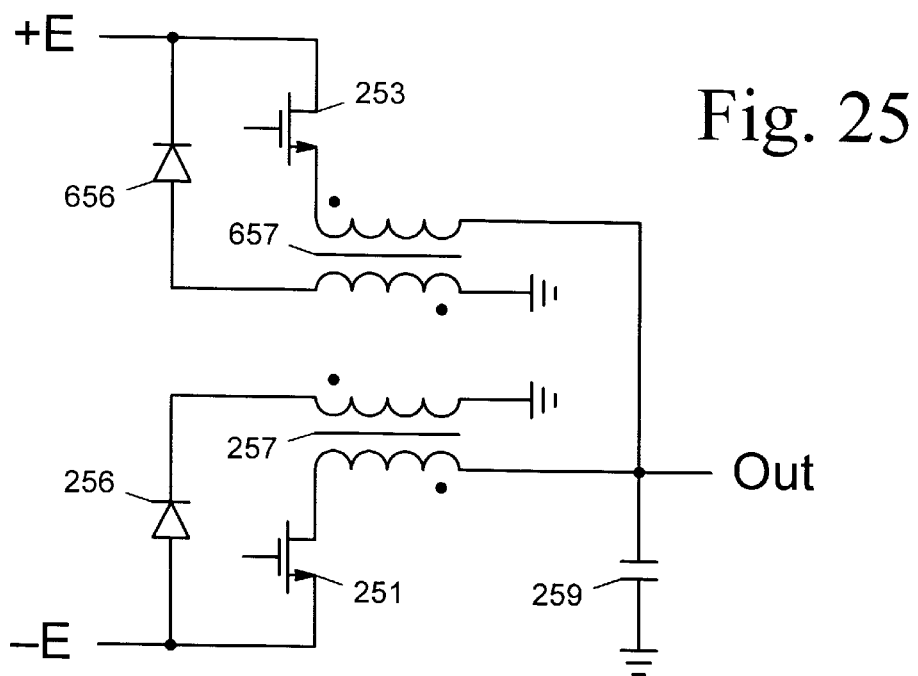
FIG. 25 is the preferred embodiment of a two-switch I²PS with two flyback transformers. An equivalent I²PS is shown in FIG. 17.

FIG. 17 is an embodiment of a two-switch I²PS with two flyback transformers. An equivalent two-switch I²PS is shown in FIG. 25. Main advantages of both I²PSs are utter simplicity and reduced cost. Moreover, the transformers are used to independently develop unidirectional primary currents, similarly to the two-inductor designs. Some advantages of this method are discussed hereinabove. The transformers represent an inductive means that attains the primary currents and provides return voltages. A pair of switches selectively applies the primary currents to the power supply. A pair of diodes limits the return voltages when the corrective current is substantially equal to zero. An output capacitor is connected to both switches for providing the output voltage in response to the corrective current. The switches are tied together, which facilitates their thermal management and integration into a power module.

Specifically, a positive supply voltage +E is applied to the cathode of the diode 576 and the primary winding of the flyback transformer 577. A negative supply voltage −E is applied to the anode of the diode 176 and the primary winding of the flyback transformer 177. The primary and secondary windings of the transformer 177 are tied to the source of the switch 171 and the cathode of the diode 176 respectively. The primary and secondary windings of the transformer 577 are tied to the drain of the switch 173 and the anode of the diode 576 respectively. The drain of the switch 171 and the source of the switch 173 are connected to the capacitor 179 that provides the output voltage of the I²PS. Both secondary windings and the capacitor 179 are grounded. The switches 171 and 173 are in series with the primary windings of the transformers 177 and 577 respectively. Only the order of these connections is rearranged in the FIG. 25 I²PS. The description of the FIG. 25 I²PS includes the circuit operation. The instant I²PS operates analogously.

Figure 18:
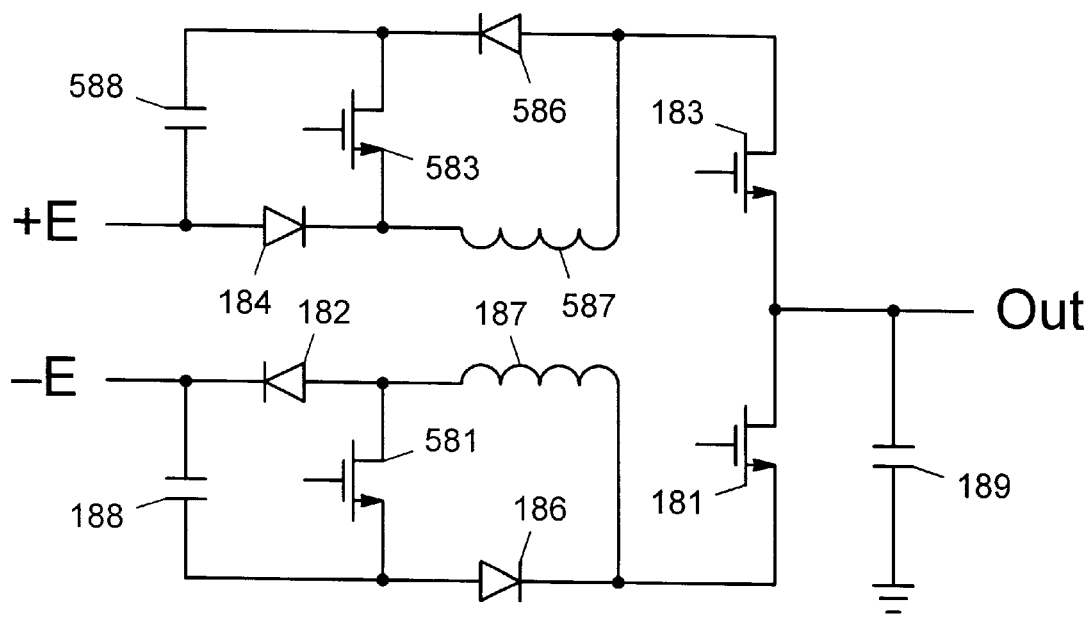
FIG. 18 is an embodiment of a transformer-less I$^2$PS boosting up the output voltage.

FIG. 18 is an embodiment of a transformer-less I²PS boosting up the output voltage. Two inductors are used to independently develop unidirectional currents. Some advantages of this method are discussed hereinabove. In particular, the corrective current can immediately assume desired polarity and possibly an upheld level. The burdensome dead time of switches is eliminated, wherein a differential corrective current can be produced. The latter benefit is essential for achieving highest fidelity of the boosted output voltage. In reference to the FIG. 33 I²PS, the topology of the instant I²PS may be considered reverse due to the order in which components performing similar function are connected. Specifically, the components 181 through 184, 186 through 189, 581, 583 and 586 through 588 correspond to the components 331 through 334, 336 through 339, 731, 733 and 736 through 738 of FIG. 33 respectively.

A positive supply voltage +E is applied to the anode of the diode 184 and one electrode of the capacitor 588. The other electrode is connected to the drain of the switch 583 and the cathode of the diode 586. A negative supply voltage −E is applied to the cathode of the diode 182 and one electrode of the capacitor 188. The other electrode is connected to the source of the switch 581 and the anode of the diode 186. The inductor 187 is tied to the source of the switch 181 and the cathode of the diode 186 at one end, and to the drain of the switch 581 and the anode of the diode 182 at the other end. Likewise, the inductor 587 is tied to the drain of the switch 183 and the anode of the diode 586 at one end, and to the source of the switch 583 and the cathode of the diode 184 at the other end. The drain of the switch 181 and the source of the switch 183 are connected to the grounded capacitor 189 that provides the output voltage of the I²PS.

Figure 33:
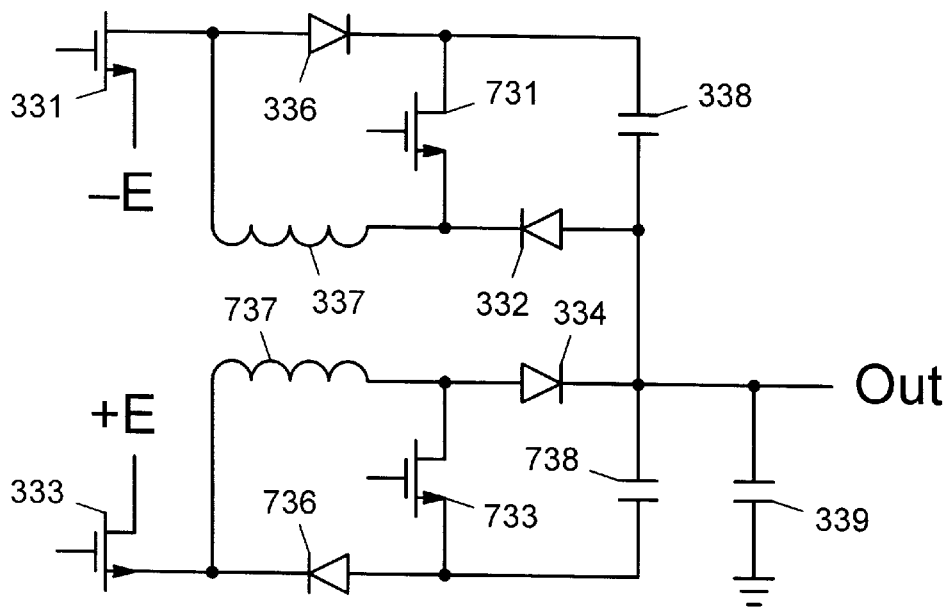
FIG. 33 is the preferred embodiment of a transformerless I²PS boosting up the output voltage.

The operation of the I²PS is very similar to that of the FIG. 33 I²PS. Therefore, only points requiring additional comment will be addressed. The switch 181 turns on to decrease the output voltage. The switch 581 turns on or remains turned on if it is necessary to discharge the capacitor 188 or to decrease the output voltage below −E. The switch 581, if closed, or the diode 182 conducts the corrective current that is equal to the current of the inductor 187. When the switch 181 turns off, the corrective current is interrupted instantaneously. The current of the inductor 187 is upheld if the switch 581 remains closed. Otherwise, the current flows through the diodes 182, 186 and charges the capacitor 188. The I²PS operates analogously when one or both switches 183 and 583 are closed. Moreover, the corrective current is equal to a difference between both inductor currents when both switches 181 and 183 are closed simultaneously. The differential corrective current allows a significantly increase of the inductor currents above the level of the corrective current before the output voltage exceeds either supply voltage. This can be accomplished without a noticeable deterioration of accuracy with which the corrective current is terminated. For example, this feature is critical in the precision audio amplifier of FIG. 35.

Figure 19:
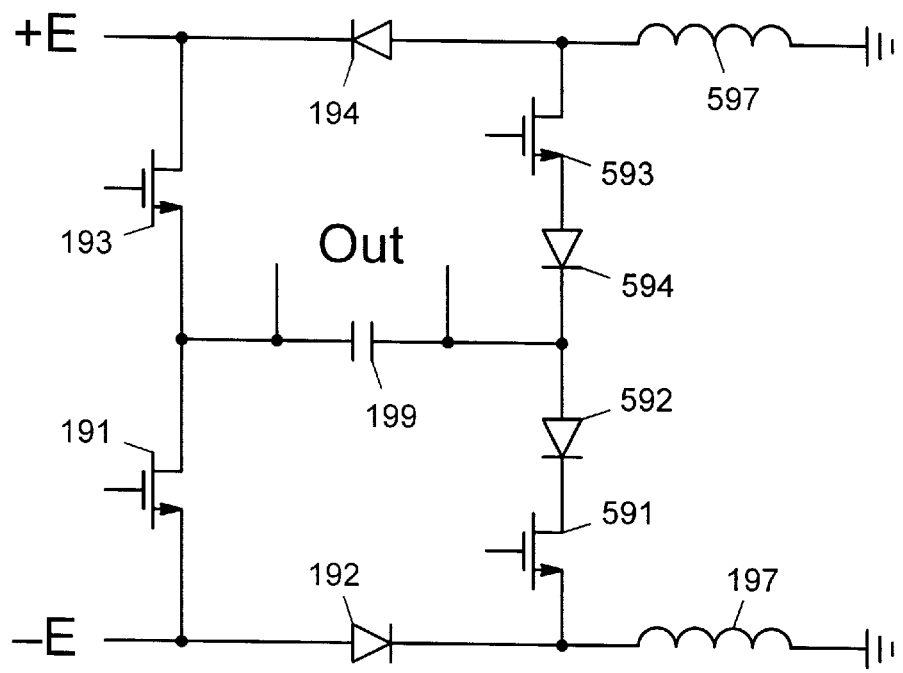
FIG. 19 is an embodiment of an I²PS with two grounded inductors.

FIG. 19 is an embodiment of an I²PS with two grounded inductors attaining unidirectional currents. The I²PS is a cross between the embodiments of FIGS. 13 and 15. The corrective current increases while a pair of switches applies it to an output capacitor as in the FIG. 13 I²PS. However, both inductors are grounded as in the FIG. 15 I²PS. The inductor currents are unidirectional and independently developed. Therefore, the corrective current having desired polarity and respective level is available instantaneously or after a dead time. A positive supply voltage +E is applied to the drain of the switch 193 and the cathode of the diode 194. A negative supply voltage −E is applied to the source of the switch 191 and the anode of the diode 192. The inductor 197 is tied to the source of the switch 591 and the cathode of the diode 192. The inductor 597 is tied to the drain of the switch 593 and the anode of the diode 194. The inductors 197 and 597 are grounded. The drain of the switch 591 is connected to the cathode of the diode 592. The source of the switch 593 is connected to the anode of the diode 594. One electrode of the capacitor 199 is connected to the drain of the switch 191 and the source of the switch 193. The other electrode is connected the anode of the diode 592 and the cathode of the diode 594. The output voltage is referred to this juncture. The floating capacitor 199 provides the output voltage of the I²PS.

The switches 191 and 593 turn on to decrease the output voltage. A difference between −E and the output voltage is applied across the inductor 597. The corrective current is equal to the current of that inductor. The difference is negative since −E is smaller than negative peak of the output voltage. When the output voltage reaches a desired level, the switch 593 turns off. The corrective current is interrupted instantaneously. The diode 194 takes over the current of the inductor 597 and limits a voltage across that inductor to +E. The switch 191 can turn off simultaneously. Similarly, the switches 193 and 591 turn on to increase the output voltage. A voltage applied across the inductor 197 is positive and equal to a difference between +E and the output voltage. The corrective current is equal to the current of that inductor. The switch 591 turns off to instantaneously interrupt the corrective current. The diode 192 takes over the current of the inductor 197 and limits a voltage across that inductor to −E. Therefore, the respective inductor current increases if the corrective current is nonzero and decreases otherwise.

The output voltage can be also reduced by energizing the switches 191 and 591 or 193 and 593. At least a portion of energy stored in the respective inductor is returned to the power supply. Specifically, the switch 191 and, subsequently, the switch 591 turn on if the output voltage is negative and has to be increased. A difference between −E and the output voltage is applied across the inductor 197. The difference is negative, wherein the current of the inductor 197 decays to zero. The corrective current is equal to that current. Therefore, the corrective current can reach zero even before the switch 591 turns off. Similarly, the switch 193 and, subsequently, the switch 593 turn on if the output voltage is positive and has to be decreased. A difference between +E and the output voltage is applied across the inductor 597. The corrective current reaches zero when the current of the inductor 597 drops to zero or when the switch 593 turns off.

Moreover, the switches 591 and 593 can be closed simultaneously. The switch 191 or 193 turns on to conduct the corrective current that is equal to a difference between both inductor currents. Preferably, the switch 191 turns on first if the output voltage is negative and the current of the inductor 197 is greater than the current of the inductor 597. This prevents a significant reverse voltage across the switch 191. Similarly, the switch 193 turns on first if the output voltage is positive and the current of the inductor 197 is smaller than the current of the inductor 597. This prevents a significant reverse voltage across the switch 193. The switch 191 or 193 can be closed at any time if it is paralleled by a diode. Conversely, that switch can remain open if the parallel-coupled diode conducts the differential corrective current. Other advantages of using the parallel-coupled diodes are also pointed out in reference to the FIG. 26 embodiment.

Figure 20:
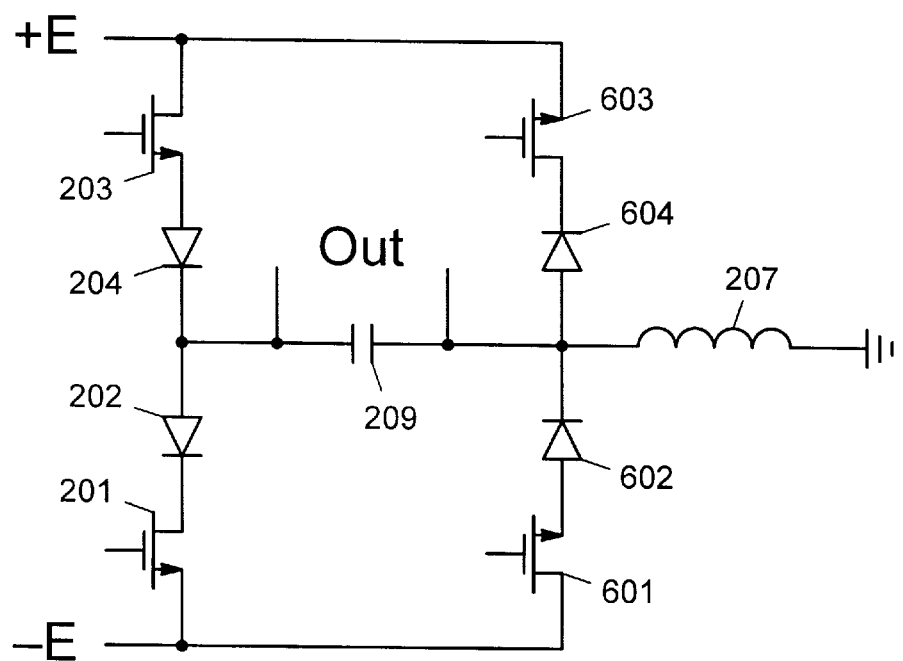
FIG. 20 is an embodiment of an I²PS with a grounded inductor.

FIG. 20 is an embodiment of an I²PS with a grounded inductor. The inductor 207 is the single inductive component that is also connected to the output capacitor 209. This is in contrast to the I²PSs of FIGS. 2, 3 and 11 through 19. In the prior art reference illustrated in FIG. 1 and in the I²PS of FIG. 10, the signal applied to an inductive block derives from an AC voltage source. Moreover, in the former embodiment, the bi-directional switch is in series with the inductive block and the output capacitor. The bi-directional switch can be placed anywhere in that path. Similar remarks apply to the I²PS of FIGS. 17 and 25 that illustrate both combinations. In the instant I²PS, the inductor 207 attains the corrective current and provides a return voltage. The switches 201 and 203 selectively apply DC supply voltages to the inductor 207 through the capacitor 209. Therefore, the switches 201 and 203 selectively apply the corrective current to a power supply that provides the DC supply voltages. The components 601 through 604 limit the return voltage when the corrective current is substantially equal to zero. The capacitor 209 provides the output voltage in response to the corrective current.

Specifically, a positive supply voltage +E is applied to the drain of the switch 203 and the source of the switch 603. A negative supply voltage -E is applied to the source of the switch 201 and the drain of the switch 601. The drains of the switches 201 and 603 are connected to the cathodes of the diodes 202 and 604 respectively. The sources of the switches 203 and 601 are connected to the anodes of the diodes 204 and 602 respectively. One electrode of the floating capacitor 209 is tied to the anode of the diode 202 and the cathode of the diode 204. The other electrode is tied to the cathode of the diode 602, the anode of the diode 604 and the grounded inductor 207. The output voltage is referenced to this junction. Up to three switches can be closed at a time. Conversely, all switches can be open only if the inductor 207 is discharged.

The switch 201 turns on to decrease the output voltage. If the switch 603 conducts the inductor current, the switch 201 and the diode 202 take it over. If the inductor current is zero, the switch 201 turns on at zero current. In either case, the corrective current is equal to the inductor current. However, the switch 201 remains turned off if the switch 601 conducts the inductor current and the output voltage is sufficiently high to cause conduction of the diode 202. This prevents short circuit condition. The switch 601 turns off when the inductor current drops to zero. Subsequently, the switch 201 turns on to start conduction of the corrective current that is equal to the increasing inductor current. The switch 603 turns on or remains turned on while the switch 201 or 601 conducts. Similarly, the switch 203 turns on to increase the output voltage. If the switch 601 conducts the inductor current, the switch 203 and the diode 204 take it over. However, the switch 203 remains turned off if the switch 603 conducts the inductor current and the output voltage is sufficiently low to cause conduction of the diode 204. When the inductor current drops to zero, the switches 203 and 603 change states. The corrective current is equal to the increasing inductor current. The switch 601 turns on or remains turned on while the switch 203 or 603 conducts.

The switch 201 or 203 can turn off at any time, whenever the correction is completed. The corrective current is interrupted instantaneously or remains zero. The corrective and inductor currents are equal and increasing only if the diode 202 or 204 is conductive. Otherwise, the inductor current decays to zero, whereas the corrective current is zero. By contrast, both switches 601 or 603 can be closed simultaneously. The switch 601 or 603 takes over the inductor current and therefore turns on before the respective switch 203 or 201 interrupts the flow of the corrective current. Therefore, the switch 601 or 603 turns on in accordance with polarity of the corrective current. At least a portion of energy stored in the inductor 207 is returned to the power supply. The components 601, 602 or 603, 604 limit a voltage across the inductor 207 to -E or +E respectively.

Figure 21:
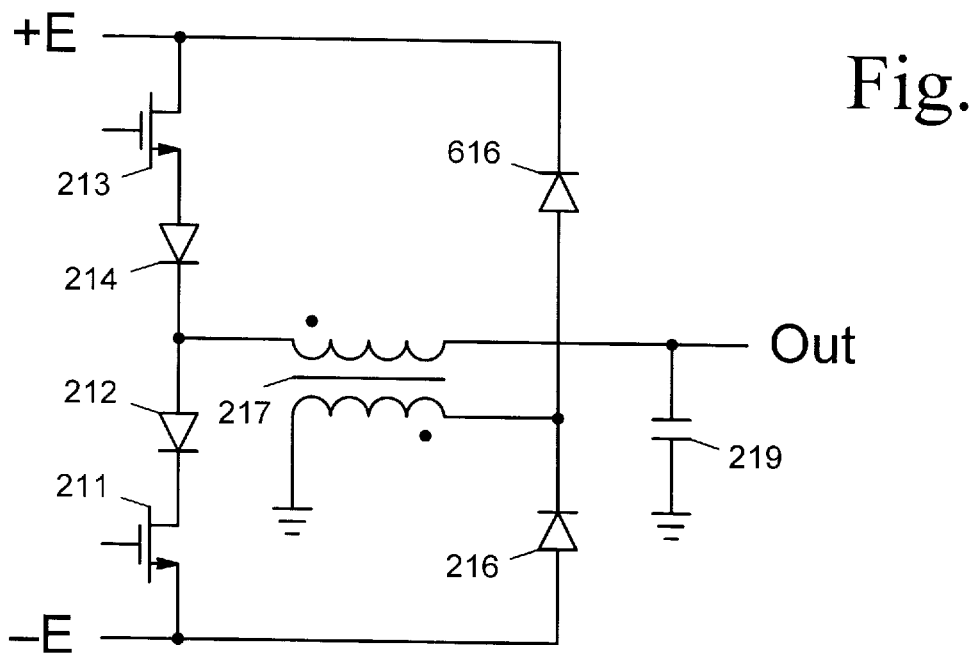
FIG. 21 is the preferred embodiment of a two-switch I²PS with a flyback transformer.

FIG. 21 is the preferred embodiment of a two-switch I²PS with a flyback transformer. The flyback transformer 217 is the single inductive component with the primary winding connected to the output capacitor 219. Therefore, the I²PS falls into the same category as the I²PS of FIG. 20. In the instant I²PS, the transformer 217 represents an inductive means that attains the corrective current and provides a return voltage. A switching means selectively applies DC supply voltages to the inductive means. Accordingly, the switching means selectively applies the corrective current to a power supply that provides the DC supply voltages. A rectifying means limits the return voltage when the corrective current is substantially equal to zero. A capacitive means is coupled to the inductive means for providing the output voltage in response to the corrective current.

Specifically, a positive supply voltage +E is applied to the drain of the switch 213 and the cathode of the diode 616. A negative supply voltage -E is applied to the source of the switch 211 and the anode of the diode 216. The drain of the switch 211 is connected to the cathode of the diode 212. The source of the switches 213 is connected to the anode of the diode 214. The primary winding of the flyback transformer 217 is tied to the anode of the diode 212 and the cathode of the diode 214. The primary winding is also in series with the capacitor 219 that provides the output voltage of the I²PS. The secondary winding is tied to the cathode of the diode 216 and the anode of the diode 616. The primary winding attains the corrective current. The secondary winding, electromagnetically coupled to the primary winding, provides the return voltage. The secondary winding and the capacitor 219 are grounded.

The switch 211 turns on to decrease the output voltage. The switch 213 is turned off. The voltage applied across the primary winding of the transformer 217 is approximately equal to a difference between -E and the output voltage. Positive peak of the output voltage results in peak primary and secondary voltages. However, the turns ratio of the transformer 217 is chosen so that the diodes 216 and 616 are cut off. Therefore, the primary winding of the transformer 217 acts like an inductor carrying the corrective current. The switch 211 can turn off at any time, whenever the correction is completed. The switch 211 and the diode 212 are effectively coupled in series with the primary winding. The corrective current is therefore immediately interrupted.

At least a portion of energy stored in the transformer 217 is returned to the DC power supply through the diode 616. The secondary voltage is limited to +E, whereby the primary voltage is also limited. The diode 214 is reverse polarized since a voltage at its cathode is above +E. The reverse energy flow continues until the transformer 217 is reset or the switch 211 turns on. Similarly, the switch 213 turns on to increase the output voltage. The operation of the I²PS is analogous, whereas the primary voltage is approximately equal to a difference between +E and the output voltage. When the switch 213 turns off, the corrective current is immediately interrupted. The diode 216 feeds back energy stored in the transformer 217 to the power supply.

The same switch, 211 or 213, can turn on after turning off in order to prolong the flow of the corrective current in one direction. Either switch turns on at zero current if the transformer 217 is reset. Otherwise, one switch turns on at zero voltage and zero current after the complementary switch interrupts the corrective current. Similar remarks apply to other I$^2$PSs that employ two switches and two diodes connected in series across the power supply for conducting the corrective current. Voltage ratings of the components can be established. For example, the supply voltages +E and −E are +180 Vdc and −180 Vdc respectively. The I$^2$PS may produce 120 Vac output voltage that ranges from −170 Vdc to +170 Vdc. When the primary voltage reaches the peak of 350 Vdc, the diodes 216 and 616 are cut off. Therefore, the turns ratio of the transformer 217 may be 2:1. Peak voltage of both switches is 710 Vdc. Peak voltages of the diodes 212, 214 and 216, 616 are 350 Vdc and 360 Vdc respectively.

Figure 22:
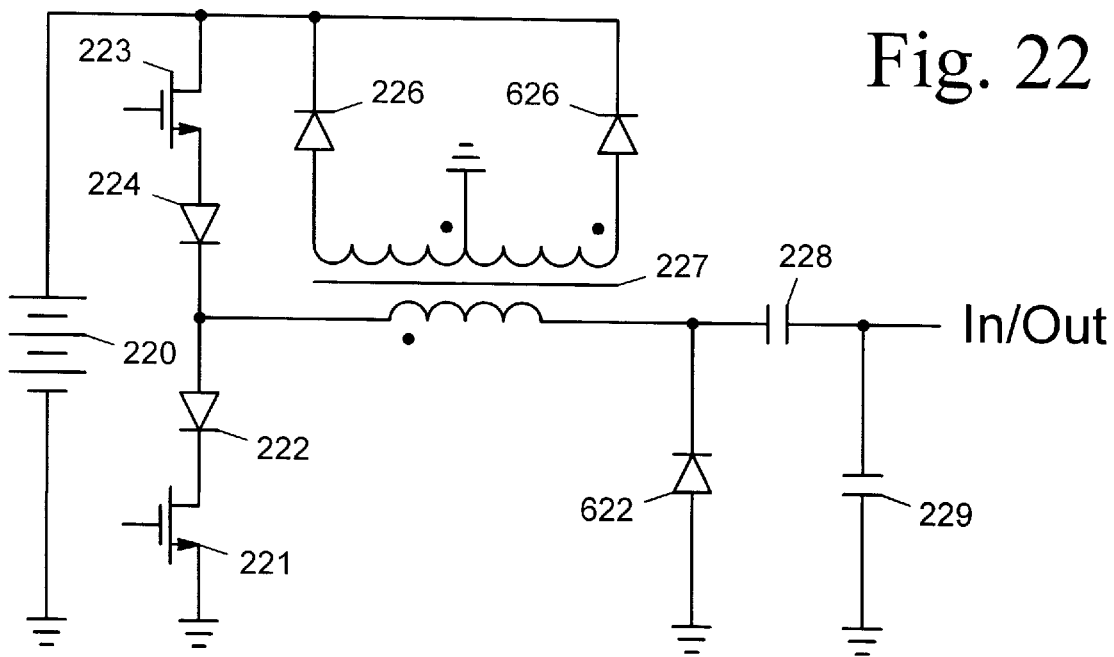
FIG. 22 is an embodiment of a two-switch bi-directional I²PS with a flyback transformer.

FIG. 22 is an embodiment of a two-switch bi-directional I$^2$PS with a flyback transformer. This I$^2$PS is based on the FIG. 21 embodiment, whereas the bi-directional conversion is accomplished. Differences between the I$^2$PS and the FIG. 21 embodiment correspond to differences between the I$^2$PSs of FIGS. 11 and 12, as pointed out hereinbefore. The voltage of the battery 220 is applied to the drain of the switch 223 and the cathodes of the diodes 226, 626. The drain of the switch 221 is connected to the cathode of the diode 222. The source of the switch 223 is connected to the anode of the diode 224. The primary winding of the flyback transformer 227 is tied to the anode of the diode 222 and the cathode of the diode 224. The primary winding is further tied to the cathode of the diode 622 and the capacitor 228. The capacitor 228 stores a DC voltage in response to the corrective current. The capacitor 228 is also in series with the capacitor 229 that provides the output voltage of the I$^2$PS. The secondary winding is connected between the anodes of the diodes 226 and 626. The battery 220, the source of the switch 221, the anode of the diode 622, the capacitor 229 and a center tap of the secondary winding are grounded.

The I$^2$PS operates analogously to the FIG. 21 embodiment. The series capacitor 228 is used to simulate a negative supply voltage. The capacitor 228 is charged approximately to one half the battery voltage. Only one of the switches 221 or 223 can be closed. When the switch 221 is turned on, a sum of the voltages stored in the capacitors 228 and 229 is applied across the primary winding. When the switch 223 is turned on, a difference between the battery voltage and that sum is applied across the primary winding. In either case, the diodes 226 and 626 are nonconductive, wherein the primary winding of the transformer 227 acts like an inductor. The respective switch 221 or 223 can turn off at any time, whenever the correction is completed. The corrective current is immediately interrupted. At least a portion of energy stored in the transformer 227 is returned to the battery 220 through the diode 226 or 626.

The battery charging is performed when an AC voltage applied across the capacitor 229 is positive. The switch 221 turns on to apply the sum of the capacitor voltages across the primary winding. The primary current of the transformer 227 discharges the capacitor 228. When the switch 221 is turned off, at least a portion of energy stored in the transformer 227 is fed back through the diode 626 to the battery 220. When the AC voltage is negative, the switch 221 is turned off. The switch 223 remains inactive. The capacitor 228 recharges up to a peak value of the AC voltage through the diode 622. That peak value is smaller than one half the battery voltage. Accordingly, the voltage stored in the capacitor 228 is usually reduced during the battery charging.

Figure 23:
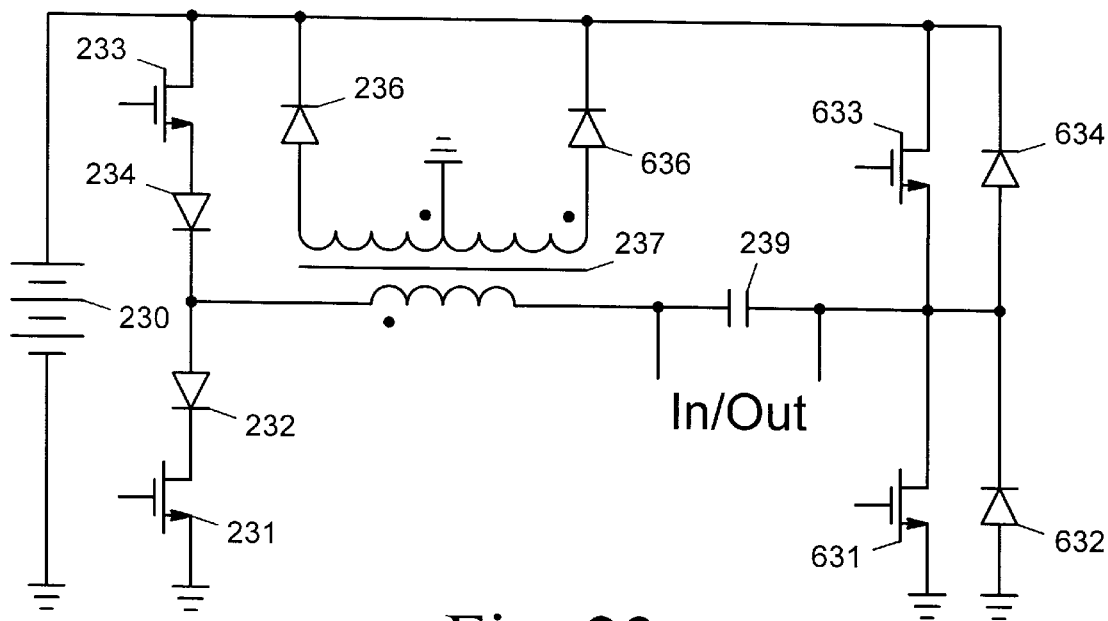
FIG. 23 is an embodiment of a bi-directional I²PS with a flyback transformer.

FIG. 23 is an embodiment of a bi-directional I$^2$PS with a flyback transformer. The I$^2$PS is based on the FIG. 22 embodiment, whereas the series coupled capacitor is replaced with two switches and two diodes. Moreover, the battery voltage is effectively doubled. Specifically, the components 230 through 234, 236, 237 and 636 are connected as the corresponding components 220 through 224, 226, 227 and 626 of FIG. 22 respectively. However, the voltage of the battery 230 is also applied to the drain of the switch 633 and the cathode of the diode 634. Moreover, the primary winding is tied to one electrode of the capacitor 239 that provides the output voltage of the I$^2$PS. The other electrode is connected to the drain of the switch 631, the source of the switch 633, the cathode of the diode 632 and the anode of the diode 634. The output voltage is referenced to this juncture. The battery 230, the sources of the switches 231, 631, the anode of the diode 632 and a center tap of the secondary winding are grounded.

The switches 233 and 631 turn on to increase the output voltage. The switches 231 and 633 are turned off. The corrective Current applied the capacitor 239 is equal to the primary current of the transformer 237. The primary voltage is approximately equal to a difference between the battery voltage and the output voltage. Negative peak of the output voltage results in a peak primary voltage. However, the turns ratio of the transformer 237 is chosen so that the diodes 236 and 636 are cut off. Therefore, the primary winding of the transformer 237 acts like an inductor attaining the corrective current. The switch 233 can turn off at any time, whenever the correction is completed. The switch 233 is effectively coupled in series with the primary winding. The corrective current is therefore immediately interrupted.

When the switch 233 turns off, the diode 236 starts to conduct the secondary current. At least a portion of energy stored in the transformer 237 is returned to the battery 230. The diode 232 is reverse polarized, as a sum of the primary and output voltages is negative. The switch 631 can remain closed if the output voltage is to be increased in a next switching cycle. The I$^2$PS is symmetrical and operates analogously when the switches 231 and 633 are energized. In particular, the diode 636 feeds back energy stored in the transformer 237 when the switch 231 is turned off. Peak voltages of the components 231 through 234 can be significantly reduced by modifying the switching sequence. This is pointed out hereinafter. Furthermore, the diodes 632 and 634 can be eliminated. This is pointed out in reference to the embodiments of FIGS. 19 and 26.

The output voltage can be reduced without discharging the battery 230. On the contrary, some energy stored in the capacitor 239, and possibly the load, is returned to the battery 230. Specifically, the switch 231 turns on if the output voltage is positive and too high. The switch 233 turns on if the output voltage is negative and too low. The switch 631 or 633 can also turn on to eliminate power loss of the diode 632 or 634 respectively. In any case, the output voltage is effectively applied across the primary winding. When the switch 231 or 233 turns off, the respective diode 636 or 236 feeds back energy stored in the transformer 237 to the battery 230. This method is somewhat ineffective near zero crossing of the output voltage. The rate at which the corrective current increases may be insufficient. The battery charging is performed when an AC voltage is applied across the capacitor 239. The operation of the I²PS remains the same. In particular, the switch 231 or 233 is energized when the AC voltage is positive or negative respectively. Preferably, the switch 631 or 633 is constantly closed when the AC voltage is positive or negative respectively.

Voltage ratings of the components can be established. In order to simplify the analysis, voltage drops across conducting semiconductors are neglected. For example, the battery voltage is 24 Vdc. The I²PS produces 16 Vac output voltage that ranges from −22.6 Vdc to +22.6 Vdc. While the corrective current flows, the primary voltage reaches the peak of 46.6 Vdc and the diodes 236, 636 are cut off. The turns ratio of the transformer 237 may be thus 2:(1+1). Peak voltages of the diodes 236, 636 and the components 631 through 634 are 48 Vdc and 24 Vdc respectively. Peak voltages Of the switches 231, 233 and the diodes 232, 234 are 94.6 Vdc and 70.6 Vdc respectively. However, peak voltages of the components 231 through 234 can be significantly reduced by maintaining one or two switches closed at any time. When the correction is completed, polarity of the output voltage determines a switching sequence.

Specifically, when the output voltage is positive, the switch 631 remains turned on or it turns on after the switch 633 turns off. When the output voltage is negative, the switch 633 remains turned on or it turns on after the switch 631 turns off. Subsequently, the respective switch 231 or 233 turns off. Therefore, a voltage at a common junction of the primary winding and the capacitor 239 is minimized between the corrections. That voltage is positive and smaller than the battery voltage. The switch 231 or 233 turns on to start the correction. However, the switches 631 and 633 may subsequently change states in order to set proper value of the primary voltage. Peak voltages of the switches 231, 233 and the diodes 232, 234 are reduced by the battery voltage of 24 Vdc.

Figure 24:
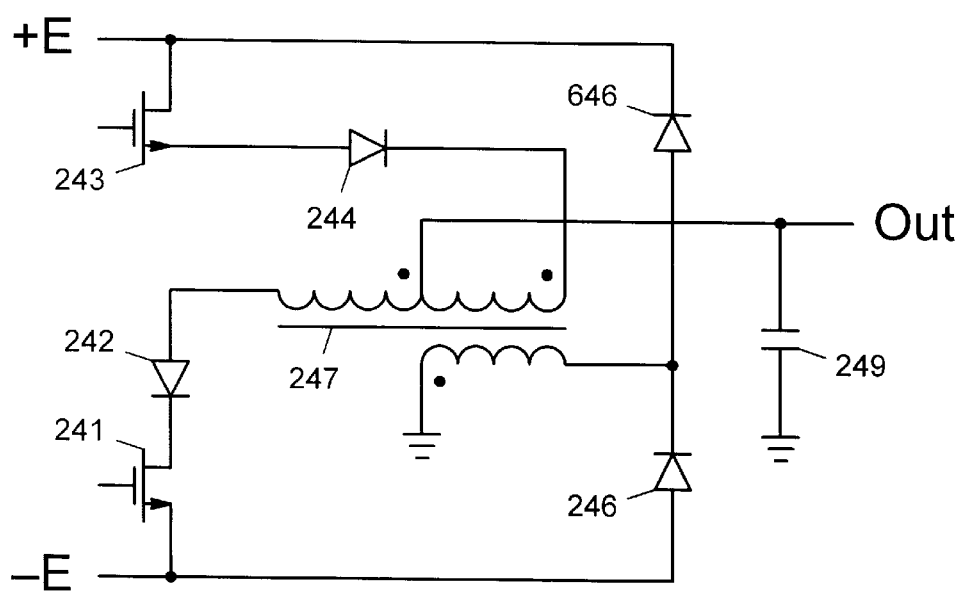
FIG. 24 is an embodiment of a two-switch I²PS with a single flyback transformer attaining a unidirectional primary current.

FIG. 24 is an embodiment of a two-switch I²PS with a single flyback transformer attaining a unidirectional primary current. The I²PS is based on the two-switch I²PS of FIG. 21. However, the primary winding of the flyback transformer 247 is expanded and driven at both ends. The I²PS maintains main advantages of the I²PS in which an inductor current or currents are unidirectional. These advantages are lack of the dead time and instantaneous availability of the corrective current having desired polarity. Furthermore, the instant I²PS can be transformed into a bi-directional I²PS. Differences between the I²PSs of FIGS. 21 and 22 or 21 and 23 illustrate necessary modifications. The components 241, 243, 246, 646 and the secondary winding are connected as the components 211, 213, 216, 616 and the secondary winding of the FIG. 21 embodiment respectively. Only connections to the primary winding are altered. Specifically, the cathode and anode of the diode 242 is connected between the drain of the switch 241 and one end of the primary winding. The anode and cathode of the diode 244 is connected between the source of the switch 243 and the other end of the primary winding. A primary center tap is tied to the capacitor 249 that provides the output voltage of the I²PS.

The operation of the I²PS is very similar to that of the FIG. 21 I²PS. In particular, the switch 241 or 243 turns on in order to decrease or increase the output voltage respectively. The turns ratio of the transformer 247 is chosen so that the diodes 246 and 646 are cut off even when the output voltage peaks. Therefore, the primary winding carries the corrective current. When the switch 241 or 243 turns off, the corrective current is immediately interrupted. The respective diode 646 or 246 feeds back energy stored in the transformer 247 to the power supply. The reverse energy flow continues until the transformer 247 is reset or one of the switches turns on.

Moreover, the switches 241 and 243 can be closed concurrently. If the switch 241 is closed, the primary voltage is equal to a difference between −E and the output voltage. The primary voltage appears across each half of the primary winding. Therefore, a voltage at the cathode of the diode 244 is greater or smaller than +E if the output voltage is positive or negative respectively. Similar remarks apply when the switch 243 is closed. Usual voltage drops across conducting semiconductors, imbalance of the supply voltages, asymmetry of the primary center tap, etc, are insignificant. Both switches change states simultaneously in order to instantaneously invert the corrective current, i.e. to reverse polarity of the corrective current without changing its magnitude.

FIG. 25 is the preferred embodiment of a two-switch I²PS with two flyback transformers. An equivalent two-switch I²PS is shown in FIG. 17. Main advantages of both I²PS are utter simplicity and reduced cost. Moreover, the transformers are used to independently develop unidirectional primary currents, similarly to the two-inductor designs. Some advantages of this method are discussed hereinabove. In particular, the corrective current having desired polarity and respective level is available instantaneously. The burdensome dead time of switches is eliminated, wherein a differential corrective current can be produced. The transformers represent an inductive means that attains the primary currents and provides return voltages. A pair of switches selectively applies the primary currents to the power supply. A pair of diodes limits the return voltages when the corrective current is substantially equal to zero. An output capacitor is connected to both transformers for providing the output voltage in response to the corrective current.

Figure 26:
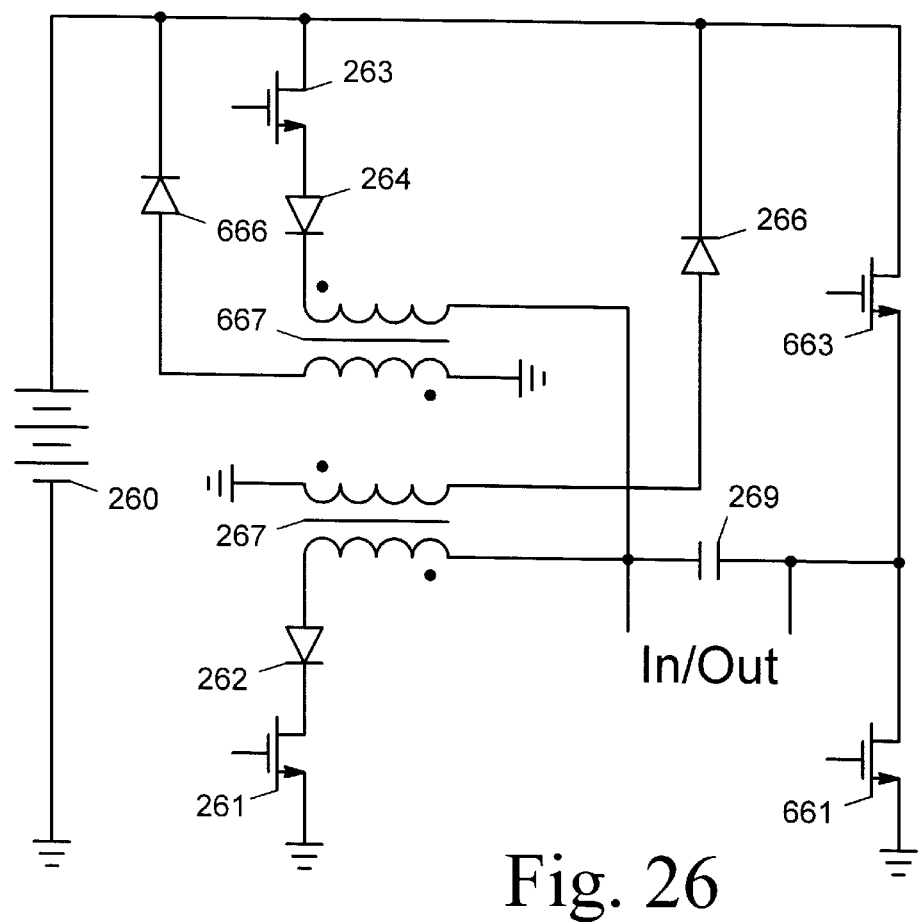
FIG. 26 is the preferred embodiment of a bi-directional I²PS with two flyback transformers.

Specifically, a positive supply voltage +E is applied to the drain of the switch 253 and the cathode of the diode 656. A negative supply voltage −E is applied to the source of the switch 251 and the anode of the diode 256. The primary and secondary windings of the transformer 257 are connected to the drain of the switch 251 and the cathode of the diode 256 respectively. The primary and secondary windings of the transformer 657 are connected to the source of the switch 253 and the anode of the diode 656 respectively. The primary windings of the transformers 257 and 657 are further tied to the capacitor 259 that provides the output voltage of the I²PS. The secondary windings of the transformers 257, 657 and the capacitor 259 are grounded. The cathode and anode of the diode 256 can be connected to +E and the secondary winding of the transformer 257 respectively if polarity of that winding is reversed. The corresponding components 266 and 267 of FIG. 26 are arranged this way. Similarly, the anode and cathode of the diode 656 can be connected to −E and the secondary winding of the transformer 657 respectively if polarity of that winding is reversed.

The switch 251 turns on to decrease the output voltage. The switch 253 is turned off. The voltage applied across the primary winding of the transformer 257 is approximately equal to a difference between −E and the output voltage. The secondary voltage of the transformer 257 is positive, wherein the diode 256 is cut off. Therefore, the primary winding of the transformer 257 acts like an inductor carrying the corrective current. The switch 251 can turn off at any time, whenever the correction is completed. The corrective current is immediately interrupted. At least a portion of energy stored in the transformer 257 is returned to the power supply via the diode 256. The reverse energy flow continues until the transformer 257 is reset or the switch 251 turns on again. Similarly, the switch 253 turns on to increase the output voltage. The operation of the I²PS is analogous, wherein the primary voltage is approximately equal to a difference between +E and the output voltage. When the switch 253 turns off, the corrective current is immediately interrupted. The diode 656 feeds back energy stored in the transformer 657 to the power supply.

If both switches 251 and 253 are closed simultaneously, the corrective current is equal to a difference between both primary currents. In particular, the corrective current is zero if the switches 251 and 253 are open or if both switches are closed and the primary currents are even. Voltage ratings of the components can be established. For example, the supply voltages +E and −E are +180 Vdc and −180 Vdc respectively. The I²PS produces 120 Vac output voltage that ranges from −170 Vdc to +170 Vdc. The turns ratio of each transformer may be 1:1. Peak voltage of the switches 251, 253 and the diodes 256, 656 is 530 Vdc. Preferably, the turns ratio is reduced in order to minimize voltage ratings of the switches 251 and 253. If the ratio is 1:2, peak voltages of the switches and the diodes are 440 Vdc and 880 Vdc respectively. Furthermore, the transformers 257 and 657 discharge at a double rate.

FIG. 26 is the preferred embodiment of a bi-directional I²PS with two flyback transformers. Each transformer attains a unidirectional primary current. The I²PS resembles the full-bridge topology. With reference to the FIG. 25 I²PS, the bi-directional conversion is accomplished by substituting a battery for power supply, and adding two switches and two diodes. Differences between the I²PSs of FIGS. 21 and 23 as well as 28 and 29 pertain to a similar modification. Specifically, the battery voltage is applied to the drains of the switches 263, 663 and the cathodes of the diodes 266, 666. The drain of the switch 261 is connected to the cathode of the diode 262. The source of the switch 263 is connected to the anode of the diode 264. The primary winding of the flyback transformer 267 is connected between the anode of the diode 262 and one electrode of the capacitor 269. The primary winding of the flyback transformer 667 is connected between the cathode of the diode 264 and the same electrode of the capacitor 269. The secondary windings of the transformers 267 and 667 are tied to the anodes of the diodes 266 and 666 respectively. The drain of the switch 661 and the source of the switch 663 are connected to the other electrode of the capacitor 269. The output voltage appears thereacross; it is also referenced to that electrode. The battery 260, the sources of the switches 261, 661, the secondary windings of the transformers 267, 667 and the capacitor 269 are grounded.

The switches 263 and 661 turn on to increase the output voltage. The switches 261 and 663 are turned off. The corrective current is equal to the primary current of the transformer 667. The primary voltage is approximately equal to a difference between the battery voltage and the output voltage. The secondary voltage of the transformer 667 is negative, wherein the diode 666 is cut off. Therefore, the primary winding of the transformer 667 acts like an inductor attaining the corrective current. The switch 263 can turn off at any time, whenever the correction is completed. The switch 263 is coupled in series with the primary winding. The corrective current is therefore immediately interrupted.

When the switch 263 is turned off, the diode 666 conducts the secondary current of the transformer 667. At least a portion of energy stored in the transformer 667 is returned to the battery 260. The switch 661 can remain closed if the output voltage is to be increased in a next switching cycle. The I²PS is symmetrical and operates analogously when the switches 261 and 663 are energized to decrease the output voltage. In particular, the diode 266 is cut off when these switches are closed. Otherwise, the diode 266 feeds back energy stored in the transformer 267 to the battery 260. The switch 661 or 663 turns on before the switch 263 or 261 turns on respectively. This prevents excessive reverse voltages of the switches 661 and 663. Furthermore, both switches 261 and 263 can be closed. The corrective current is then equal to a difference between the primary currents of the transformers 267 and 667.

The output voltage can be reduced without discharging the battery 260. On the contrary, some energy stored in the capacitor 269, and possibly the load, is returned to the battery 260. Specifically, the switch 661 turns on if the output voltage is positive and too high. Subsequently, the switch 261 turns on. The output voltage is effectively applied across the primary winding of the transformer 267. When the switch 261 turns off, the diode 266 feeds back energy stored in the transformer 267 to the battery 260. Similarly, the switch 663 and subsequently the switch 263 turn on if the output voltage is negative and too low. The output voltage is effectively applied across the primary winding of the transformer 667. When the switch 263 turns off, the diode 666 feeds back energy stored in the transformer 667 to the battery 260. This method is somewhat ineffective near zero crossing of the output voltage. The rate at which the corrective current increases may be insufficient. The battery charging is performed when an AC voltage is applied across the capacitor 269. The I² operates as if to reduce the output voltage stored in the capacitor 229. In particular, the switches 261, 661 or 263, 663 are energized when the AC voltage is positive or negative respectively. The diodes 262 and 264 are in series with the switches 261 and 263 respectively to prevent reverse currents therein. For example, the diode 262 is reverse polarized if the switch 661 is closed, the transformer 267 is reset and the output voltage is negative.

No diodes paralleling the switches 661 and 663 are shown in the drawing. When the switches 261 and 263 are turned off, the corrective current is zero. When the switches 661 and 663 are also turned off, the capacitor 269 is floating. The biggest factor determining voltages appearing across the switches 661 and 663 is leakage currents thereof. Substantial reverse voltages sustained by the switch 661 or 663 could result in excessive peak voltages of the remaining switches. However, the interval during which the switches 661 and 663 are open can be reduced to the dead time after recharging stay capacitances. It is thus assumed that if the switch 661 or 663 is reverse polarized at all, the leakage current thereof becomes dominant. As a result, peak voltages of the switches 661 or 663 are effectively limited to the battery voltage. Finally, any standard power MOSFET already includes a parallel-coupled diode that is an intrinsic body-diode. The diode effectively increases non-linearity of the leakage current. Moreover, the diode is used merely to conduct a combined leakage current. Other advantages of using the parallel-coupled diodes are also pointed out in reference to the FIG. 19 embodiment. Similar remarks apply to the full-bridge I²PSs of FIGS. 23 and 29. The respective switches can be switched so that parallel-coupled diodes conduct minuscule currents.

Figure 27:
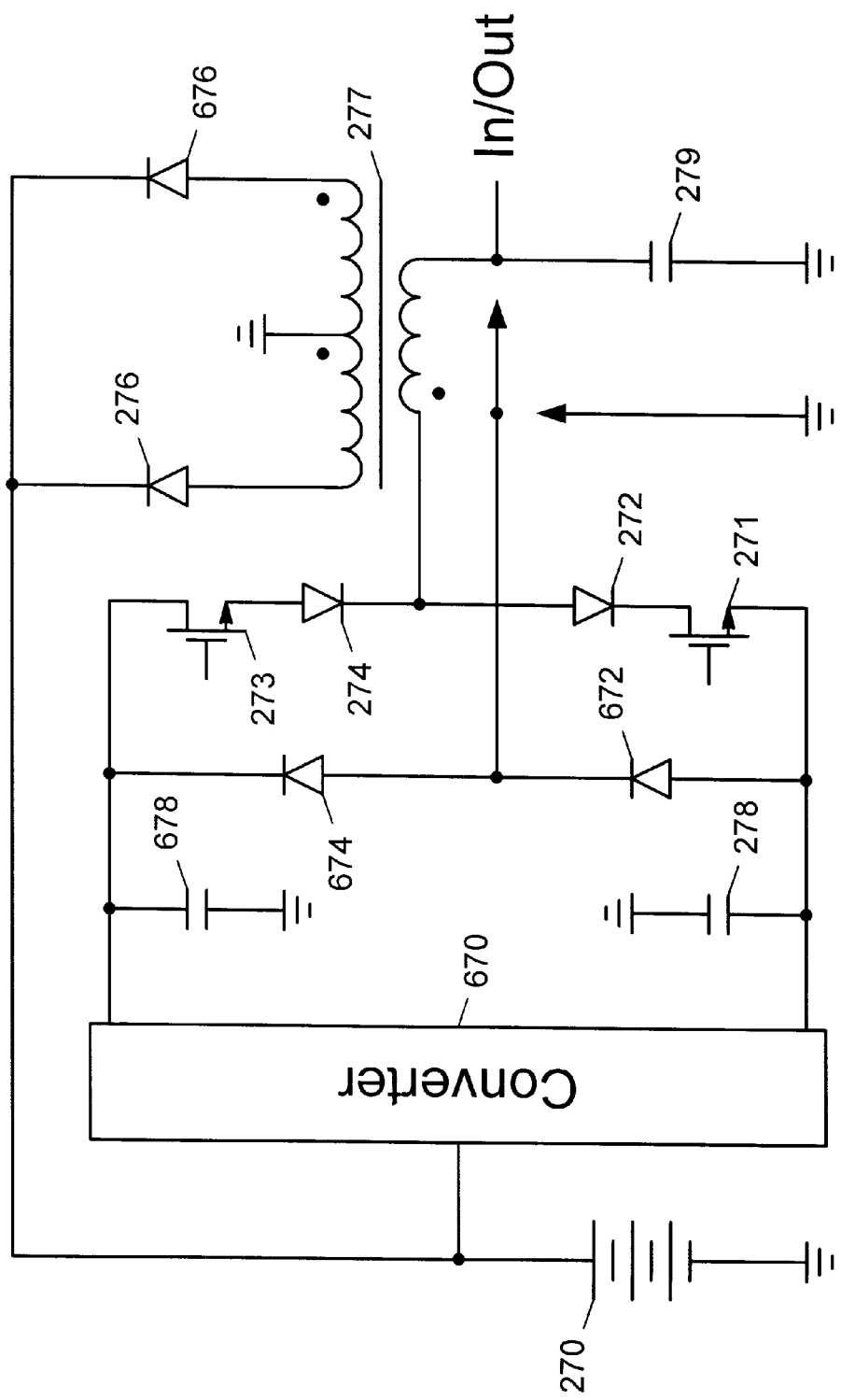
FIG. 27 is the preferred embodiment of a bi-directional I²PS with a DC/DC converter and a flyback transformer.

FIG. 27 is the preferred embodiment of a bi-directional I²PS with a DC/DC converter and a flyback transformer. This I²PS is based on the FIG. 21 I²PS, whereas the battery voltage can be boosted. Moreover, galvanic isolation between the battery 270 and the output capacitor 279 is accomplished if the DC/DC converter 670 provides for such isolation. The battery 270 supplies the converter 670. The battery voltage is converted into positive and negative supply voltages stored in the capacitors 678 and 278 respectively. Bulky capacitors are used for the DC storage as to separate the converter 670 from current surges delivered to the load. However, if the battery 270 and the converter 670 are capable of sustaining the surges, the size of the capacitors 278 and 678 can be dramatically reduced. The supply voltages stored therein can even reverse polarities. The I²PS with the capacitor 278 and 678 providing relatively stable supply voltages will be considered first.

The positive supply voltage is applied to the drain of the switch 273 and the cathode of the diode 674. The negative supply voltage is applied to the source of the switch 271 and the anode of the diode 672. The drain of the switch 271 is connected to the cathode of the diode 272. The source of the switch 273 is connected to the anode of the diode 274. One end of the primary winding of the flyback transformer 277 is tied to the anode of the diode 272 and the cathode of the diode 274. The other end is tied to the cathode of the diode 672, the anode of the diode 674 and the capacitor 279. The output voltage is stored therein. Alternatively, the cathode of the diode 672 and the anode of the diode 674 can be grounded as marked in the drawing. The secondary winding of the transformer 277 is connected between the anodes of the diodes 276 and 676. The cathodes thereof are connected to the battery 270. The battery 270, the capacitors 278, 279, 678 and a center tap of the secondary winding are grounded.

The switch 271 turns on to decrease the output voltage. The switch 273 is turned off. The primary voltage is approximately equal to a difference between the negative supply voltage and the output voltage. Positive peak of the output voltage results in a peak primary voltage. However, the turns ratio of the transformer 277 is chosen so that the diodes 276 and 676 are cut off. Therefore, the primary winding of the transformer 277 acts like an inductor attaining the corrective current. The switch 271 can turn off at any time, whenever the correction is completed. The switch 271 is effectively coupled in series with the primary winding. The corrective Current is therefore immediately interrupted. The diode 676 conducts the secondary current. At least a portion of energy stored in the transformer 277 is returned to the battery 270. The diode 274 is reverse polarized as a sum of the primary voltage and the output voltage exceeds the positive supply voltage. The I²PS is symmetrical and operates analogously when the switch 273 is energized. In particular, the primary voltage is approximately equal to a difference between the positive supply voltage and he output voltage. When the switch 273 turns off, the corrective current is immediately interrupted. The diode 276 feeds back energy stored in the transformer 277 to the battery 270. The switch 271 or 273 turns on at zero current and, if the transformer 277 is charged, at zero voltage after the respective complementary switch 273 or 271 interrupts the corrective current.

The battery charging is performed when an AC voltage is applied across the capacitor 279. The converter 670 is idle and discontinues charging the capacitors 278 and 678. Consequently, the capacitor 278 is charged to negative peak of the AC voltage through the diode 672. The capacitor 678 is charged to positive peak of the AC voltage through the diode 674. The supply voltages stored in the capacitors 279 and 678 are usually reduced during the battery charging. The I²PS operates as if to reduce the output voltage stored in the capacitor 279. Specifically, the switch 271 or 273 is energized when the AC voltage is positive or negative respectively. When the switch 271 or 273 is on, the diodes 276 and 676 are cut off. The primary winding acts like an inductor. When the switch 271 or 273 turns off, the respective diode 676 or 276 delivers energy stored in the transformer 277 to the battery 270.

The size of the capacitors 278 and 678 can be dramatically reduced if the battery 270 and the converter 670 are capable of delivering a peak current to the load. The diodes 672 and 674 are grounded to minimize reverse voltages of the capacitors 278 and 678 respectively. The operation of the I²PS is only slightly different. During the forward operation, the converter 670 maintains a safe margin between each supply voltage and the output voltage. During the battery charging, the converter 670 is idle. The I²PS operates as if to reduce the output voltage stored in the capacitor 279. Specifically, the switch 271 is energized when the AC voltage is positive. However, the capacitor 278 is discharged and shorted by the diode 672. The switch 271 is effectively grounded, wherein the AC voltage is applied across the primary winding. When the switch 271 turns off, the diode 676 delivers energy stored in the transformer 277 to the battery 270. Likewise, when the AC voltage is negative, the switch 273 and the diodes 274, 674 apply it across the primary winding. When the switch 273 turns off, the transformer 277 discharges through the diode 276.

Voltage ratings of the components can be established. In order to simplify the analysis, voltage drops across conducting semiconductors are neglected. For example, the battery voltage is 24 Vdc. The supply voltages stored in the capacitors 678 and 278 are +180 Vdc and −180 Vdc respectively. The I²PS produces 120 Vac output voltage that ranges from −170 Vdc to +170 Vdc. When the corrective current flows, the primary voltage can reach the peak of 350 Vdc while the diodes 276, 676 are cut off. The turns ratio of the transformer 277 may be thus 15:(1+1). Peak voltage of both switches is 710 Vdc. Peak voltages of the diodes 272, 274 and 672, 674 are 350 Vdc and 360 Vdc respectively. Peak voltage of the diodes 276 and 676 is 48 Vdc.

Figure 28:
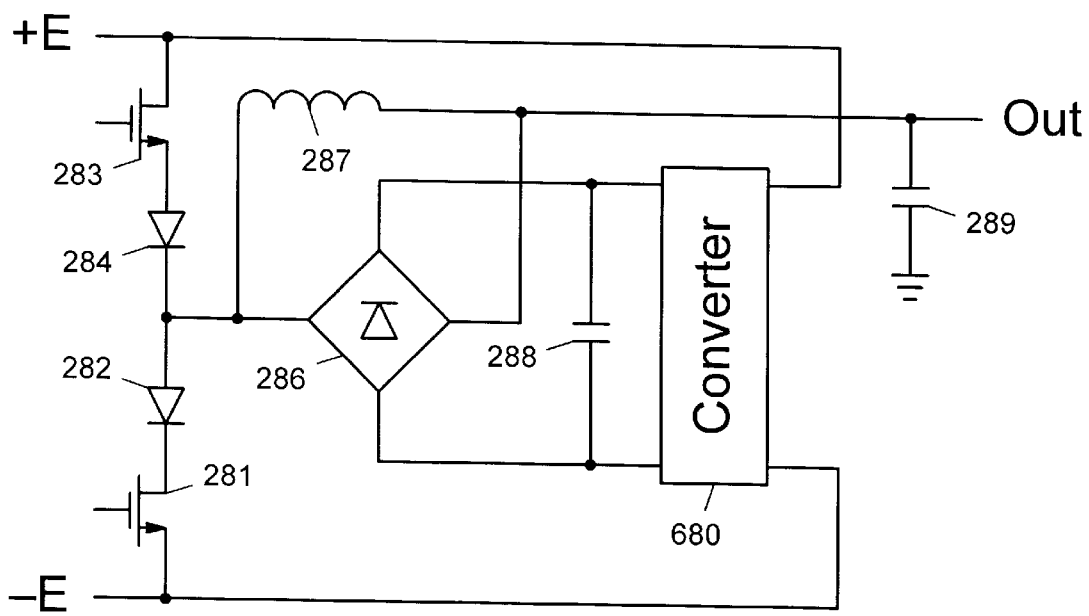
FIG. 28 is the preferred embodiment of an I²PS with a DC/DC converter and an inductor.

FIG. 28 is the preferred embodiment of an I²PS with a DC/DC converter and an inductor. The I²PS converts positive and negative supply voltages, +E and −E respectively, into an AC output voltage. The inductor 287 attains an inductor current. A rectifying means limits a return voltage that appears across the inductor 287. The diode bridge 286, the capacitor 288 and the DC/DC converter 680 constitute the rectifying means. The bridge 286 rectifies the return voltage and limits it to a holdup voltage stored in the capacitor 288. The converter 680 converts the holdup voltage into a return current that is fed back to the power supply. A switching means, 281 through 284, selectively applies the supply voltages to the inductor 287. The capacitor 289 is connected thereto for providing the output voltage of the I²PS.

Specifically, +E and −E are applied to the drain of the switch 283 and the source of the switch 281 respectively. The drain of the switch 281 is connected to the cathode of the diode 282. The source of the switch 283 is connected to the anode of the diode 284. One end of the inductor 287 is tied to the anode of the diode 282 and the cathode of the diode 284. The other end is tied to the grounded capacitor 289 that provides the output voltage of the I²PS. Moreover, inputs and outputs of the bridge 286 are connected across the inductor 287 and the capacitor 288 respectively. The converter 680 has a pair of inputs and a pair of outputs connected across the capacitor 288 and the power supply respectively.

The switch 281 turns on to decrease the output voltage. If the inductor current is zero, a voltage at a common junction of the components 282, 284, 286 and 287 is equal to the output voltage. The switch 281 turns on at zero current. If the inductor current is nonzero, the voltage at the junction is equal to or exceeds either supply voltage. If the voltage at the junction is initially greater than or equal to +E, the switch 281 and the diode 282 take over the inductor current. The corrective current is equal thereto. If the voltage at the junction is less than or equal to −E, the switch 281 turns on at zero voltage and zero current. The corrective current is zero until the inductor current fades out. Subsequently, the switch 281 and the diode 282 conduct the corrective current that is equal to the increasing inductor current.

Similarly, the switch 283 turns on to increase the output voltage. If the voltage at the junction is greater than or equal to +E, the switch 283 turns on at zero voltage and zero current. The switch 283 and the diode 284 start to conduct the corrective current when the inductor current drops to zero. IF the voltage at the junction is initially below +E, the switch 283 and the diode 284 immediately carry the corrective current. Therefore, the corrective current is equal to the inductor current when the diode 284 forward biased. Only one switch can be closed at a time. The respective switch can turn off at any time, whenever the correction is completed. The corrective current is interrupted instantaneously or remains zero.

The holdup voltage determines peak voltage appearing across the inductor 287. The corrective current is nonzero if the switch 281 or 283 and the respective diode 282 or 284 conduct the inductor current. Otherwise, the bridge 286 conducts it. The voltage across the inductor 287 is fully rectified and limited to the holdup voltage. The inductor current drops at a highest rate. Preferably, the capacitor 288 is first charged to the holdup voltage during a startup of the I²PS. This may be accomplished by a pair of resistors having large values and applying the supply voltages to the capacitor 288. Therefore, one resistor applies +E to the positive output of the bridge 286. The other resistor applies −E to the negative output of the bridge 286.

The converter 680 acts likes a zener diode limiting the holdup voltage. The converter 680 draws an increasing input current when the holdup voltage exceeds a predetermined level. Moreover, the supply voltages +E and −E are applied to the outputs of the converter 680. Therefore, excessive energy stored in the capacitor 288 is returned to the power supply. The converter 680 employs a transformer to accomplish galvanic isolation between the capacitor 288 and the power supply. The converter 680 is floating since none of its inputs and outputs is grounded. However, one of the outputs may be grounded while +E or −E is applied to the remaining output. Alternatively, an additional output, such as a secondary center tap of the transformer, can be grounded. In this case, the converter 680 provides a pair of return currents. Voltage ratings of the components can be established. For example, the supply voltages +E and −E are +180 Vdc and −180 Vdc respectively. The I²PS produces 120 Vac output voltage that ranges from −170 Vdc to +170 Vdc. The holdup voltage is 350 Vdc. Peak voltages of the switches 281, 283 and the diodes 282, 284 are 700 Vdc and 340 Vdc respectively. Peak voltage of the bridge 286 is equal to the holdup voltage.

Figure 29:
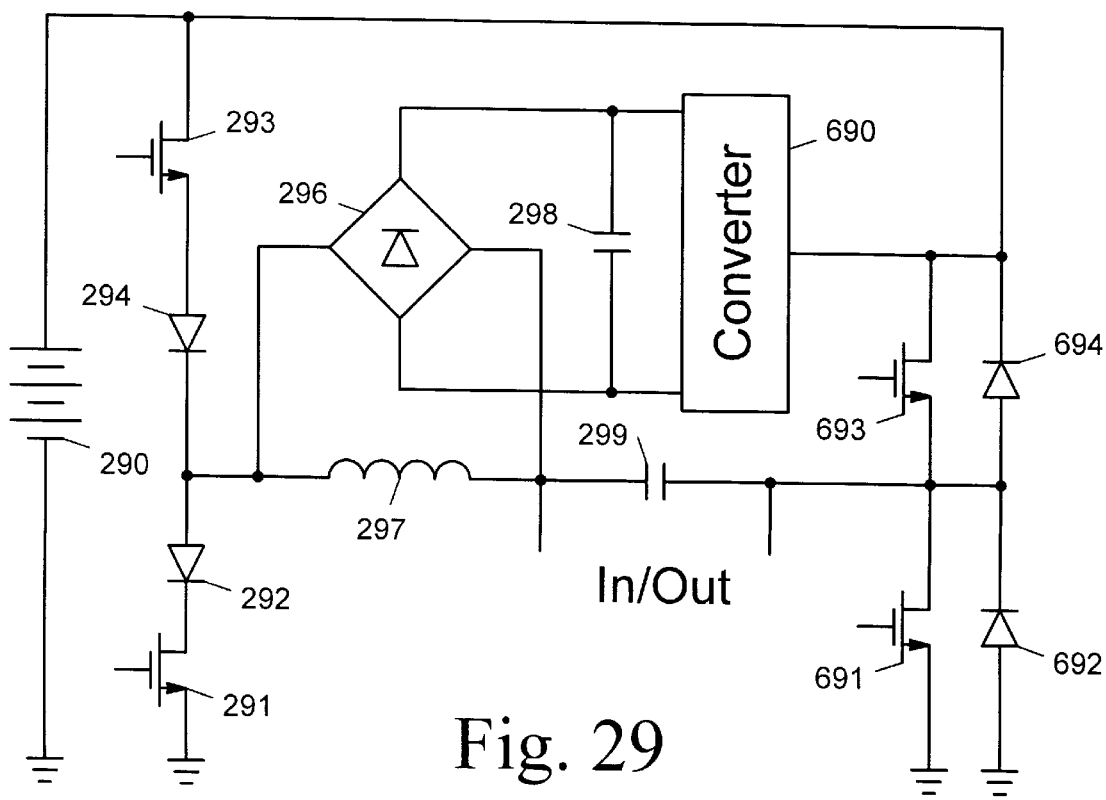
FIG. 29 is an embodiment of a bi-directional I²PS with a DC/DC converter and an inductor.

FIG. 29 is an embodiment of a bi-directional I²PS with a DC/DC converter and an inductor. The I²PS is based on the FIG. 28 embodiment, whereas the bi-directional conversion is accomplished. The I²PS is similar to the FIG. 23 embodiment. Specifically, the components 290 through 294, 299, 691 through 694 and the inductor 297 are connected as the components 230 through 234, 239, 631 through 634 and the primary winding of the transformer 237 of FIG. 23 respectively. However, inputs and outputs of the diode bridge 296 are connected across the inductor 297 and the capacitor 298 respectively. By these means, a voltage appearing across the inductor 297 is fully rectified and limited to a holdup voltage stored in the capacitor 298. The DC/DC converter 690 has a pair of inputs and a pair of outputs connected across the capacitor 298 and the battery 290 respectively. Grounded output of the converter 690 is not shown for simplicity. The output voltage of the I²PS is stored in the capacitor 299 and referenced to a common junction of the component 299 and 691 through 694. Furthermore, the diodes 692 and 694 can be eliminated. This is pointed out in reference to the embodiments of FIGS. 19 and 26.

The I²PS operates analogously to the FIG. 23 embodiment. In particular, the switches either 291, 693 or 293, 691 turn on to decrease or increase the output voltage of the I²PS respectively. The corrective current is equal to the inductor current. The switch 291 or 293 can turn off at any time, whenever the correction is completed. The corrective current is immediately interrupted. The respective switch 693 or 691 can turn off simultaneously or remain turned on. The voltage across the inductor 297 is limited to the holdup voltage, wherein the inductor current drops at a highest rate. The DC/DC converter 690 limits the holdup voltage, wherein excessive energy stored in the capacitor 298 is returned to the battery 290. The converter 690 employs a transformer to accomplish galvanic isolation between the capacitor 298 and the battery 290.

The output voltage can be reduced without discharging the battery 290 as in the FIG. 23 embodiment. In particular, the switch 291 turns on if the output voltage is positive and too high. The switch 293 turns on if the output voltage is negative and too low. When the respective switch 291 or 293 turns off, the bridge 296 takes over the inductor current. Furthermore, the battery charging is performed as in the FIG. 23 embodiment. In particular, the switch 291 or 293 is energized when the AC voltage is positive or negative respectively. Voltage ratings of the components can be established. In order to simplify the analysis, voltage drops across conducting semiconductors are neglected.

For example, the battery voltage is 24 Vdc. The I²PS produces 16 Vac output voltage that ranges from −22.6 Vdc to +22.6 Vdc. The holdup voltage is 46.6 Vdc. Peak voltages of the bridge 296 and the components 691 through 694 are equal to the holdup and battery voltages respectively. Peak voltages of the switches 291, 293 and the diodes 292, 294 are 93.2 Vdc and 69.2 Vdc respectively. However, peak voltages of the components 291 through 294 can be significantly reduced by maintaining one or two switches closed at any time. When the correction is completed, polarity of the output voltage determines a switching sequence as in the FIG. 23 embodiment. Peak voltages of the switches 291, 293 and the diodes 292, 294 are reduced by the battery voltage of 24 Vdc.

Figure 30:
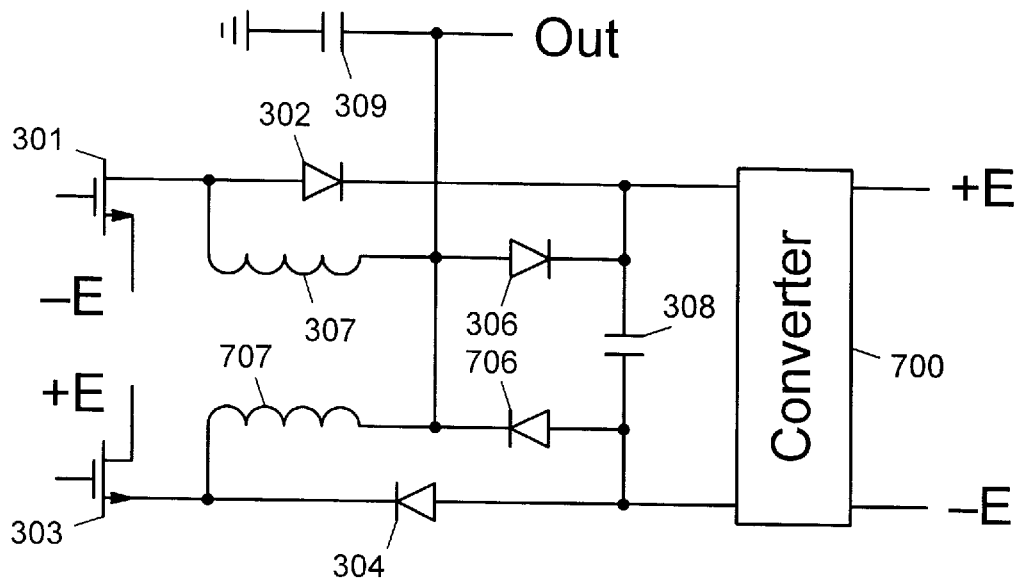
FIG. 30 is the preferred embodiment of an I²PS with a DC/DC converter and two inductors.

FIG. 30 is the preferred embodiment of an I²PS with a DC/DC converter and two inductors attaining unidirectional currents. Some advantages of developing independent unidirectional currents are discussed hereinabove. In particular, the corrective current having desired polarity and possibly an upheld level is available instantaneously. Conduction phases of switches can overlap, wherein a differential corrective current can be produced. A positive supply voltage +E is applied to the drain of the switch 303 and one output of the DC/DC converter 700. A negative supply voltage −E is applied to the source of the switch 301 and another output of the converter 700. The drain of the switch 301 is connected to the anode of the diode 302 and the inductor 307. Similarly, the source of the switch 303 is connected to the cathode of the diode 304 and the inductor 707. One electrode of the capacitor 308 is connected to the cathodes of the diodes 302, 306 and one input of the converter 700. The other electrode is connected to the anodes of the diodes 304, 706 and another input of the converter 700. The anode of the diode 306, the cathode of the diode 706, the inductors 307, 707 and the capacitor 309 are tied to the output of the I$^2$PS.

The converter 700 limits a holdup voltage stored in the capacitor 308. It draws an increasing input current when the holdup voltage increases above a predetermined level. The converter 700 produces a return current that is fed back to the power supply. Similar to comparable converters in the I$^2$PSs of FIGS. 28, 29 and 31, the converter 700 employs a transformer. By these means, switching noise produced by the converter 700 and injected into the capacitor 309 is minimized. One of the converter outputs can be grounded while +E or −E is applied to the remaining output. Alternatively, an additional output, such as a secondary center tap of the transformer, can be grounded. In this case, the converter 700 provides a pair of return currents. The grounded capacitor 309 stores the output voltage of the I$^2$PS.

The switch 301 turns on to decrease the output voltage. The corrective current is equal to the current of the inductor 307. A voltage applied across the inductor 307 is approximately equal to a difference between −E and the output voltage. Therefore, the corrective current increases. By contrast, the diodes 304 and 306 apply the holdup voltage across the inductor 707 that hence charges the capacitor 308. Similarly, the switch 303 turns on to increase the output voltage. The corrective current is equal to the current of the inductor 707. A voltage appearing thereacross is approximately equal to a difference between +E and the output voltage. Conversely, the inductor 307 discharges through the diodes 302, 706 and the capacitor 308. The switch 301 or 303 can turn off at any time, whenever the correction is completed. The flow of the corrective current is interrupted instantaneously.

When both switches 301 and 303 are turned off, the diodes 302 and 304 conduct the currents of the inductors 307 and 707 respectively. If the current of the inductor 307 is greater than the current of the inductor 707, the diode 706 conducts a difference between both inductor currents. The inductor 307 discharges, as the holdup voltage is applied thereacross. By contrast, the voltage across the inductor 707 is equal to a difference between forward voltages of the diodes 304 and 706. Therefore, the current of the inductor 707 remains virtually constant as that difference is near zero. Similarly, if the current of the inductor 707 is greater than the current of the inductor 307, the diode 306 conducts a difference between both inductor currents. The inductor 707 discharges, whereas the current of the inductor 307 remains virtually constant. The higher inductor current may eventually fall to the level of the upheld inductor current while the switches 301 and 303 remain open. The diodes 306 and 706 are then cut off as the inductors 307 and 707 act like a single inductor charging the capacitor 308.

If both switches 301 and 303 are closed, the corrective current is equal to a difference between both inductor currents. In particular, the corrective current is zero if the switches 301 and 303 are open or if both switches are closed and the inductors 307, 707 carry even currents. A bi-directional I$^2$PS resembling full-bridge topology is carried out by substituting a battery for power supply, and adding two switches and two or four diodes. Differences between the I$^2$PSs of FIGS. 25 and 26 illustrate this modification. Differences between the I$^2$PSs of FIGS. 21 and 23 as well as 28 and 29 pertain to a similar modification. In particular, the switches 261 and 263 are in series with the diodes 262 and 264 of FIG. 26 respectively. Accordingly, two diodes separately coupled in series with the switches 301 and 303 are required to complete the transformation into the bi-directional I$^2$PS.

Figure 31:
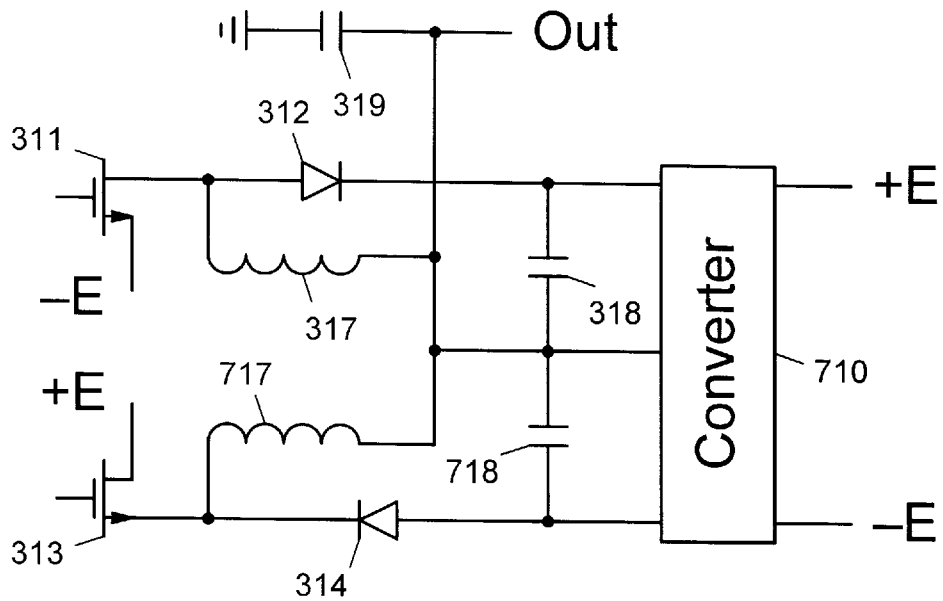
FIG. 31 is another embodiment of an I²PS with a DC/DC converter and two inductors.

FIG. 31 is another embodiment of an I$^2$PS with a DC/DC converter and two inductors attaining unidirectional currents. With reference to the FIG. 30 I$^2$PS, two diodes are eliminated and one holdup capacitor is added. This results in higher efficiency of the I$^2$PS. Specifically, a positive supply voltage +E is applied to the drain of the switch 313 and one output of the DC/DC converter 710. A negative supply voltage −E is applied to the source of the switch 311 and another output of the converter 710. The drain of the switch 311 is connected to the anode of the diode 312 and the inductor 317. The cathode of the diode 312 is connected to the capacitor 318 and a positive input of the converter 710. Similarly, the source of the switch 313 is connected to the cathode of the diode 314 and the inductor 717. The anode of the diode 314 is connected to the capacitor 718 and a negative input of the converter 710. The grounded capacitor 319 stores the output voltage of the I$^2$PS.

A reference input of the converter 710, the inductors 317, 717 and the capacitors 318, 319, 718 are tied to the output of the I$^2$PS. Therefore, the positive and negative inputs of the converter 710 are referenced to the I$^2$PS output. The capacitors 318 and 718 store holdup voltages that are positive and negative with reference to the I$^2$PS output respectively. The converter 710 limits both holdup voltages. It draws an increasing input current from the capacitor 318 and/or 718 if the respective holdup voltage increases above a predetermined level. The converter 710 produces a return current that is fed back to the power supply. The I$^2$PS can be also transformed into the bi-directional I$^2$PS resembling full-bridge topology. An equivalent transformation of the FIG. 30 I$^2$PS is pointed out hereinbefore.

The switch 311 turns on to decrease the output voltage. The corrective current is equal to the current of the inductor 317. A voltage applied across the inductor 317 is approximately equal to a difference between −E and the output voltage. Therefore, the corrective current increases. By contrast, the diode 314 applies the respective holdup voltage across the inductor 717 that hence charges the capacitor 718. The switch 311 can turn off at any time, whenever the correction is completed. The flow of the corrective current is interrupted instantaneously. The current of the inductor 317 flows through the diode 312 and charges the capacitor 318. The holdup voltage stored therein determines a rate at which the inductor 317 discharges.

Similarly, the switch 313 turns on to increase the output voltage. The corrective current is equal to the current of the inductor 717. The voltage appearing thereacross is approximately equal to a difference between +E and the output voltage. Conversely, the inductor 317 discharges through the diode 312 and the capacitor 318. When the switch 313 turns off, the corrective current is interrupted instantaneously. At least a portion of energy stored in the inductor 717 is transferred to the capacitor 718 via the diode 314. If both switches 311 and 313 are closed simultaneously, the corrective current is equal to a difference between both inductor currents. In particular, the corrective current is zero if the switches 311 and 313 are open or if both switches are closed and the inductors 317, 717 carry even currents.

Figure 32:
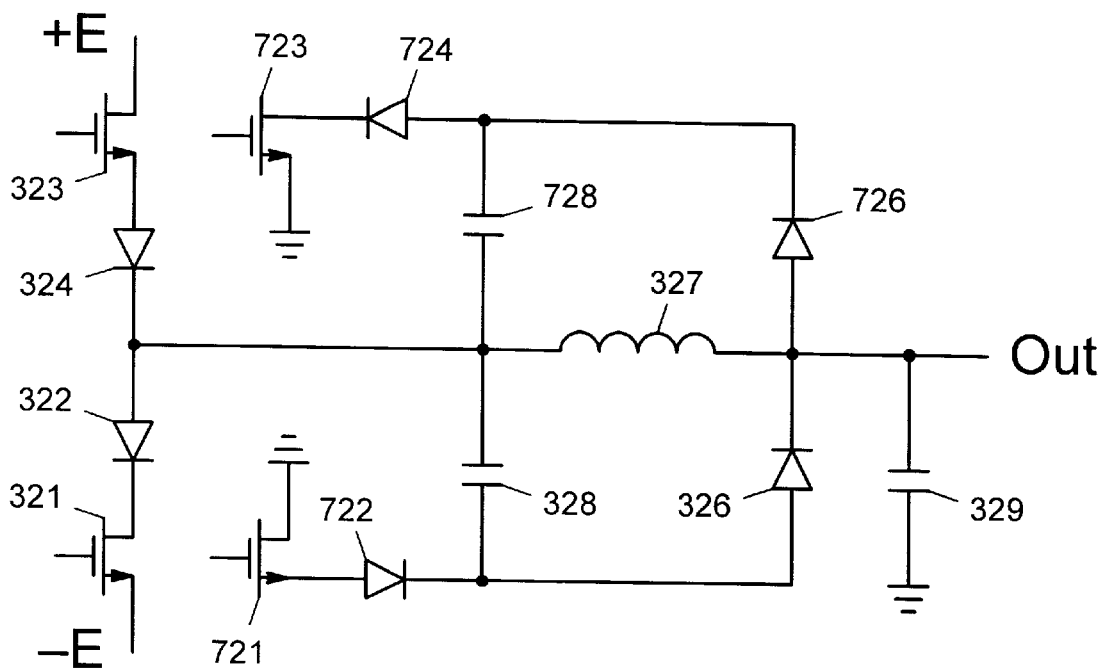
FIG. 32 is an embodiment of a transformer-less I²PS boosting up the output voltage.

FIG. 32 is an embodiment of a transformer-less I²PS boosting up the output voltage. The embodiments of FIGS. 2, 3, 10 and 27 each employ a converter with a transformer that allows boosting up the output voltage. However, other I²PSs usually lack this ability. In the full-bridge I²PSs of FIGS. 23, 29 and in the comparable I²PS of FIG. 26, amplitude of the output voltage is limited to the battery voltage. However, two switches have to close to increase the corrective current. Furthermore, the output voltage is not referenced to ground. The instant I²PS employs a single inductor and a pair of holdup capacitors. These capacitors inherently store voltages that exceed respective supply voltages. Moreover, the holdup capacitors alternatively act like the power supply.

Specifically, a positive supply voltage +E is applied to the drain of the switch 323. A negative supply voltage −E is applied to the source of the switch 321. The drains of the switches 321 and 723 are connected to the cathodes of the diodes 322 and 724 respectively. The sources of the switches 323 and 721 are connected to the anodes of the diode 324 and 722 respectively. One electrode of the capacitor 328 is connected to the anode of the diode 326 and the cathode of the diode 722. One electrode of the capacitor 728 is connected to the anode of the diode 724 and the cathode of the diode 726. One end of the inductor 327 is tied to the anode of the diode 322, the cathode of the diode 324 and the other electrodes of the capacitors 328, 728. The other end is tied to the cathode of the diode 326, the anode of the diode 726 and the capacitor 329. The output voltage is stored therein. The drain of the switch 721, the source of the switch 722 and the capacitor 329 are grounded.

The switch 321 turns on to decrease the output voltage. If the inductor current is zero, a voltage at a common junction of the components 322, 324, 327, 328 and 728 is equal to the output voltage. The switch 321 turns on at zero current. If the inductor current is nonzero, the voltage at the junction initially exceeds or levels with either supply voltage. If the diode 326 conducts the inductor current, the voltage at the junction is initially greater than or equal to +E. The switch 321 and the diode 322 take over the inductor current. The corrective current is equal thereto. If the diode 726 conducts the inductor current, the voltage at the junction is less than or equal to −E. The switch 321 turns on at zero voltage and zero current. The corrective current is zero until the inductor current fades out. Subsequently, the switch 321 and the diode 322 conduct the corrective current that is equal to the increasing inductor current.

Similarly, the switch 323 turns on to increase the output voltage. If the diode 326 conducts the inductor current, the switch 323 turns on at zero voltage and zero current. The switch 323 and the diode 324 start to conduct the corrective current when the inductor current drops to zero. If the diode 726 conducts the inductor current, the switch 323 and the diode 324 immediately take it over. Therefore, the corrective current is equal to the inductor current when the diode 324 forward biased. Only one of the switches 321 or 323 can be closed at a time. The respective switch can turn off at any time, whenever the correction is completed. The corrective current is interrupted instantaneously or remains zero. With the switch 321 or 323 closed, the output voltage can approach −E or +E respectively.

The switch 723 turns on to discharge the capacitor 728 or to decrease the output voltage below −E. The output voltage is negative as to prevent short circuit through the diodes 724 and 726. If the diode 726 conducts the inductor current, the diode 724 is cut off. The switch 723 turns on at zero voltage and zero current. The corrective current is zero until the inductor current fades out. If the diode 726 is nonconductive, the switch 723 and the diode 724 take over the inductor current. The corrective current is equal thereto. The capacitor 728 is effectively grounded. A holdup voltage of the capacitor 728 is applied to the junction so that voltage thereat is below −E. The voltage across the inductor 327 is approximately equal to a difference between that holdup voltage and the output voltage.

Similarly, the switch 721 turns on to discharge the capacitor 328 or to increase the output voltage above +E. The output voltage is positive as to prevent short circuit through the diodes 326 and 722. If the diode 326 conducts the inductor current, the switch 721 turns on at zero voltage and zero current. The corrective current is zero until the inductor current fades out. If the diode 326 is nonconductive, the switch 721 and the diode 722 take over the inductor current. The corrective current is equal thereto. The voltage at the junction is above +E. The voltage across the inductor 327 is approximately equal to a difference between a holdup voltage of the capacitor 328 and the output voltage. The respective switch can turn off at any time, whenever the correction is completed. The corrective current is interrupted instantaneously or remains zero.

The holdup voltages determine peak voltages appearing across the inductor 327. The voltage across the inductor 327 is fully rectified and limited to the respective holdup voltage. The inductor current can charge only one capacitor 328 or 728 at a time through the diode 326 or 726 respectively. One of the switches 321, 323, 721 or 723 is turned on to conduct the corrective current. However, the corrective current is zero if the diode 326 or 726 conducts the inductor current. By contrast, energy delivered to the load may be significantly larger when the output voltage exceeds either supply voltage. Only the capacitors 328 and 728 can provide energy in that range of the output voltage. Therefore, it may be necessary to significantly increase the corrective current conducted by the switches 321 and 323 above the level that is required to perform the correction. For example, if no correction is required, the switches 321 and 323 can alternately conduct high currents whose sum is zero. The switching is performed at a high frequency so that ripple of the output voltage can remain negligible. Furthermore, the amplifier of FIG. 34 inherently develops a tolerance margin that determines the ripple.

Voltage ratings of the components can be established. In order to simplify the analysis, voltage drops across conducting semiconductors are neglected. For example, the supply voltages +E and −E are +12 Vdc and −12 Vdc respectively. The I²PS may produce 24Vac output voltage that ranges from −34 Vdc to +34 Vdc. The holdup voltages are 46 Vdc each. Peak voltages of the switches 321, 323 and the diodes 322, 324 are 92 Vdc and 68 Vdc respectively. Peak voltages of the switches 721, 723 and the diodes 722, 724 are 126 Vdc and 34 Vdc respectively. Peak voltage of the diodes 326 and 726 is 92 Vdc. The voltage ratings can be considerably reduced if another inductor is added as in the embodiments of FIGS. 18 and 33.

FIG. 33 is the preferred embodiment of a transformerless I²PS boosting up the output voltage. With reference to the FIG. 32 I²PS, two diodes are eliminated and one inductor is added. Moreover, both inductors are used to independently develop unidirectional currents, similarly to the designs implementing a pair of inductive components, such as the FIG. 13 embodiment. Some advantages of this method are discussed hereinabove. In particular, the corrective current can immediately assume desired polarity and possibly an upheld level. The burdensome dead time of switches is eliminated, wherein a differential corrective current can be produced. The latter benefit is essential for achieving highest fidelity of the boosted output voltage. The operation of the I²PS is very similar to that of the FIG. 18 I²PS. The description of that embodiment provides reference to corresponding components.

A positive supply voltage +E and a negative supply voltage −E are applied to the drain of the switch 333 and the source of the switch 331 respectively. The inductor 337 is tied to the drain of the switch 331 and the anode of the diode 336 at one end, and to the source of the switch 731 and the cathode of the diode 332 at the other end. The drain of the switch 731 is connected to the cathode of the diode 336 and the capacitor 338. Likewise, the inductor 737 is tied to the source of the switch 333 and the cathode of the diode 736 at one end, and to the drain of the switch 733 and the anode of the diode 334 at the other end. The source of the switch 733 is connected to the anode of the diode 736 and the capacitor 738. The anode of the diode 332, the cathode of the diode 334 and the capacitors 338, 339, 738 are connected to the output of the I²PS. The grounded capacitor 339 stores the output voltage of the I²PS.

The switch 331 turns on to decrease the output voltage. The diode 332 continues to conduct the current of the inductor 337. Therefore, the corrective current immediately assumes that current level. If the switch 731 is turned off, a voltage applied across the inductor 337 is approximately equal to a difference between −E and the output voltage. The switch 331 can turn off at any time, whenever the correction is completed.

The flow of the corrective current is interrupted instantaneously. The current of the inductor 337 flows through the diodes 332, 336 and charges the capacitor 338. A holdup voltage stored therein determines a rate at which the inductor 337 discharges. Similarly, the switch 333 turns on to increase the output voltage. The corrective current is equal to the current of the inductor 737. If the switch 733 is turned off, the voltage appearing across the inductor 737 is approximately equal to a difference between +E and the output voltage. When the switch 333 turns off, the corrective current is interrupted instantaneously. At least a portion of energy stored in the inductor 737 is transferred to the capacitor 738 via the diodes 334 and 736.

Both switches 331 and 731 turn on to discharge the capacitor 338 or to decrease the output voltage below −E. The corrective current is equal to the current of the inductor 337. The diode 332 is cut off as the switch 731 redirects flow of the corrective current through the capacitor 338. Moreover, −E is effectively lowered by the holdup voltage of the capacitor 338. As a result, a difference between a sum of these voltages and the output voltage is applied across the inductor 337. When the switch 331 turns off, the flow of the corrective current is interrupted instantaneously. The switch 731 can remain closed in order to short the inductor 337 and thus uphold the current thereof. Otherwise, the current charges the capacitor 338. Similarly, both switches 333 and 733 turn on to discharge the capacitor 738 or to increase the output voltage above +E. The corrective current is equal to the current of the inductor 737 and discharges the capacitor 738. Moreover, a holdup voltage thereof is effectively added to +E. As a result, a difference between that sum and the output voltage is applied across the inductor 737. The switch 333 turns off to instantaneously interrupt the corrective current. The switch 733 can remain closed to uphold the current of the inductor 737. Otherwise, the current charges the capacitor 738.

The corrective current is equal to a difference between both inductor currents if both switches 331 and 333 are closed simultaneously. In particular, the corrective current is zero if the switches 331 and 333 are open or if both switches are closed and the inductors 337, 737 carry even currents. Moreover, energy delivered to the load may be significantly larger when the output voltage exceeds either supply voltage. Therefore, it may be necessary to significantly increase the inductor currents above the level of the corrective current before the output voltage reaches that range. This may barely affect quality of the correction due to differential nature of the corrective current. Preferably, the higher inductor current is up to two or three times larger than the required corrective current. This maximizes accuracy with which the corrective current is terminated. For example, this feature is critical in the precision audio amplifier of FIG. 35.

Voltage ratings of the components can be established. In order to simplify the analysis, voltage drops across conducting semiconductors are neglected. For example, the supply voltages +E and −E are +12 Vdc and −12 Vdc respectively. The I²PS produces 24 Vac output voltage that ranges from −34 Vdc to +34 Vdc. The holdup voltages are 23 Vdc each. Peak voltage of the components 331, 333, 336 and 736 is 69 Vdc. Peak voltage of the components 332, 334, 731 and 733 is 23 Vdc. The semiconductors 331 through 334, 336, 731, 733 and 736 correspond to the semiconductors 321 through 324, 326, 721, 723 and 726 of FIG. 32 respectively. The supply and output voltages are the same as in the example of that embodiment. Yet, peak voltages of all corresponding switches and diodes are significantly lower. Diodes equivalent to 722 and 724 of FIG. 32 are nonexistent in the instant I²PS. Moreover, the I²PS has all advantages of producing the differential corrective current.

Figure 34:
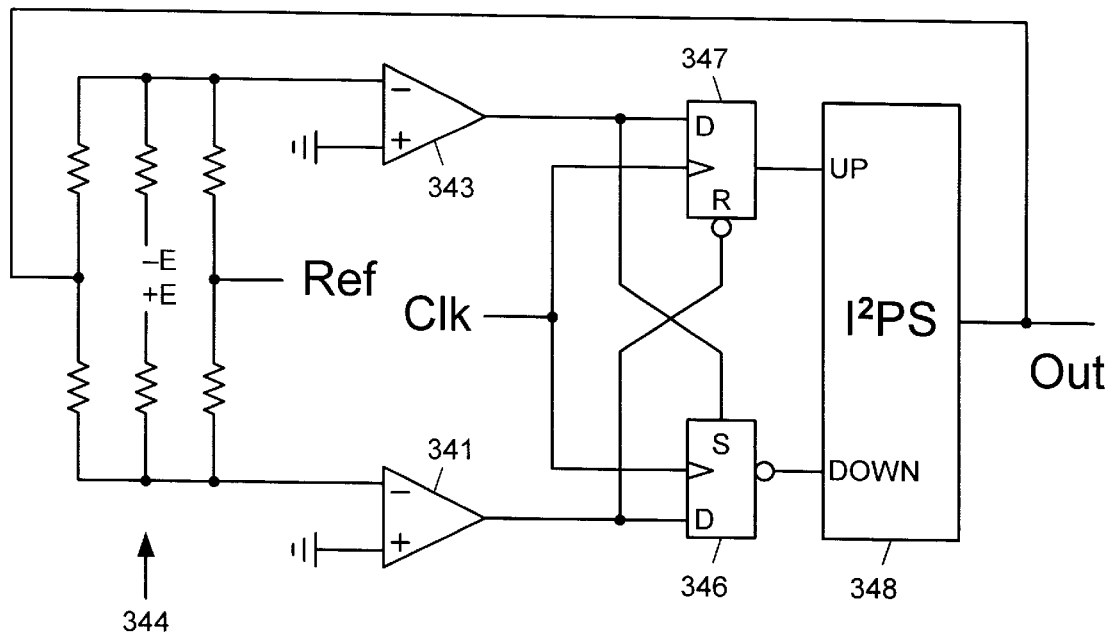
FIG. 34 is the preferred embodiment of a very efficient amplifier with an I²PS.

FIG. 34 is the preferred embodiment of a very efficient amplifier with an I²PS. Analog signals are immediately digitized. A pair of comparators is used to compare a reference voltage against the output voltage. The reference voltage may derive from a sine wave oscillator generating a voltage at line frequency. The comparators provide a pair of output signals that form a comparator signal. This signal is stored in a pair of flip-flops. Specifically, the reference and output voltages are applied to the inverting inputs of both comparators through separate resistors of the resistor network 344. Furthermore, a positive voltage +E is applied to the inverting input of the comparator 341 through one resistor of the network 344. A negative voltage −E is applied to the inverting input of the comparator 343 through another resistor of the network 344. By these means, offset currents of the comparators 341 and 343 are simulated. The non-inverting inputs of the comparators 341 and 343 are grounded. The comparator signal is used to control at least one switch of the I²PS 348. For example, the comparator signal affects states of output switches of the I²PS shown in FIGS. 2 and 10. The control can be also expanded to the DC/AC converters in these I²PSs.

The D-type flip-flops 346 and 347 have asynchronous set and reset inputs respectively. The output signal of the comparator 341 is applied to the data input of the flip-flop 346 and the inverting reset input of the flip-flop 347. The output signal of the comparator 343 is applied to the data input of the flip-flop 347 and the non-inverting set input of the flip-flop 346. A clock signal is applied to the clock inputs of both flip-flops. If the I²PS 348 has an internal clock, that clock can be used to synchronize the flip-flops 346 and 347. By these means, the content thereof is refreshed at the beginning of each switching cycle of the I²PS 348. The UP and DOWN signals appear at the non-inverting output of the flip-flop 347 and the inverting output of the flip-flop 346 respectively.

Examples of the I²PS 348 are shown in FIGS. 2, 3 and 10 through 33. These embodiments, except the I²PSs of FIGS. 17, 21, 22, 24 and 25, each employ at least three switches. An expanded logic circuitry is required for driving all switches. Moreover, the FIG. 22 I²PS employs the series coupled capacitor 228 whose voltage requires monitoring. However, the embodiments of FIGS. 10, 27, 28, 30 and 31 use only one pair of switches for correcting the output voltage. The remaining switches are located in the respective converters that can operate independently. Therefore, the UP and DOWN signals can be applied directly to gates of the switches 103 and 101 of FIG. 10 respectively. The UP and DOWN signals can be also applied directly to gates of switches receiving positive and negative supply voltages respectively, as of FIGS. 17, 21, 24, 25, 27, 28, 30 and 31. Cross-conduction of the switches, proper synchronization, short circuit condition, etc, must be considered. They are affected by propagation delay, setup time, hold time, pulse width, etc of various signals in each flip-flop.

A tolerance margin is developed within which the amplifier is idle. The resistor network 344 consists of six resistors. The reference voltage is applied to one pair of resistors, each having a reference resistance. The output voltage is applied to the other pair of resistors, each having a feedback resistance. A gain of the amplifier is a quotient obtained by dividing the feedback resistance by the reference resistance. A ratio of +E to the value of the resistor to which +E is applied is equal to the simulated offset current of the comparator 341. Similarly, a ratio of −E to the value of the resistor to which −E is applied is equal to the simulated offset current of the comparator 343. The simulated offset currents have equal amplitudes and opposite polarities. These currents set the tolerance margin. The voltages +E and −E can also depend on the output voltage. For example, the width of the tolerance margin can be proportional to the level of the output voltage. Dependence of distortion level on the output voltage level is minimized. This technique is disclosed in the abovementioned "Switching Power Apparatus with 3-State Driver," U.S. Pat. No. 5,270,904 dated Dec. 14, 1993, by these inventor.

When the output voltage of the amplifier is too high, a sum of an error current and the simulated offset current of the comparator 343 is positive. The error current is a sum of the output voltage divided by the feedback resistance and the reference voltage divided by the reference resistance. The output signals of the comparators 341 and 343 are low. The UP signal is low since the comparator 341 resets the flip-flop 347. The DOWN signal remains high or it turns high on a rising edge of the clock signal. As the I²PS 348 corrects the output voltage, the sum of the error current and the simulated offset current of the comparator 343 becomes negative. When this comparator switches, the flip-flop 346 is set instantaneously. Now, the UP and DOWN signals are both low, wherein the corrective current of the I²PS is cut off immediately.

When the output voltage of the amplifier is too low, the amplifier operates analogously. The sum of the error current and the simulated offset current of the comparator 341 is negative. The output signals of both comparators 341 and 343 are high. The UP signal remains high or it turns high on the following rising edge of the clock signal. The DOWN signal is low since the comparator 343 sets the flip-flop 246. The I²PS 348 reaches the idle state when the error current is within the tolerance margin. Accordingly, the output signals of the comparators 341 and 343 are low and high respectively. The UP and DOWN signals are both low. If both comparators 341 and 343 maintain their states within one clock period, the correction or the idle state is extended. The comparators 341 and 343 are capable of switching at a very high speed.

The amplifier has a 3-state output. When the UP or DOWN signal is high, the I²PS 348 acts to increase or decrease the output voltage of the amplifier respectively. Otherwise, the I²PS 348 is in the idle state and provides no correction. The idle condition occurs when the error current is within the tolerance margin. By definition, the corrective current produced by the I²PS 348 is cut off. The output voltage is stored in an output capacitor of the I²PS 348 and can be affected only by the load, if any. This technique is similar to that disclosed in the abovementioned "Switching Power Apparatus with 3-State Driver," U.S. Pat. No. 5,270,904. However, the amplifier according to the present invention terminates the correction precisely when the error current reaches the tolerance margin, regardless of the clock signal. Conversely, the correction starts on a rising edge of the clock signal only if the error current is out of the tolerance margin. The efficiency of the amplifier is increased by maximizing a total length of the idle state.

An additional comparator with hysteresis can be used to predetermine or establish polarity of the corrective current. The additional comparator senses polarity of a voltage across an inductive component that originates the corrective current. Therefore, direct sensing of an inductor current or the corrective current for that purpose is avoidable. The correction can start when the inductor current is zero or has desired polarity, as to prevent reverse polarity of the corrective current. For example, polarity of a voltage across the inductor 117 of the FIG. 11 I²PS corresponds to polarity of the inductor current if one switch is closed or all switches are open. Moreover, even when two switches are closed, polarity of the inductor current can be determined. Polarity of a voltage drop across a conducting switch or diode connected to the power supply corresponds to polarity of the inductor current. Therefore, in this embodiment, two comparators can be used to determine polarity of the inductor current at any time. The above remarks are irrelevant to some I²PSs, such as the FIGS. 13 embodiment. The corrective current having desired polarity is applied, possibly after a delay, simply by activating suitable switch or switches. In any I²PS, the inductor or corrective current can be sensed merely to determine abnormal operating conditions.

Figure 35:
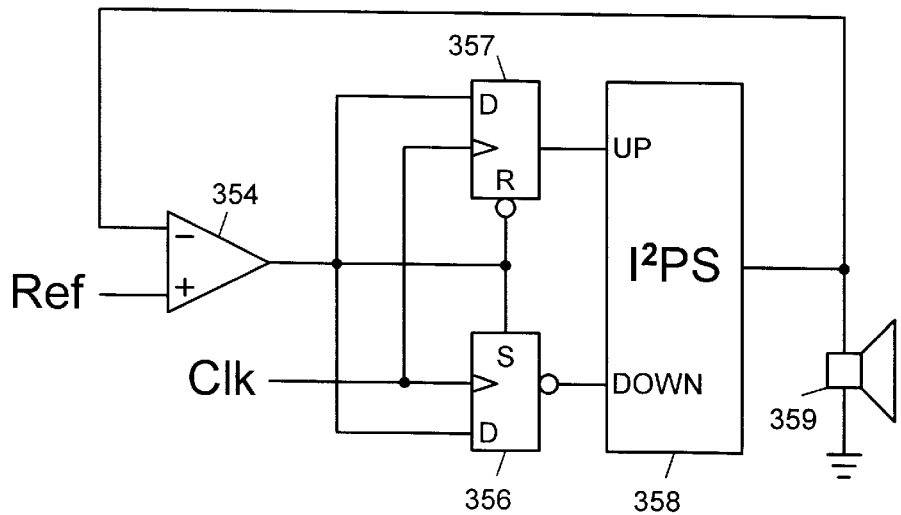
FIG. 35 is the preferred embodiment of a precision audio amplifier with an I²PS.

FIG. 35 is the preferred embodiment of a precision audio amplifier with an I²PS. Analog signals are immediately digitized. A single comparator compares a reference voltage against the output voltage and provides a comparator signal. The reference voltage derives from an audio source. The comparator signal is used to control at least one switch of the I²PS 358. Specifically, the reference and output voltages are applied to the non-inverting and inverting inputs of the comparator 352 respectively. The comparator signal is applied to the data input and the non-inverting set input of the D-type flip-flop 356, and to the data input and the inverting reset input of the D-type flip-flop 357. Therefore, the comparator 352 asynchronously sets and resets the flip-flops 356 and 357 respectively. A clock signal is applied to the clock inputs of the flip-flops 356 and 357. If the I²PS 358 has an internal clock, that clock can be used to synchronize the flip-flops 356 and 357. By these means, the content thereof is refreshed at the beginning of each switching cycle of the I²PS 358. The UP and DOWN signals appear at the non-inverting output of the flip-flop 357 and the inverting output of the flip-flop 356 respectively.

Examples of the I²PS 358 are shown in FIGS. 2, 3 and 10 through 33. The UP and DOWN signals can be applied directly to gates of the switches 103 and 101 of FIG. 10 respectively. The UP and DOWN signals can be also applied directly to gates of switches receiving positive and negative supply voltages respectively, as of FIGS. 17, 21, 24, 25, 27, 28, 30 and 31. Cross-conduction of the switches, proper synchronization, short circuit condition, etc, must be considered. They are affected by propagation delay, setup time, hold time, pulse width, etc of various signals in each flip-flop. The amplifier has a unity gain. A higher gain can be accomplished by applying the output voltage through a voltage divider to the inverting input of the comparator 352. The I²PS 358 drives the loudspeaker 359, wherein a low-pass filter can be used to couple both devices. Therefore, the filter can operate within the feedback loop. The filter, or a portion thereof, that is excluded from the feedback loop is considered a part of the loudspeaker 359. However, an aggressively designed filter may actually impair fidelity of reproduction. This may be caused in particular by an excessive delay and phase shift of the filter or overly distorted impedance of the loudspeaker 359.

When the output voltage is greater than the reference voltage, the comparator signal is low. The UP signal is low since the comparator 352 resets the flip-flop 357. The DOWN signal remains high or it turns high on a rising edge of the clock signal. As the I²PS 358 corrects the output voltage, that voltage becomes smaller than the reference voltage. The comparator 352 flips over and instantaneously sets the flip-flop 356. Now, the UP and DOWN signals are both low. The corrective current of the I²PS 358 is cut off immediately. If the output voltage remains smaller than the reference voltage, the UP signal turns high on the following rising edge of the clock signal. Otherwise, the DOWN signal turns high again. Therefore, the UP or DOWN signal turns high in accordance with the comparator signal at the start of each switching cycle.

The amplifier has a 3-state output, similar to the FIG. 34 amplifier. When the UP or DOWN signal is high, the I²PS 358 acts to increase or decrease the output voltage of the amplifier respectively. Otherwise, the I²PS 358 is idle, wherein no correction of the output voltage is performed. The output voltage is stored in an output capacitor of the I²PS 358 and is affected only by the loudspeaker 359. The idle condition starts when the comparator 352 flips during the switching cycle and ends at the end thereof. The FIG. 34 amplifier accepts an inaccuracy of the output voltage as to terminate the correction and maintain the idle state. By contrast, the instant amplifier terminates the correction precisely when the output voltage is equal to the reference voltage. Moreover, the idle state is effective only for the limited time that is smaller than the period of the clock signal. Conversely, the correction starts on a rising edge of the clock signal and has no time limit. If the idle state occurs by the end of every switching cycle, the amplifier corrects the output voltage with a highest precision.

The embodiments of the present invention described herein are intended to be taken in an illustrative and not a limiting sense. Various modifications and changes may be made to these embodiments by persons skilled in the art without departing from the scope of the present invention as defined in the appended claims.

I claim:

1. Unidirectional or bi-directional switching power apparatus converting a supply voltage or voltages into an AC output voltage comprising:
   a converter means for converting the supply voltage or voltages into a primary current;
   a transformer means for providing a secondary current in response to the primary current;
   a capacitive means for providing the AC output voltage; and
   a switching means for selectively applying the secondary current to the capacitive means.

2. Switching power apparatus of claim 1 wherein the converter means includes a second switching means for selectively applying the supply voltage or voltages to the transformer means.

3. Switching power apparatus of claim 1 wherein the converter means includes a rectifying means for limiting a voltage applied to the transformer means.

4. Switching power apparatus of claim 1 wherein the converter means includes an inductive means for attaining the primary current.

5. Switching power apparatus of claim 4 wherein the inductive means provides a return voltage or voltages, and
   further wherein the converter means includes a rectifying means for limiting the return voltage or voltages.

6. Switching power apparatus of claim 1 further including a second capacitive means coupled in series with the transformer means for storing an intermediate DC voltage.

7. Switching power apparatus of claim 1 further including:
   a comparator means for comparing a reference voltage against the AC output voltage and providing a comparator signal; and
   a means for controlling the switching means or the converter means and the switching means in response to the comparator signal.

8. Unidirectional or bi-directional switching power apparatus converting a supply voltage or voltages into an AC output voltage comprising:
   an inductive means for providing a return voltage or voltages;
   a first switching means for selectively applying the supply voltage or voltages to the inductive means;
   a rectifying means for limiting the return voltage or voltages;
   a capacitive means for providing the AC output voltage; and
   a second switching means for selectively applying the AC output voltage to the inductive means.

9. Switching power apparatus of claim 8 further including a second capacitive means coupled in series with the inductive means for storing an intermediate DC voltage.

10. Switching power apparatus of claim 8 further including a second capacitive means coupled in series with first said capacitive means for storing an intermediate DC voltage.

11. Switching power apparatus of claim 8 further including:
   a comparator means for comparing a reference voltage against the AC output voltage and providing a comparator signal; and
   a means for controlling the second switching means or the first and second switching means in response to the comparator signal.

12. Unidirectional or bi-directional switching power apparatus converting a supply voltage or voltages into an AC output voltage comprising:
   a converter means for converting the supply voltage or voltages into a primary voltage;
   a transformer means having a primary winding with the primary voltage applied thereto, and a secondary winding with a tap for providing a secondary voltage in response to the primary voltage;

an inductive means coupled to the tap for attaining a current and providing a return voltage or voltages;

a rectifying means for limiting the return voltage or voltages;

a capacitive means for providing the AC output voltage; and a switching means coupled to the secondary winding for selectively applying the current to the capacitive means.

13. Switching power apparatus of claim 12 wherein the inductive means includes:

a first inductive means for attaining the current; and a second inductive means coupled to the first inductive means for providing the return voltage or voltages.

14. Switching power apparatus of claim 12 wherein the switching means includes a second rectifying means coupled to the secondary winding for rectifying the secondary voltage.

15. Switching power apparatus of claim 12 further including:

a comparator means for comparing a reference voltage against the AC output voltage and providing a comparator signal; and a means for controlling the switching means or the converter means and the switching means in response to the comparator signal.

16. Unidirectional or bi-directional switching power apparatus converting a supply voltage or voltages of a voltage source into an AC output voltage comprising:

an inductive means for attaining a current and providing a return voltage or voltages;

a switching means for selectively applying the current to the voltage source;

a rectifying means for limiting the return voltage or voltages when the current is substantially equal to zero; and a capacitive means for providing the AC output voltage in response to the current.

17. Switching power apparatus of claim 16 wherein the inductive means includes:

a first inductive means for attaining the current; and a second inductive means coupled to the first inductive means for providing the return voltage or voltages.

18. Switching power apparatus of claim 16 wherein the rectifying means provides a return current or currents to the voltage source and includes:

a second capacitive means for storing a holdup voltage or voltages; and a converter means for converting the holdup voltage or voltages into the return current or currents.

19. Switching power apparatus of claim 16 further including a second capacitive means coupled in series with the inductive means for storing an intermediate DC voltage.

20. Switching power apparatus of claim 16 further including:

a comparator means for comparing a reference voltage against the AC output voltage and providing a comparator signal; and a means for controlling the switching means in response to the comparator signal.

* * * * *